(12) United States Patent
Wang et al.

(10) Patent No.: US 12,218,816 B2
(45) Date of Patent: Feb. 4, 2025

(54) TIMING ADVANCE DETERMINING METHOD AND COMMUNICATION APPARATUS

(71) Applicant: HUAWEI TECHNOLOGIES CO., LTD., GuangDong (CN)

(72) Inventors: Xiaolu Wang, Hangzhou (CN); Hejia Luo, Hangzhou (CN); Ying Chen, Hangzhou (CN); Rong Li, Hangzhou (CN); Bin Wang, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 350 days.

(21) Appl. No.: 17/886,739

(22) Filed: Aug. 12, 2022

(65) Prior Publication Data

US 2022/0393957 A1  Dec. 8, 2022

Related U.S. Application Data

(63) Continuation of application No. PCT/CN2020/121913, filed on Oct. 19, 2020.

(30) Foreign Application Priority Data

Feb. 14, 2020  (CN) .......................... 202010093795.0
Oct. 15, 2020  (CN) .......................... 202011105020.7

(51) Int. Cl.
*H04W 4/00* (2018.01)
*H04L 43/0864* (2022.01)

(52) U.S. Cl.
CPC ................. *H04L 43/0864* (2013.01)

(58) Field of Classification Search
CPC ......... H04L 45/74; H04L 1/16; H04L 1/1685; H04L 5/0007; H04W 88/08; H04W 28/04;

(Continued)

(56) References Cited

U.S. PATENT DOCUMENTS

2019/0159156 A1* 5/2019 Abedini ............ H04W 56/0005
2021/0321464 A1* 10/2021 Lin ................... H04W 56/0075

(Continued)

FOREIGN PATENT DOCUMENTS

| CN | 109874168 A | 6/2019 |
| JP | 2022549073 A | 11/2022 |
| WO | 2019195457 A1 | 10/2019 |

OTHER PUBLICATIONS

NTT Docomo, Inc., "Way forward on UE TA offset for FDD and TDD in NR," [online] (Internet URL: https://www.3gpp.org/ftp/tsg_ran/WG4_Radio/TSGR4_86Bis/Docs/R4-1804614.zip), 3GPP TSG RAN WG4 #86bis Meeting, Melbourne, AU, Apr. 16-20, 2018, R4-1804614; 7 pages.

(Continued)

*Primary Examiner* — Phuongchau Ba Nguyen
(74) *Attorney, Agent, or Firm* — Rimon PC

(57) ABSTRACT

Embodiments of this application provide a timing advance determining method and a communication apparatus, to improve precision of calculating a timing advance (TA) by a terminal, and reduce inter-symbol interference (ISI). The method includes: A first network device determines a first parameter based on a first delay compensation value, where the first delay compensation value is a delay compensation made by the first network device for receiving a signal sent by a terminal, the first parameter indicates a difference between a round-trip delay of a feeder link in a non-terrestrial network NTN and the first delay compensation value, and the difference is used to determine a TA used by the terminal for signal sending; and the first network device sends the first parameter.

15 Claims, 20 Drawing Sheets

S701: A terminal receives a third parameter (position coordinates of a compensation reference point, a difference, or a second delay compensation value) and second indication information S702: The terminal determines a TA for signal sending based on the third parameter and the second indication information

(58) Field of Classification Search
CPC ... H04W 72/04; H04W 72/042; H04W 28/08; H04W 28/084; H04W 36/22; H04W 72/12; Y02D 30/70

See application file for complete search history.

(56) References Cited

U.S. PATENT DOCUMENTS

| | | | | |
|---|---|---|---|---|
| 2022/0345961 | A1* | 10/2022 | Tao | H04B 7/1851 |
| 2023/0344508 | A1* | 10/2023 | Tseng | H04W 56/005 |
| 2024/0031964 | A1* | 1/2024 | Wu | H04W 56/0005 |
| 2024/0031965 | A1* | 1/2024 | Wu | H04W 56/0035 |

OTHER PUBLICATIONS

Huawei, HiSilicon, "Discussion on Doppler compensation, timing advance and RACH for NTN," [online] (Internet URL: https://www.3gpp.org/ftp/tsg_ran/WG1_RL1/TSGR1_98b/Docs/R1-1910064.zip), 3GPP TSG RAN WG1 Meeting #98bis, Chongqing, China, Oct. 14-20, 2019, R1-1910064; 10 pages.

R1-1912903, Panasonic, Timing advance and PRACH design for NTN, 3GPP TSG RAN WG1 #99, Reno, USA, Nov. 18-22, 2019, 13 pages.

3GPP TS 38.213 V15.0.0:"3rd Generation Partnership Project; Technical Specification Group Radio Access Network; NR; Physical layer procedures for control (Release 15)",Dec. 2017,total 56 pages.

ZTE, Sanechips, Report of Email Discussion [107#60] [NR/NTN] RACH capacity evaluation and procedures , 3GPP TSG-RAN WG2 Meeting #107bis R2-1912664, Chongqing, China, Oct. 14-18, 2019, 29 pages.

3GPP TS 38.211 V1.0.0 (Sep. 2017); 3rd Generation Partnership Project; Technical Specification Group Radio Access Network; NR;Physical channels and modulation(Release 15);total 37 pages.

3GPP TS 38.331 V0.1.0 (Oct. 2017), 3rd Generation Partnership Project; Technical Specification Group Radio Access Network; NR;Radio Resource Control (RRC); Protocol specification(Release 15), total 42 pages.

3GPP TS 38.321 V0.0.3, 3rd Generation Partnership Project; Technical Specification Group Radio Access Network; NR; Medium Access Control (MAC) protocol specification (Release 15), May 2017; 20 pages.

3GPP TS 38.133 V0.0.1, 3rd Generation Partnership Project; Technical Specification Group Radio Access Network; New Radio (NR); Requirements for support of radio resource management (Release 15), May 2017; 14 pages.

Huawei et al.: "Discussion on Doppler compensation, timing advance and RACH for NTN" 3GPP TSG RAN WG1 Meeting #99; R1-1911860, 3rd Generation Partnership Project (3GPP) Mobile Competence Centre; 650 Route Des Lucioles; F-06921 Sophia-Antipolis Cedex; Reno, USA, Nov. 18-22, 2019; 14 total pages.

ETRI: "Discussion on uplink timing advance for NTN" 3GPP TSG RAN WG1 #98bis; R1-1910998, Discussion on Uplink Timing Advance for NTN Final, 3rd Generation Partnership Project (3GPP), Mobile Competence Centre; 650 Route Des Lucioles; F-06921 Sophia-Antipolis Ced; Chongqing, China, Oct. 14-20, 2019; 3 total pages.

ETRI: "Discussion on timing advance for NTN" 3GPP TSG RAN WG1 #99; R1-1912640, 3rd Generation Partnership Project (3GPP) Mobile Competence Centre; 650 Route Des Lucioles; F-06921 Sophia-Antipolis Cedex; Reno, USA, Nov. 18-22, 2019; 2 total pages.

* cited by examiner

S701: A terminal receives a third parameter (position coordinates of a compensation reference point, a difference, or a second delay compensation value) and second indication information S702: The terminal determines a TA for signal sending based on the third parameter and the second indication information

FIG. 21A

| Service link TA rate reference point coordinates | Feeder link TA rate reference point coordinates | Doppler pre/post-compensation reference point coordinates |
|---|---|---|

FIG. 21B

| Service link TA rate reference point coordinates/ Service link TA rate value (with positive/negative sign indication) | Feeder link TA rate reference point coordinates/ Feeder link TA rate value (with positive/negative sign indication) | Doppler pre/post-compensation reference point coordinates or a Doppler pre/post-compensation value (with positive/negative sign indication) |
|---|---|---|

FIG. 22

TIMING ADVANCE DETERMINING METHOD AND COMMUNICATION APPARATUS

CROSS-REFERENCE TO RELATED APPLICATIONS

This application is a continuation of International Application No. PCT/CN2020/121913, filed on Oct. 19, 2020, which claims priority to Chinese Patent Application No. 202010093795.0, filed on Feb. 14, 2020, and Chinese Patent Application No. No. 202011105020.7, filed on Oct. 15, 2020. All of the aforementioned patent applications are hereby incorporated by reference in their entireties.

TECHNICAL FIELD

This application relates to the field of communication technologies, and in particular, to a timing advance determining method and a communication apparatus.

BACKGROUND

For non-terrestrial network (NTN) communication, when sending a preamble, a terminal may receive a common timing advance value broadcast by a network device, and perform timing advance (TA) based on the common timing advance value, to reduce the impact of a round-trip delay between the terminal and the network device on random access preamble receiving, and to reduce inter-symbol interference (ISI).

In actual application, the network device usually makes a partial delay compensation for the round-trip delay between the terminal and the network device. Therefore, a delay that actually needs to be compensated for by the terminal should be only a part of the common timing advance value. However, in a conventional technology, the terminal can learn only of the common timing advance value broadcast by the network device, and cannot accurately calculate the TA. Therefore, there is still severe ISI in the random access preamble.

SUMMARY

Embodiments of this application provide a timing advance determining method and a communication apparatus, to improve precision of calculating a TA by a terminal and improve the accuracy of the TA.

According to a first aspect, an embodiment of this application provides a TA determining method, including: A first network device determines a first parameter based on a first delay compensation value, where the first delay compensation value is a delay compensation made by the first network device for receiving a signal sent by a terminal, the first parameter indicates a difference between a round-trip delay of a feeder link in a non-terrestrial network NTN and the first delay compensation value, and the difference is used to determine a TA used by the terminal for signal sending; and the first network device sends the first parameter.

In this embodiment of this application, the first parameter may indicate the difference between the round-trip delay of the feeder link and the first delay compensation value. Therefore, a case in which the first network device makes a partial delay compensation for the signal sent by the terminal is considered when the terminal receives the first parameter and determines the TA based on the first parameter. This can improve precision of calculating the TA by the terminal, and further reduce ISI.

In a possible implementation, that the first parameter indicates a difference between a round-trip delay of a feeder link in an NTN and the first delay compensation value includes: The first parameter is the difference between the round-trip delay of the feeder link in the NTN and the first delay compensation value; or the first parameter is used to determine the difference between the round-trip delay of the feeder link in the NTN and the first delay compensation value.

This implementation provides two possible manners of implementing the first parameter. This can improve the flexibility of the solution.

In a possible implementation, the first parameter is used to determine the difference between the round-trip delay of the feeder link in the NTN and the first delay compensation value, and the first parameter may be position coordinates of a compensation reference point. The difference is determined based on a round-trip delay between the compensation reference point and a second network device, and the round-trip delay between the compensation reference point and the second network device is determined based on the position coordinates of the compensation reference point and position coordinates of the second network device.

In this implementation, the terminal can determine the difference based on the position coordinates of the compensation reference point and the position coordinates of the second network device. This provides a novel indication manner for the difference, and implementation on a terminal side is simple.

In a possible implementation, the first parameter may be the difference, or may be the position coordinates of the compensation reference point during a specific implementation, to improve the flexibility of the solution. Further, the first network device may send first indication information. The first indication information indicates that the first parameter is the difference or the position coordinates of the compensation reference point.

In this implementation, the terminal device may determine, based on the first indication information, whether the first parameter is the difference or the position coordinates of the compensation reference point, and then calculate the TA for signal sending by using a corresponding algorithm. This can improve the flexibility of the solution and ensure reliability of the solution.

In an optional implementation, if the first parameter is the position coordinates of the compensation reference point, the first network device may further send second indication information. The second indication information indicates that the difference is a positive value or a negative value. The difference is a positive value when the first delay compensation value is less than the round-trip delay of the feeder link or the compensation reference point is located on the feeder link; or the difference is a negative value when the first delay compensation value is greater than the round-trip delay of the feeder link or the compensation reference point is located on a service link in the NTN.

In this implementation, the terminal can determine whether the difference is a positive or a negative value based on the second indication information, and then calculate the TA based on the difference. This can further ensure accuracy of the TA.

In a possible implementation, the TA is a sum of a round-trip delay of the service link in the NTN and the difference; or a sum of the round-trip delay of the service link in the NTN, the difference, and an offset. The offset is related to a time division duplex TDD mode or a frequency division duplex FDD mode.

In this implementation, a plurality of possible TA calculation manners are provided. This can improve the flexibility and applicability of the solution.

In a possible implementation, the first network device may further send a second parameter. The second parameter indicates a service link common round-trip delay of a beam or a cell covered by the second network device.

In this implementation, a terminal without a positioning function may obtain, based on the second parameter, the service link common round-trip delay of the beam or the cell covered by the second network device, and then use the service link common round-trip delay as a service link round-trip delay between the terminal without the positioning function and the second network device, to ensure that the terminal without a positioning function can also accurately calculate the TA.

In a possible implementation, that the second parameter indicates a service link common round-trip delay of a beam or a cell covered by the second network device includes:

The second parameter is the service link common round-trip delay of the beam or the cell covered by the second network device; or the second parameter is used to determine the service link common round-trip delay of the beam or the cell covered by the second network device.

This implementation provides two possible manners of implementing the second parameter. This can improve the flexibility of the solution.

In a possible implementation, the second parameter is used to determine the service link common round-trip delay of the beam or the cell covered by the second network device, and the second parameter is the position coordinates of a service link reference point. The common round-trip delay of the service link is determined based on a round-trip delay between the service link reference point and the second network device, and the round-trip delay between the service link reference point and the second network device is determined based on the position coordinates of the service link reference point and the position coordinates of the second network device.

In this implementation, the terminal can determine the round-trip delay between the service link reference point and the second network device based on the position coordinates of the service link reference point and the position coordinates of the second network device. This implementation provides a novel indication manner for the service link common round-trip delay of the beam or the cell covered by the second network device, and implementation on a terminal side is simple.

In a possible implementation, the first network device may send third indication information. The third indication information indicates that the second parameter is the service link common round-trip delay or position coordinates of a service link reference point.

In this implementation, the terminal device may determine, based on the third indication information, whether the second parameter is the service link common round-trip delay or the position coordinates of the service link reference point, and then calculate the TA for signal sending by using a corresponding algorithm. This can improve the flexibility of the solution and ensure reliability of the solution.

In a possible implementation, the first network device may carry the first parameter in an SIB1, OSI, or an MIB; the first network device may carry the first parameter in RRC information, an RRC reconfiguration message, DCI, group DCI, a MAC element, or a TAC in an RRC connection phase; or the first network device may carry the first parameter in an RRC reconfiguration message or BWP-related signaling when the terminal performs cell handover/beam switch/BWP switch.

In this implementation, a plurality of implementations in which the first network device sends the first parameter are provided. This can improve the flexibility of the solution.

According to a second aspect, an embodiment of this application provides a TA determining method, including: A second network device determines position coordinates of a compensation reference point based on a second delay compensation value, where the second delay compensation value is a value of delay compensation made by the second network device for receiving a signal sent by a terminal, the second delay compensation value is used to determine a TA used by the terminal for signal sending, and the TA is equal to a service link round-trip delay in an NTN minus the second delay compensation value; and the second network device sends the position coordinates of the compensation reference point.

In this embodiment of this application, the position coordinates of the compensation reference point are determined by the second network device based on the second delay compensation value, and the second delay compensation value is the value of delay compensation made by the second network device for receiving the signal sent by the terminal. Therefore, a case in which the second network device makes partial delay compensation for the signal sent by the terminal is considered when the terminal receives the position coordinates of the compensation reference point and determines the TA based on the position coordinates of the compensation reference point. This can improve precision of calculating the TA by the terminal, so as to further reduce ISI.

In a possible implementation, the second network device may further send a second parameter. The second parameter indicates a service link common round-trip delay of a beam or a cell covered by the second network device.

In this implementation, a terminal without a positioning function may obtain, based on the second parameter, the service link common round-trip delay of the beam or the cell covered by the second network device, and then use the service link common round-trip delay as a service link round-trip delay between the terminal without the positioning function and the second network device, to ensure that the terminal without a positioning function can also accurately calculate the TA.

In a possible implementation, that the second parameter indicates a service link common round-trip delay of a beam or a cell covered by the second network device includes: The second parameter is the service link common round-trip delay of the beam or the cell covered by the second network device; or the second parameter is used to determine the service link common round-trip delay of the beam or the cell covered by the second network device.

This implementation provides two possible manners of implementing the second parameter. This can improve the flexibility of the solution. In a possible implementation, the second parameter is used to determine the service link common round-trip delay of the beam or the cell covered by the second network device, and the second parameter is the position coordinates of a service link reference point. The common round-trip delay of the service link is determined based on a round-trip delay between the service link reference point and the second network device, and the round-trip delay between the service link reference point and the second network device is determined based on the position coordinates of the service link reference point and position coordinates of the second network device.

In this implementation, the terminal can determine the round-trip delay between the service link reference point and the second network device based on the position coordinates of the service link reference point and the position coordinates of the second network device. This implementation provides a novel indication manner for the service link common round-trip delay of the beam or the cell covered by the second network device, and implementation on a terminal side is simple.

In a possible implementation, the second network device may further send third indication information. The third indication information indicates that the second parameter is the service link common round-trip delay or position coordinates of a service link reference point.

In this implementation, the terminal device may determine, based on the third indication information, whether the second parameter is the service link common round-trip delay or the position coordinates of the service link reference point, and then calculate the TA for signal sending by using a corresponding algorithm. This can improve the flexibility of the solution and ensure reliability of the solution.

In a possible implementation, the second network device may send the position coordinates of the compensation reference point in an SIB1, OSI, or an MIB; the second network device may send the position coordinates of the first compensation reference point in RRC information, an RRC reconfiguration message, DCI, group DCI, a MAC element, or a TAC in an RRC connection phase; or the second network device may send the position coordinates of the compensation reference point in an RRC reconfiguration message or BWP-related signaling when the terminal performs cell handover/beam switch/BWP switch.

In this implementation, a plurality of implementations in which the second network device sends the position coordinates of the compensation reference point are provided. This can improve the flexibility of the solution.

According to a third aspect, an embodiment of this application further provides a TA determining method, including: An ATG network device determines position ATG reference point coordinates, where the position coordinates of the ATG reference point are used to determine a TA used by a terminal to send a signal to the ATG network device; and the ATG network device sends the position coordinates of the ATG reference point.

In this embodiment of this application, the ATG network device delivers the position coordinates of the ATG reference point to the terminal, so that the terminal can calculate the TA for signal sending based on the position coordinates of the ATG reference point. This can reduce ISI during ATG communication. In addition, because the ATG network device notifies the terminal of the position coordinates of the ATG reference point rather than position coordinates of the ATG network device, position privacy of the ATG network device can be protected, and ATG communication security can be improved.

According to a fourth aspect, an embodiment of this application provides a TA determining method, including: A terminal receives a first parameter, where the first parameter indicates a difference between a round-trip delay of a feeder link in a non-terrestrial network NTN and a first delay compensation value, the first delay compensation value is a delay compensation made by a first network device for receiving a signal sent by the terminal, and the difference is used to determine a TA used by the terminal for signal sending; and the terminal determines the TA for signal sending based on the first parameter.

In a possible implementation, that the first parameter indicates a difference between a round-trip delay of a feeder link in an NTN and the first delay compensation value includes: The first parameter is the difference between the round-trip delay of the feeder link in the NTN and the first delay compensation value; or the first parameter is used to determine the difference between the round-trip delay of the feeder link in the NTN and the first delay compensation value.

In a possible implementation, the first parameter is used to determine the difference between the round-trip delay of the feeder link in the NTN and the first delay compensation value, and the first parameter is the position coordinates of a compensation reference point. The difference is determined based on a round-trip delay between the compensation reference point and a second network device, and the round-trip delay between the compensation reference point and the second network device is determined based on the position coordinates of the compensation reference point and position coordinates of the second network device.

In a possible implementation, the method further includes: The terminal receives first indication information, where the first indication information indicates that the first parameter is the difference or the position coordinates of the compensation reference point; and the terminal determines, based on the first indication information, that the first parameter is the difference or the position coordinates of the compensation reference point.

In a possible implementation, the method further includes: The terminal receives second indication information, where the second indication information indicates that the difference is a positive value or a negative value; and the terminal determines, based on the second indication information, that the difference is a positive value or a negative value. The difference is a positive value when the first delay compensation value is less than the round-trip delay of the feeder link or the compensation reference point is located on the feeder link; or the difference is a negative value when the first delay compensation value is greater than the round-trip delay of the feeder link or the compensation reference point is located on a service link in the NTN.

In a possible implementation, the TA is a sum of a round-trip delay of the service link in the NTN and the difference; or a sum of the round-trip delay of the service link in the NTN, the difference, and an offset. The offset is related to a time division duplex TDD mode or a frequency division duplex FDD mode.

In a possible implementation, the method further includes: The terminal receives a second parameter. The second parameter indicates a service link common round-trip delay of a beam or a cell covered by the second network device.

In a possible implementation, that the second parameter indicates a service link common round-trip delay of a beam or a cell covered by the second network device includes: The second parameter is the service link common round-trip delay of the beam or the cell covered by the second network device; or the second parameter is used to determine the service link common round-trip delay of the beam or the cell covered by the second network device.

In a possible implementation, the second parameter is used to determine the service link common round-trip delay of the beam or the cell covered by the second network device, and the second parameter is the position coordinates of a service link reference point. The common round-trip delay of the service link is determined based on a round-trip delay between the service link reference point and the second network device, and the round-trip delay between the service link reference point and the second network device is determined based on the position coordinates of the service link reference point and the position coordinates of the second network device.

In a possible implementation, the method further includes: The terminal receives third indication information, where the third indication information indicates that the second parameter is the service link common round-trip delay or position coordinates of a service link reference point; and the terminal determines, based on the third indication information, that the second parameter is the service link common round-trip delay or the position coordinates of the service link reference point.

In a possible implementation, that the terminal receives the first parameter includes: The terminal receives a system information block SIB1, other system information OSI, or a master information block MIB, where the SIB1, the OSI, or the MIB carries the first parameter; the terminal receives RRC information, an RRC reconfiguration message, downlink control information DCI, group DCI, a medium access control MAC element, or a timing advance command TAC in a radio resource control RRC connection phase, where the RRC information, the RRC reconfiguration message, the DCI, the group DCI, the MAC element, or the TAC carries the first parameter; or the terminal receives an RRC reconfiguration message or BWP-related signaling when the terminal performs cell handover/beam switch/bandwidth part BWP switch, where the RRC reconfiguration message or the BWP-related signaling carries the first parameter.

According to a fifth aspect, an embodiment of this application provides a TA determining method, including: A terminal receives position coordinates of a compensation reference point, where a second delay compensation value is a value of delay compensation made by a second network device for receiving a signal sent by the terminal, the second delay compensation value is used to determine a TA used by the terminal for signal sending, and the TA is equal to a service link round-trip delay in an NTN minus the second delay compensation value; and the terminal determines the TA for signal sending based on the position coordinates of the compensation reference point.

In a possible implementation, the method further includes: The terminal receives a second parameter. The second parameter indicates a service link common round-trip delay of a beam or a cell covered by the second network device.

In a possible implementation, that the second parameter indicates a service link common round-trip delay of a beam or a cell covered by the second network device includes: The second parameter is the service link common round-trip delay of the beam or the cell covered by the second network device; or the second parameter is used to determine the service link common round-trip delay of the beam or the cell covered by the second network device.

In a possible implementation, the second parameter is used to determine the service link common round-trip delay of the beam or the cell covered by the second network device, and the second parameter is the position coordinates of a service link reference point. The common round-trip delay of the service link is determined based on a round-trip delay between the service link reference point and the second network device, and the round-trip delay between the service link reference point and the second network device is determined based on the position coordinates of the service link reference point and position coordinates of the second network device.

In a possible implementation, the method further includes: The terminal receives third indication information, where the third indication information indicates that the second parameter is the service link common round-trip delay or position coordinates of a service link reference point; and the terminal determines, based on the third indication information, that the second parameter is the service link common round-trip delay or the position coordinates of the service link reference point.

In a possible implementation, that the terminal receives the position coordinates of the compensation reference point includes: The terminal receives a system information block SIB1, other system information OSI, or a master information block MIB, where the SIB1, the OSI, or the MIB carries the position coordinates of the compensation reference point; the terminal receives RRC information, an RRC reconfiguration message, downlink control information DCI, group DCI, a medium access control MAC element, or a timing advance command TAC in a radio resource control RRC connection phase, where the RRC information, the RRC reconfiguration message, the DCI, the group DCI, the MAC element, or the TAC carries the position coordinates of the compensation reference point; or the terminal receives an RRC reconfiguration message or BWP-related signaling when the terminal performs cell handover/beam switch/ bandwidth part BWP switch, where the RRC reconfiguration message or the BWP-related signaling carries the position coordinates of the compensation reference point.

According to a sixth aspect, an embodiment of this application provides a TA determining method, including: A terminal receives position coordinates of an air-to-ground ATG reference point; and the terminal determines a TA for signal sending based on the position coordinates of the ATG reference point.

According to a seventh aspect, an embodiment of this application provides a communication apparatus. The apparatus may be the first network device in the first aspect, an apparatus (for example, a chip, a chip system, or a circuit) in the first network device, or an apparatus that can be used together with the first network device. The apparatus may include modules that one-to-one correspond with the methods/operations/steps/actions described in the first aspect and any possible implementation of the first aspect. The module may be a hardware circuit or software, or may be implemented by a hardware circuit in combination with software.

For example, the apparatus may include: a processing unit, configured to determine a first parameter based on a first delay compensation value, where the first delay compensation value is a delay compensation made by the first network device for receiving a signal sent by a terminal, the first parameter indicates a difference between a round-trip delay of a feeder link in a non-terrestrial network NTN and the first delay compensation value, and the difference is used to determine a TA used by the terminal for signal sending; and a sending unit, configured to send the first parameter.

According to an eighth aspect, an embodiment of this application provides a communication apparatus. The apparatus may be the second network device in the second aspect, an apparatus (for example, a chip, a chip system, or a circuit) in the second network device, or an apparatus that can be used together with the second network device. The apparatus may include modules that one-to-one correspond with the methods/operations/steps/actions described in the second aspect and any possible implementation of the second aspect. The module may be a hardware circuit or software, or may be implemented by a hardware circuit in combination with software.

For example, the apparatus may include: a processing unit, configured to determine position coordinates of a compensation reference point based on a second delay compensation value, where the second delay compensation value is a value of delay compensation made by the second network device for receiving a signal sent by a terminal, the second delay compensation value is used to determine a TA used by the terminal for signal sending, and the TA is equal to a service link round-trip delay in an NTN minus the second delay compensation value; and a sending unit, configured to send the position coordinates of the compensation reference point.

According to a ninth aspect, an embodiment of this application provides a communication apparatus. The apparatus may be the ATG network device in the third aspect, an apparatus (for example, a chip, a chip system, or a circuit) in the ATG network device, or an apparatus that can be used together with the ATG network device. The apparatus may include modules that one-to-one correspond with the methods/operations/steps/actions described in the third aspect and any possible implementation of the third aspect. The module may be a hardware circuit or software, or may be implemented by a hardware circuit in combination with software.

For example, the apparatus may include: a processing unit, configured to determine position ATG reference point coordinates, where the position coordinates of the ATG reference point are used to determine a TA used by a terminal to send a signal to the ATG network device; and a sending unit, configured to send the position coordinates of the ATG reference point.

According to a tenth aspect, an embodiment of this application provides a communication apparatus. The apparatus may be the terminal in the fourth aspect, an apparatus (for example, a chip, a chip system, or a circuit) in the terminal, or an apparatus that can be used together with the terminal. The apparatus may include modules that one-to-one correspond with the methods/operations/steps/actions described in the fourth aspect and any possible implementation of the fourth aspect. The module may be a hardware circuit or software, or may be implemented by a hardware circuit in combination with software.

For example, the apparatus may include: a receiving unit, configured to receive a first parameter, where the first parameter is used to indicate a difference between a round-trip delay of a feeder link in a non-terrestrial network NTN and a first delay compensation value, the first delay compensation value is a delay compensation made by a first network device for receiving a signal sent by the terminal, and the difference is used to determine a TA used by the terminal for signal sending; and a processing unit, configured to determine the TA for signal sending based on the first parameter.

According to an eleventh aspect, an embodiment of this application provides a communication apparatus. The apparatus may be the terminal in the fifth aspect, an apparatus (for example, a chip, a chip system, or a circuit) in the terminal, or an apparatus that can be used together with the terminal. The apparatus may include modules that one-to-one correspond with the methods/operations/steps/actions described in the fifth aspect and any possible implementation of the fifth aspect. The module may be a hardware circuit or software, or may be implemented by a hardware circuit in combination with software.

For example, the apparatus may include: a receiving unit, configured to receive position coordinates of a compensation reference point, where a second delay compensation value is a value of delay compensation made by a second network device for receiving a signal sent by the terminal, the second delay compensation value is used to determine a TA used by the terminal for signal sending, and the TA is equal to a service link round-trip delay in an NTN minus the second delay compensation value; and a processing unit, configured to determine the TA for signal sending based on the position coordinates of the compensation reference point.

According to a twelfth aspect, an embodiment of this application provides a communication apparatus. The apparatus may be the terminal in the sixth aspect, an apparatus (for example, a chip, a chip system, or a circuit) in the terminal, or an apparatus that can be used together with the terminal. The apparatus may include modules that one-to-one correspond with the methods/operations/steps/actions described in the sixth aspect and any possible implementation of the sixth aspect. The module may be a hardware circuit or software, or may be implemented by a hardware circuit in combination with software.

For example, the apparatus may include: a receiving unit, configured to receive position coordinates of an air-to-ground ATG reference point; and a processing unit, configured to determine a TA for signal sending based on the position coordinates of the ATG reference point.

According to a thirteenth aspect, an embodiment of this application provides a communication apparatus, including a processor and a communication interface. The communication interface is for communication with another communication apparatus. The processor is configured to run a group of programs, so that the method in the first aspect, the second aspect, the third aspect, the fourth aspect, the fifth aspect, or the sixth aspect and any possible implementation of the first aspect, the second aspect, the third aspect, the fourth aspect, the fifth aspect, or the sixth aspect is implemented.

According to a fourteenth aspect, an embodiment of this application provides a computer-readable storage medium. The computer-readable storage medium stores computer-readable instructions, and when the computer-readable instructions are executed on a communication apparatus, the method in the first aspect, the second aspect, the third aspect, the fourth aspect, the fifth aspect, or the sixth aspect and any possible implementation of the first aspect, the second aspect, the third aspect, the fourth aspect, the fifth aspect, or the sixth aspect is implemented.

According to a fifteenth aspect, an embodiment of this application provides a chip system. The chip system includes a processor, and may further include a memory, configured to implement the method in the first aspect, the second aspect, the third aspect, the fourth aspect, the fifth aspect, or the sixth aspect and any possible implementation of the first aspect, the second aspect, the third aspect, the fourth aspect, the fifth aspect, or the sixth aspect. The chip system may include a chip, or may include a chip and another discrete device.

According to a sixteenth aspect, an embodiment of this application provides a computer program product, including instructions. When the computer program product runs on a computer, the computer is enabled to perform the method in the first aspect, the second aspect, the third aspect, the fourth aspect, the fifth aspect, or the sixth aspect and any possible implementation of the first aspect, the second aspect, the third aspect, the fourth aspect, the fifth aspect, or the sixth aspect.

BRIEF DESCRIPTION OF DRAWINGS

FIG. 19, FIG. 20, FIG. 21A, FIG. 21B, FIG. 22, and FIG. 23 are schematic diagrams of structures in which a network side delivers signaling to a terminal according to an embodiment of this application;

DESCRIPTION OF EMBODIMENTS

Figure 1:
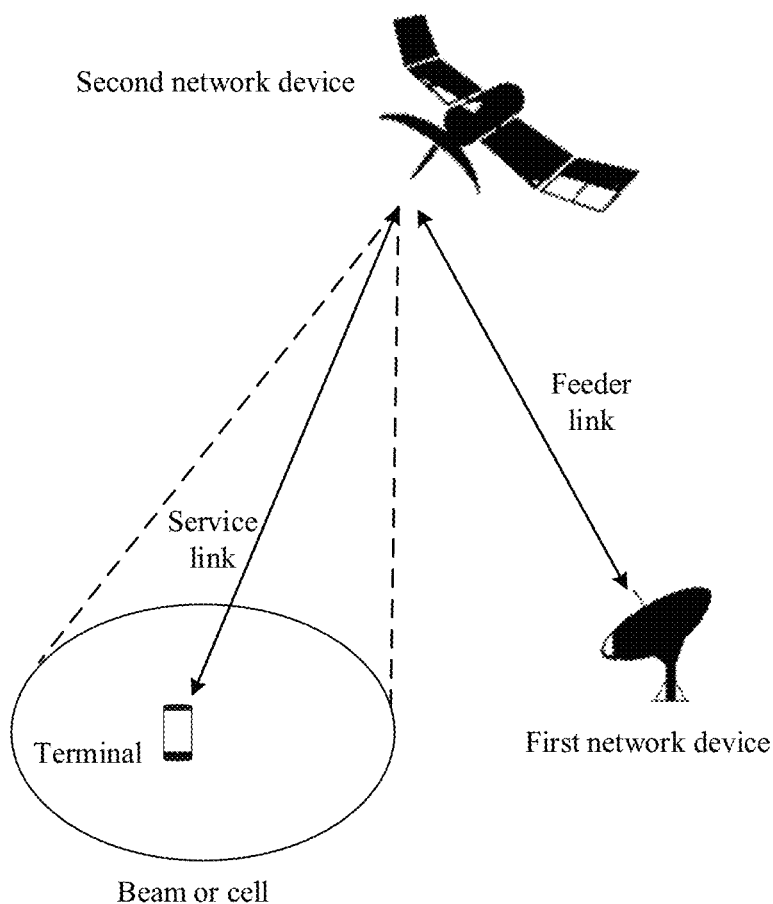
FIG. 1 is a schematic diagram of a possible network architecture of a non-terrestrial network communication system to which an embodiment of this application is applicable.

To implement global communication coverage of a 5th generation (5G) communication network, the 3rd Generation Partnership Project (3GPP) organization is studying adaptation of anew radio (NR) protocol to a non-terrestrial network (NTN). NTN communication includes satellite communication, air-to-ground (ATG) communication, and the like. Compared with terrestrial communication, NTN communication has different channel features, for example, a long transmission delay and a large Doppler frequency shift. For example, a round-trip delay of geostationary earth orbit (GEO) satellite communication (regeneration mode) is 238 ms to 270 ms. A round-trip delay of low earth orbit (LEO) satellite communication (orbit altitude 1200 km, regeneration mode) is 8 ms to 20 ms. In an ATG communication scenario, a maximum round-trip delay may also reach 1 ms.

Along round-trip delay causes inter-symbol interference (ISI) between uplink signals, and affects decoding performance on a network side. A terminal sends a random access preamble in an initial random access phase, and a network device returns a random access response (RAR). To reduce ISI, in a possible solution, the random access preamble is required to have a long cyclic prefix (not less than a round-trip delay) to ensure orthogonality between uplink signals of different terminals. However, a round-trip delay in an NTN communication scenario is excessively long, and it is difficult for the CP to meet the requirement. In another possible solution, when returning the random access response (RAR) to the terminal, the network device may indicate a timing advance (TA) value in the RAR, so that the terminal performs timing advance based on the TA, and a timing difference between the network device and each terminal is reduced. However, a current range of a TA adjustment value indicated by the network device in the RAR is 0 ms to 2 ms, and an indication range of the TA in the RAR decreases exponentially as subcarrier spacing increases. For a satellite communication scenario, a maximum indication range of 2 ms is insufficient to indicate a round-trip delay in the NTN communication scenario. If the TA indication range in the RAR is expanded, more signaling overheads are occupied. For an ATG communication scenario, when the subcarrier spacing is greater than 30 kHz, an indication range of the TA in the RAR is less than 1 ms, and is also insufficient to indicate a round-trip delay in the ATG communication scenario.

Therefore, in the conventional technology, before the terminal sends the random access preamble, the network device may first notify the terminal of a common timing advance value, and the terminal sends the random access preamble based on the common timing advance value. In this way, the timing difference between the network device and each terminal can be reduced, and a timing range in which an uplink signal of each terminal arrives at the network device can be reduced. Further, a requirement for the length of the cyclic prefix of the preamble and a requirement for the TA indication range in the RAR are lowered.

Currently, there are the following two solutions in which the network device notifies the terminal of the common timing advance value:

Solution 1: The network device broadcasts one common timing advance value, and the terminal directly uses the common timing advance value to send the random access preamble. In a transparent transmission mode (the satellite has no base station processing capability), the network device is a gateway, and the common timing advance value may be calculated based on a round-trip delay between a reference point-satellite-gateway. In a regeneration mode (the satellite has a base station processing capability), the network device is a satellite, and the common timing advance value may be calculated based on a round-trip delay between a reference point-satellite.

This solution is easy to implement, and the terminal may directly use the common timing advance value after receiving it. However, in actual application, the network device usually makes partial delay compensation for a signal sent by the terminal, and a delay that actually needs to be compensated for by the terminal is only a part of the common timing advance value. A terminal with a positioning function can calculate a round-trip delay between the terminal and the satellite, but cannot obtain a round-trip delay that is not compensated for between the satellite and the gateway. The terminal with a positioning function cannot accurately calculate the TA based on the common timing advance value, and ISI still exists after the terminal sends the signal.

Solution 2: The network device broadcasts two common timing advance values. One is a common timing advance value corresponding to a service link, and the other is a common timing advance value corresponding to a feeder link. The terminal performs timing advance on the service link based on the common timing advance value corresponding to the service link, and performs timing advance on the feeder link based on the common timing advance value corresponding to the feeder link.

Common timing advances for both the service link and the feeder link are specified in this solution. However, if the network device makes delay compensation for the signal sent by the terminal, and the delay compensation is a round-trip delay of all feeder links and some service links, the terminal with a positioning function cannot accurately calculate the TA either.

An embodiment of this application provides a TA determining method, to improve precision of calculating a TA by a terminal, and reduce ISI. The method may be applied to a 4th generation (4G) communication system, a 5th generation (5G) communication system, device-to-device (D2D) communication, machine-to-machine communication, or various future communication systems, for example, a 6th generation (6G) communication system.

The method provided in this embodiment of this application may be applied to a non-terrestrial network (NTN) communication system. FIG. 1 shows a schematic diagram of an architecture of a possible terrestrial network communication system to which an embodiment of this application is applicable. The communication system may include a terminal (or referred to as a user terminal or user equipment), a first network device, and a second network device. A communication link between the first network device and the second network device is a feedback link (or referred to as a feeder link); and a communication link between the second network device and the terminal is a service link.

The terminal may be a wireless terminal device that can receive scheduling and indication information from the network device, for example, a device configured to provide a user with voice and/or data connectivity, a handheld device with a wireless connection function, or another processing device connected to a wireless modem. The wireless terminal device may communicate with one or more core networks or the Internet through a radio access network (such as a radio access network, RAN). The wireless terminal device may be a mobile terminal device, for example a mobile telephone (also referred to as a "cellular" phone or a mobile phone), a computer, and a communication chip. For example, the wireless terminal device may be a portable, pocket-sized, handheld, computer built-in, or vehicle-mounted mobile apparatus that can exchange language and/or data with the radio access network. The terminal may be specifically a device such as a personal communication service (PCS) phone, a cordless phone, a session initiation protocol (SIP) phone, a wireless local loop (WLL) station, a personal digital assistant (PDA), a tablet computer (Pad), or a computer with a wireless transceiver function. The terminal may also include a subscriber unit, a subscriber station, a mobile station, a mobile console (MS), a remote station, an access point (AP), a remote terminal device (remote terminal), an access terminal device (access terminal), a user terminal device (user terminal), a user agent, a subscriber station (SS), customer premises equipment (CPE), a terminal, a mobile terminal (MT), and the like. Alternatively, the terminal device may be a wearable device, a terminal device in a next-generation communication system such as a 5G network, a terminal device in a future evolved public land mobile network (PLMN), a terminal device in an NR communication system, or the like.

The first network device may be a gateway (or referred to as a terrestrial station, an earth station, or a gateway), and may be configured to connect the first network device to a core network.

The second network device may be a satellite (or referred to as a satellite base station), a geostationary earth orbit (GEO) satellite, a medium earth orbit (MEO) satellite and a low earth orbit (LEO) satellite in a non-geostationary orbit (NGEO), a high-altitude communication platform (HAPS), or the like. This is not limited herein.

In this embodiment of this application, a communication mode of the second network device may include a regeneration mode and a transparent mode.

When the second network device is in the regeneration mode for communication, the second network device may be an artificial earth satellite, a high-altitude flight vehicle, or the like that serves as a base station for wireless communication, for example, an evolved NodeB (eNB), a 5G base station (gNB), and the like. The first network device may transparently transmit signaling between the second network device and a core network.

When the second network device is in the transparent transmission mode for communication, the first network device serves as a base station for wireless communication, and the second network device may serve as a relay of the base station and may transparently transmit a signal between the first network device and the terminal.

It should be understood that FIG. 1 shows only one first network device and one second network device. In actual use, an architecture with a plurality of first network devices and/or a plurality of second network device may be used according to a requirement. Each second network device may provide a service for one or more terminals, each second network device may correspond to one or more first network devices, and each first network device may correspond to one or more second network devices. This is not specifically limited in this application.

Figure 2:
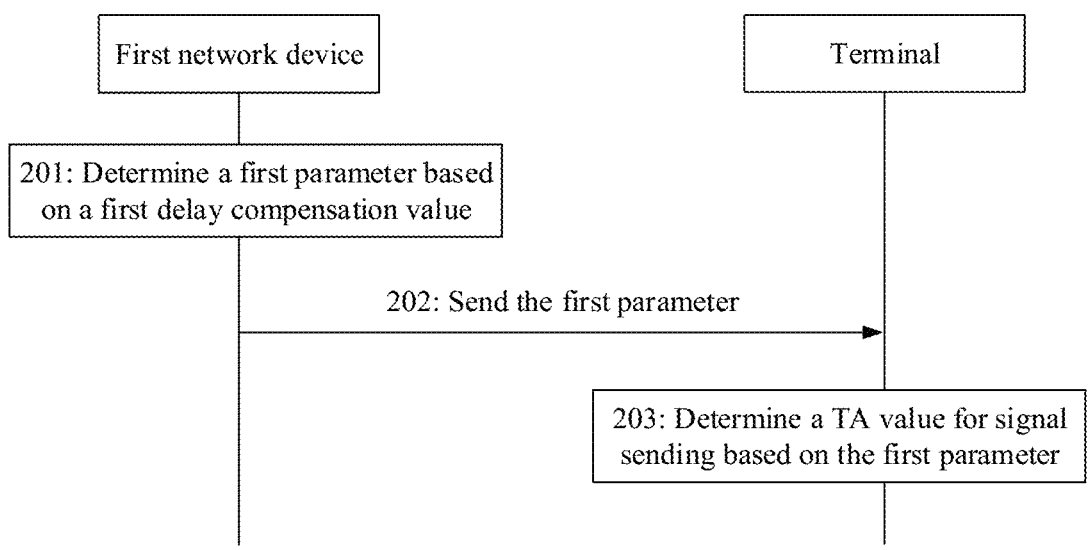
FIG. 2 is a flowchart of a TA determining method according to an embodiment of this application.

FIG. 2 shows a TA determining method according to an embodiment of this application. The method may be applied to the communication system shown in FIG. 1, and a second network device is in a transparent transmission mode for communication.

S201: A first network device determines a first parameter based on a first delay compensation value.

The first delay compensation value is a delay compensation made by the first network device for receiving a signal sent by a terminal. In other words, the first delay compensation value is a delay compensation made by the first network device when the first network device receives the signal sent by the terminal, to compensate for a timing difference caused by a service link round-trip delay and a round-trip delay of a feeder link. The delay compensation herein may be understood as a backward delay operation performed by the first network device on a receive window when the first network device receives the signal sent by the terminal, and a value of the backward delay of the receive window is the first delay compensation value. A sum of the round-trip delay of the service link and the round-trip delay of the feeder link should be greater than or equal to the first delay compensation value. The signal may be any signal sent by the terminal to the first network device, and includes but is not limited to a random access preamble.

The first parameter indicates a difference between a round-trip delay of a feeder link in an NTN and the first delay compensation value. In a possible indication manner, the first parameter is the difference between the round-trip delay of the feeder link and the delay compensation value. In another possible indication manner, the first parameter is used to determine the difference between the round-trip delay of the feeder link in the NTN and the delay compensation value. The difference may be used to determine a TA used by the terminal for signal sending.

S202: The first network device sends the first parameter, and the terminal receives the first parameter.

Specifically, the first network device may first send the first parameter to the second network device, and then the second network device forwards the first parameter to the terminal.

S203: The terminal determines the TA for signal sending based on the first parameter.

If the first parameter is the difference, the terminal may directly determine the TA for signal sending based on the difference and the round-trip delay of the service link. For example, a value obtained by subtracting the difference from the round-trip delay of the service link is used as the TA for signal sending.

If the first parameter is used to determine the TA used by the terminal for signal sending, the terminal needs to first determine the difference based on the first parameter, and then determine the TA for signal sending based on the determined difference and the round-trip delay of the service link.

In an optional implementation, when the first parameter is used to determine the difference between the round-trip delay of the feeder link in the NTN and the delay compensation value, the first parameter may be position coordinates of a compensation reference point. The difference is equal to a round-trip delay between the compensation reference point and the second network device. The terminal device may determine a distance between the compensation reference point and the second network device based on the position coordinates of the compensation reference point and position coordinates of the second network device, and then determine the round-trip delay between the compensation reference point and the second network device based on the distance between the compensation reference point and the second network device.

In an optional implementation, the first parameter may be the difference, or may be the position coordinates of the compensation reference point during a specific implementation, to improve the flexibility of the solution. The first network device may send first indication information to the terminal, to indicate that the first parameter is the difference or the position coordinates of the compensation reference point.

In this way, the terminal device may determine, based on the first indication information, whether the first parameter is the difference or the position coordinates of the compensation reference point, and then calculate the TA for signal sending by using a corresponding algorithm.

In an optional implementation, the first network device may further send second indication information to the terminal. The second indication information indicates that the difference is a positive value or a negative value.

When the first parameter is the difference, each time the first network device delivers the first parameter, the first network device sends one piece of second indication information to indicate whether the delivered first parameter is a positive or a negative value. The difference is a positive value when the first delay compensation value is less than the round-trip delay of the feeder link; or the difference is a negative value when the first delay compensation value is greater than the round-trip delay of the feeder link.

When the first parameter is the compensation reference point coordinates, the first network device may also send a piece of second indication information to indicate whether the difference is a positive or a negative value. Alternatively, whether the difference is a positive or a negative value may be reflected in whether coordinates are positive or negative. The difference is a positive value when the first delay compensation value is less than the round-trip delay of the feeder link or the compensation reference point is located on the feeder link; or the difference is a negative value when the first delay compensation value is greater than the round-trip delay of the feeder link or the compensation reference point is located on the service link in the NTN. The difference is 0 when the first delay compensation value is equal to the round-trip delay of the feeder link or the compensation reference point is located on the second network device. This case may be classified as a case in which the difference is a positive or a negative value.

Figure 3A:
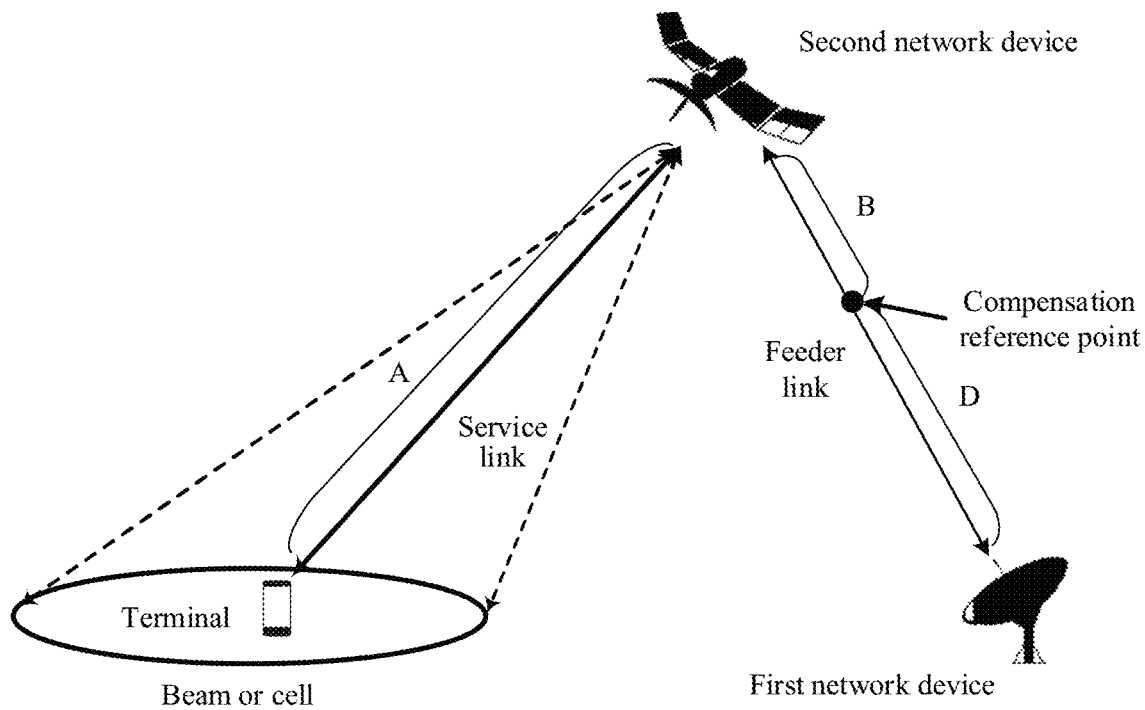
FIG. 3A and FIG. 3B are schematic diagrams of compensation reference points.

For example, FIG. 3A is a schematic diagram in which the compensation reference point is located on the feeder link. A represents the round-trip delay value of the service link, D represents the first delay compensation value, and B represents the difference between the round-trip delay of the feeder link and the first delay compensation value. In the case shown in FIG. 3A, the difference is a positive value.

Figure 3B:
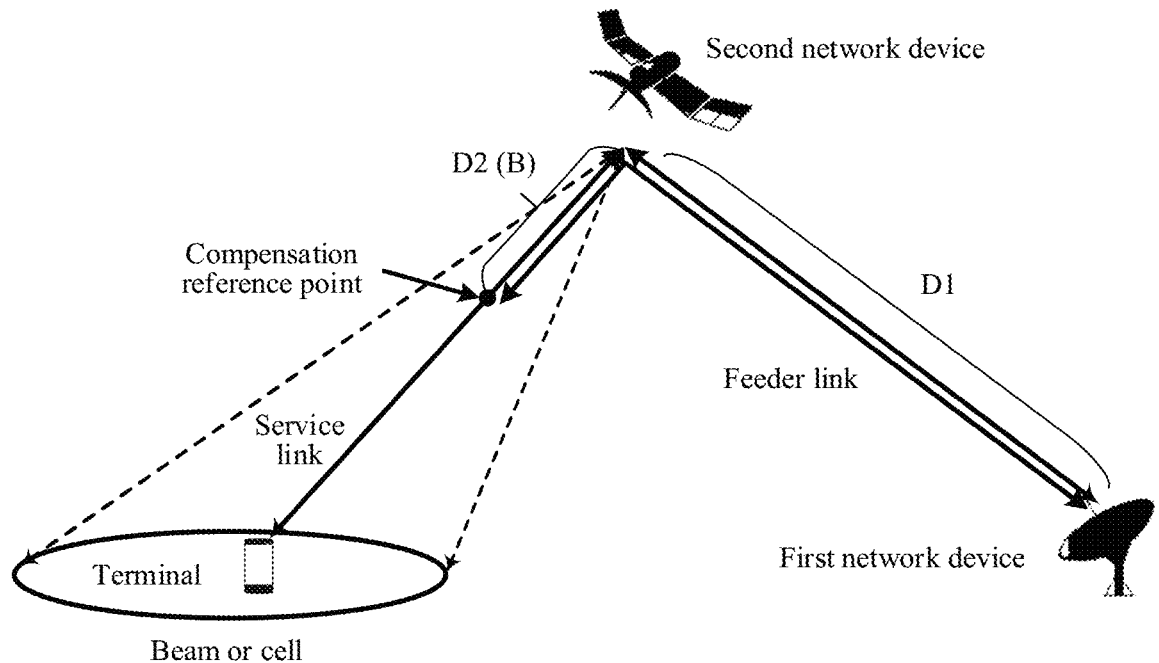

For example, FIG. 3B is a schematic diagram in which the compensation reference point is located on the service link. A represents the round-trip delay of the service link, and the first delay compensation value D=D1+D2, where D1 represents the round-trip delay of the feeder link, and D2 represents the round-trip delay between the compensation reference point and the second network device. B represents the difference between the round-trip delay of the feeder link and the first delay compensation value. In the case shown in FIG. 3B, B=−D2, and the difference is a negative value.

In an optional implementation, the first indication information and the second indication information are included in one piece of indication information. For example, the first indication information and the second indication information are two different fields in one piece of indication information.

In an optional implementation, the first network device may not indicate whether the difference is a positive or a negative value. Instead, the terminal and the network device agree in advance that the difference is equal to the round-trip delay of the feeder link minus the first delay compensation value or equal to the first delay compensation value minus the round-trip delay of the feeder link, and agree that the terminal performs addition calculation or subtraction calculation on the received difference after receiving the difference.

In an optional implementation, the TA is calculated in a manner including but not limited to the following three manners: Manner 1: The TA is equal to a sum of the round-trip delay of the service link and the difference; Manner 2: The TA is equal to a sum of the round-trip delay of the service link in the NTN and an offset; Manner 3: The TA is equal to a sum of the round-trip delay of the service link in the NTN, the difference, and an offset. The offsets in Manner 2 and Manner 3 are related to a time division duplex (TDD) mode or a frequency division duplex (FDD) mode.

In conventional technologies, the timing advance used by the terminal is TA=$(N_{TA}+N_{TAoffset})*16*Ts/2T$. $N_{TA}$ (which may also be written as NTA in this specification) is a TA adjustment value obtained by the terminal based on a parameter indicated by the first network device, for example, the TA calculated by the terminal based on the first parameter sent by the first network device in this application. $N_{TAoffset}$ (which may also be written as NTAoffset in this specification) represents a timing interval from uplink transmission to downlink transmission, and is sent to the terminal in SIB information. For the FDD mode, NTAoffset=0; and for the TDD mode, NTAoffset=624. The time interval may enable a base station to have sufficient time to switch between receiving an uplink signal and sending a downlink signal. Ts represents $1/(15e3\times2048)$ seconds. μ is related to subcarrier spacing, that is, the subcarrier spacing is $2^{\mu} \cdot 15$ kHz. Therefore, in this solution, the TA obtained by the terminal through calculation based on the first parameter sent by the first network device may alternatively be added to a fixed value (for example, NTAoffset) and then the sum is used as the TA used by the terminal for signal sending.

In this embodiment of this application, the terminal may be a terminal with or without a positioning function. This is not limited in this application.

For a terminal with a positioning function, such terminal may calculate a distance between the terminal and the second network device based on the positioning function, so as to calculate a round-trip delay between the terminal and the second network device, and use the round-trip delay as a service link round-trip delay.

Figure 4:
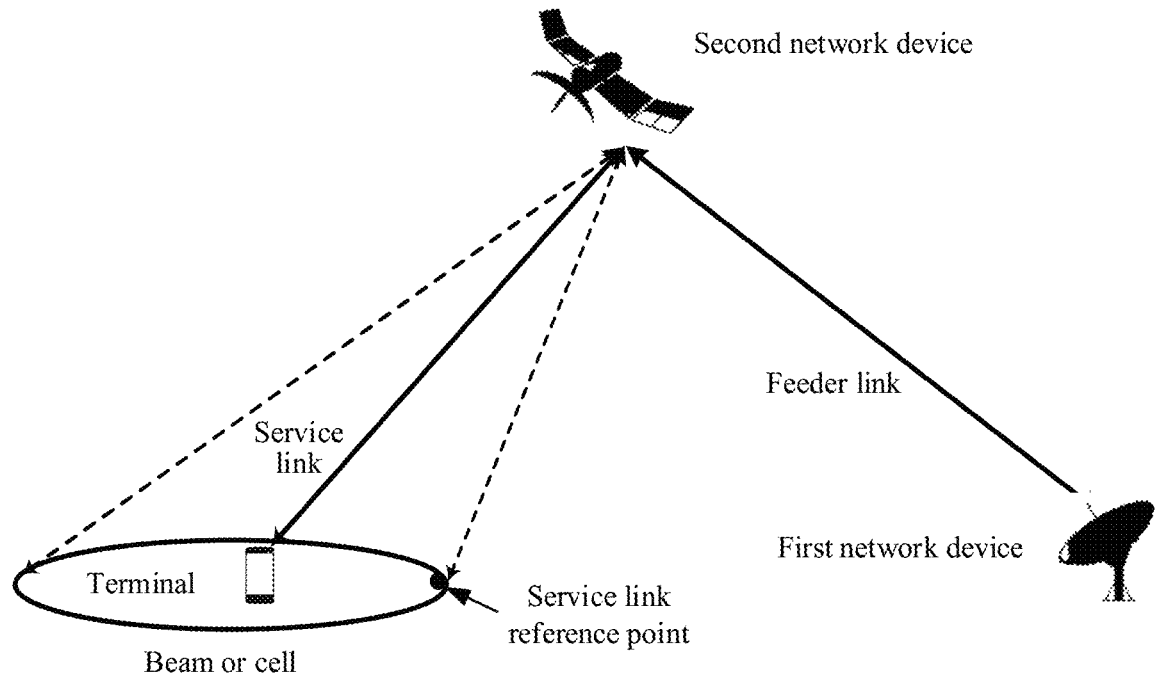
FIG. 4 is a schematic diagram of a service link common round-trip delay.

For a terminal without a positioning function, the network device may deliver a second parameter. The second parameter indicates a service link common round-trip delay of a beam or a cell covered by the second network device. In a possible indication manner, the second parameter is the service link common round-trip delay of the beam or the cell covered by the second network device. In another possible indication manner, the second parameter is used to determine the service link common round-trip delay of the beam or the cell covered by the second network device. Further, such terminal may use the service link common round-trip delay as a round-trip delay of a service link between the terminal and the second network device. For example, refer to FIG. 4. A round-trip delay between the second network device and a reference point that is in the beam or the cell covered by the second network device and that is closest to the second network device may be selected as the service link common round-trip delay.

In an optional implementation, when the second parameter is used to determine the service link common round-trip delay of the beam or the cell covered by the second network device, the second parameter is the position coordinates of the service link reference point. The common round-trip delay of the service link is determined based on a round-trip delay between the service link reference point and the second network device, and the round-trip delay between the service link reference point and the second network device is determined based on the position coordinates of the service link reference point and the position coordinates of the second network device.

The second parameter may be the service link common round-trip delay, or may be the position coordinates of the service link reference point during a specific implementation, to improve the flexibility of the solution. For example, in a non-gaze mode of satellite communication, a coverage area of the beam/cell of the satellite moves with the movement of the satellite, and the service link reference point also moves with the satellite. In this case, the distance between the satellite and the service link reference point remains unchanged, and the round-trip delay remains unchanged. Sending the service link common round-trip delay to the UE avoids frequent change of the sent position coordinates of the service link reference point, and reduces system complexity. However, in a gaze mode of satellite communication, the service link reference point remains unchanged within a time period in which the beam/cell continuously covers an area. Therefore, sending the position coordinates of the service link reference point to the UE is more conducive to reducing system complexity for signaling transmission.

In an optional implementation, the first network device may send third indication information to the terminal, to indicate whether the second parameter is the service link common round-trip delay or the position coordinates of the service link reference point. In this way, the terminal device may determine, based on the third indication information, whether the second parameter is the service link common round-trip delay or the position coordinates of the service link reference point, and then calculate the TA for signal sending by using an algorithm corresponding to the determined common round-trip delay of the service link or the determined position coordinates of the service link reference point.

In an optional implementation, the first indication information and/or the second indication information, and the third indication information is included in one piece of indication information. For example, the first indication information, the second indication information, and the third indication information are three different fields in one piece of indication information. In this embodiment of this application, the first network device may send the foregoing parameters (including the first parameter/the second parameter) and/or the indication information (including the first indication information/the second indication information/the third indication information) to the terminal in the following several manners.

Manner 1: The parameters and the indication information are carried in broadcast information such as a system information block (SIB) 1, other system information (OSI), or a master information block (MIB), and is sent to the terminal in a unicast, broadcast, or multicast manner.

Manner 2: The first network device sends the parameters and the indication information to the terminal in RRC information, an RRC reconfiguration message, downlink control information (DCI), group DCI, a medium access control (MAC) element, or a timing advance command (TAC) in a radio resource control (RRC) connection phase, or sends the parameter and the indication information to the UE along with data transmission or on a separately allocated PDSCH bearer.

Manner 3: The first network device may send the parameters and the indication information in an RRC reconfiguration message or BWP-related signaling when the terminal performs cell handover/beam switch/bandwidth part (BWP) switch.

The foregoing describes a technical solution when the second network device is in the transparent transmission mode. The following describes a technical solution when the second network device is in a regeneration mode.

In the foregoing solution, the first parameter is the difference between the round-trip delay of the feeder link and the delay compensation value, or the first parameter may be used to determine the difference between the round-trip delay of the feeder link and the delay compensation value. Therefore, a case in which the first network device makes a partial delay compensation for the signal sent by the terminal is considered when the terminal determines the TA for signal sending based on the first parameter. Therefore, the terminal may calculate the TA more accurately. This can reduce ISI.

Figure 5:
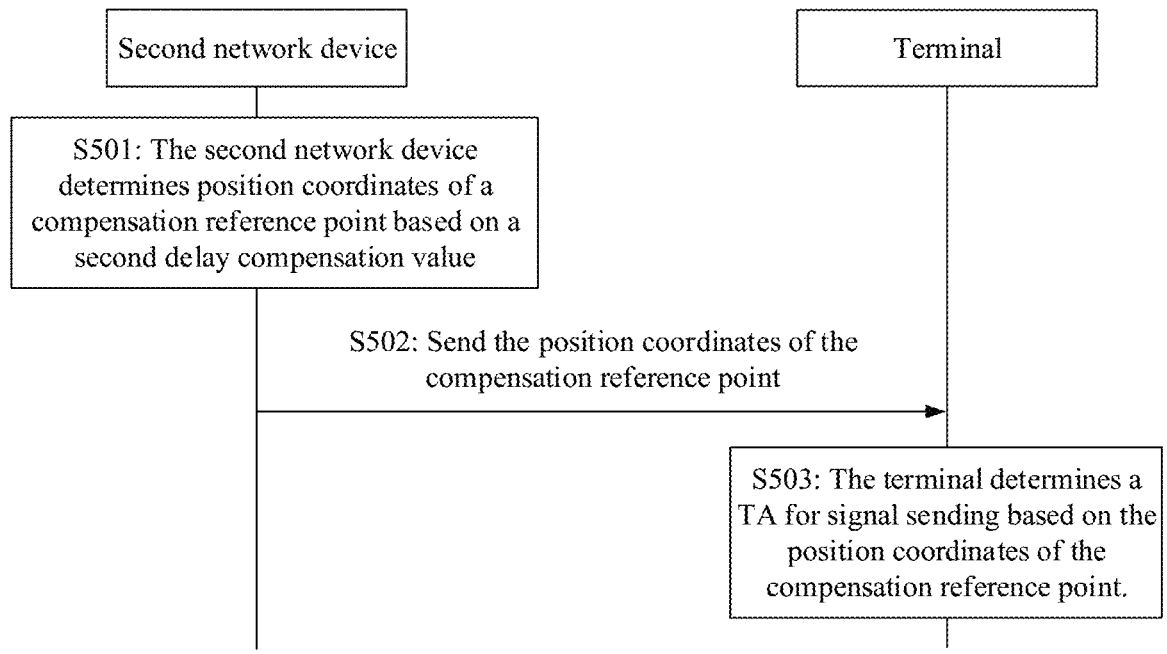
FIG. 5 is a flowchart of another TA determining method according to an embodiment of this application.

FIG. 5 shows another TA determining method according to an embodiment of this application. The method may be applied to the communication system shown in FIG. 1, and a second network device is in a regeneration mode for communication.

S501: The second network device determines position coordinates of a compensation reference point based on a second delay compensation value.

The second delay compensation value is a value of delay compensation made by the second network device for receiving a signal sent by a terminal, and may be equal to a round-trip delay between the compensation reference point and the second network device. In other words, the second delay compensation value is a delay compensation made by the second network device when the second network device receives the signal sent by the terminal, to compensate for a timing difference caused by a round-trip delay of a service link. The delay compensation herein may be understood as a backward delay operation performed by the second network device on a receive window when the second network device receives the signal sent by the terminal, and a value of the backward delay of the receive window is the second delay compensation value. The round-trip delay of the service link should be greater than or equal to the second delay compensation value. The signal may be any signal sent by the terminal to the second network device, and includes but is not limited to a random access preamble.

S502: The second network device sends the position coordinates of the compensation reference point, and the terminal receives the position coordinates of the compensation reference point.

S503: The terminal determines a TA for signal sending based on the position coordinates of the compensation reference point.

Figure 6:
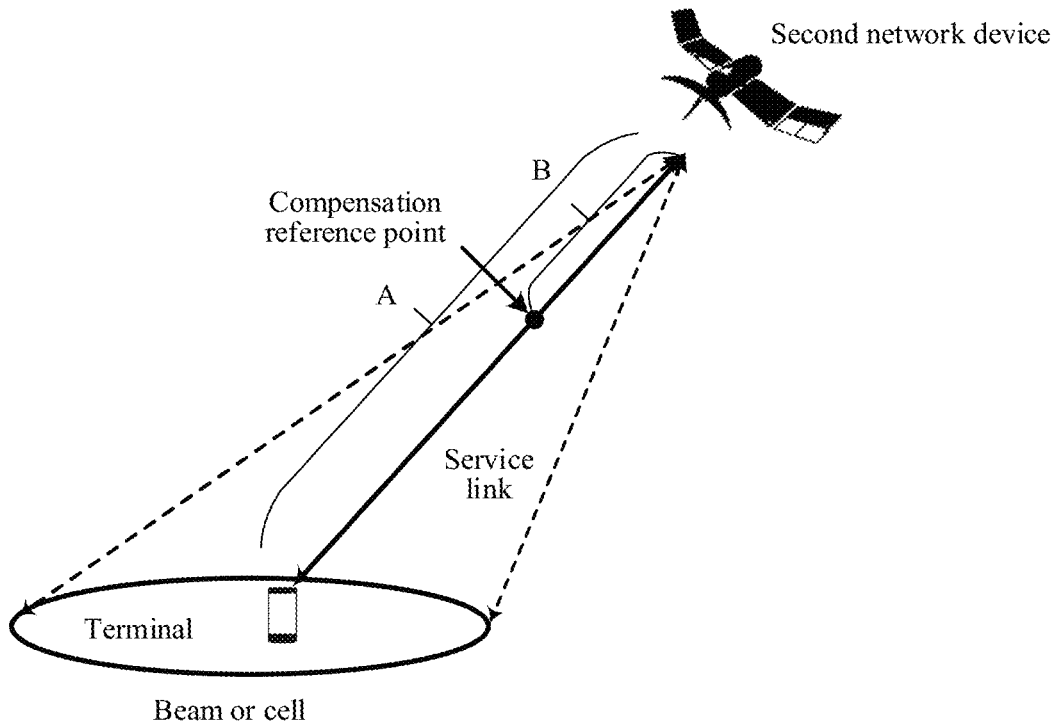
FIG. 6 is a schematic diagram of a round-trip delay between a compensation reference point and a second network device.

Specifically, the terminal calculates a round-trip delay between the compensation reference point and the second network device based on the position coordinates of the compensation reference point, to obtain the second delay compensation value, and then determines the TA for signal sending based on the round-trip delay of the service link and the second delay compensation value. For example, refer to FIG. 6. The compensation reference point is located on the service link, and a round-trip delay B between the compensation reference point and the second network device represents the value of delay compensation made by the second network device for receiving the signal sent by the terminal. In this case, the TA used by the terminal for signal sending may be equal to the round-trip delay of the service link minus the second delay compensation value, that is, A−B.

Similar to the foregoing transparent transmission mode, in the regeneration mode, the terminal may be a terminal with or without a positioning function. This is not limited in this application. For a terminal with a positioning function, such terminal may calculate a distance between the terminal and the second network device based on the positioning function, so as to calculate a round-trip delay between the terminal and the second network device, and use the round-trip delay as a round-trip delay of a service link. For a terminal without a positioning function, the network device may deliver a second parameter. The second parameter is a service link common round-trip delay of a beam or a cell covered by the second network device, or the second parameter is used to determine the service link common round-trip delay of the beam or the cell covered by the second network device. Such terminal may use the service link common round-trip delay as a round-trip delay of a service link between the terminal and the second network device. For a specific implementation of the second parameter, refer to the specific implementation of the second parameter in the transparent transmission mode. Details are not described herein again.

Similarly, in the regeneration mode, the second network device may also send third indication information to the terminal. The third indication information indicates that the second parameter is the service link common round-trip delay or the position coordinates of the service link reference point.

Similarly, in the regeneration mode, the second network device may deliver the parameter or the information in the foregoing three manners in the transparent transmission mode. For example, the second network device sends the position coordinates of the compensation reference point to the terminal in an SIB1, OSI, or a MIB; the second network device sends the position coordinates of the compensation reference point to the terminal in RRC information, an RRC reconfiguration message, DCI, group DCI, a MAC element, or a TAC in an RRC connection phase; or the second network device sends the position coordinates of the compensation reference point to the terminal in an RRC reconfiguration message or BWP-related signaling when the terminal performs cell handover/beam switch/BWP switch.

In an alternative implementation, the second network device may directly send the second delay compensation value to the terminal, so that the terminal directly calculates the TA for signal sending based on the second delay compensation value.

In the foregoing solution, the second network device delivers the position coordinates of the compensation reference point, so that the terminal can calculate the round-trip delay between the compensation reference point and the second network device based on the position coordinates of the compensation reference point, to obtain the second delay compensation value. In this way, a case in which a network side makes partial delay compensation for the signal sent by the terminal is considered when the terminal calculates the TA for signal sending based on the position coordinates of the compensation reference point. Therefore, the terminal may calculate the TA more accurately, so as to reduce ISI.

In this embodiment of this application, the regeneration mode and the transparent transmission mode may not be distinguished for the terminal, or the terminal considers the first network device and the second network device as a whole (the network side). After receiving the parameter (for example, the position coordinates of the compensation reference point, the difference, the second delay compensation value, the first indication information, or the second indication information) from the network side, the terminal directly determines the TA for signal sending based on the received parameter. In other words, the two solutions shown in FIG. 5 and FIG. 2 may be combined into one solution for implementation.

Figure 7:
FIG. 7 is a flowchart of still another TA determining method according to an embodiment of this application.

For example, FIG. 7 shows still another TA determining method according to an embodiment of this application. The method may be applied to the communication system shown in FIG. 1.

S701: A terminal receives a third parameter and second indication information.

For example, the third parameter may be position coordinates of a compensation reference point (in a regeneration mode or a transparent transmission mode), a difference (in a transparent transmission mode), or a second delay compensation value (in a regeneration mode). The second indication information may indicate whether the third parameter (the difference or the second delay compensation value) is a positive or a negative value, or indicate whether the difference or the second delay compensation value that is determined based on the third parameter is a positive or a negative value.

S702: The terminal determines a TA for signal sending based on the third parameter and the second indication information.

For example, if the third parameter is the difference, after a positive sign or a negative sign is added before the difference based on the second indication information, summation or subtraction calculation is performed on the difference and a service link round-trip delay, so as to determine the TA for signal sending. If the third parameter is the second delay compensation value, after a positive sign or a negative sign is added before the second delay compensation value based on the second indication information, summation or subtraction calculation is performed on the second delay compensation value and the round-trip delay of the service link, so as to determine the TA for signal sending. If the third parameter is the position coordinates of the compensation reference point, after the difference or the second delay compensation value is determined based on the position coordinates of the compensation reference point, a negative sign or a positive sign is added before the difference or the second delay compensation value based on the second indication information, and then summation or subtraction calculation is performed on the difference or the second delay compensation value and the round-trip delay of the service link, so as to determine the TA for signal sending.

It should be understood that various possible implementations in the method embodiment shown in FIG. 2 or FIG. 5 may be referenced in this method embodiment. For example, for a terminal without a positioning function, position coordinates of a service link reference point may be further received from a network side, and then a round-trip delay between the service link reference point and a second network device, that is, a common round-trip delay of the service link, is determined based on the position coordinates of the service link reference point and position coordinates of the second network device. Such terminal may use the service link common round-trip delay as a service link round-trip delay between the terminal and the second network device. For a terminal with a positioning function, a distance between the terminal and the second network device may be calculated based on the positioning function, so as to calculate a round-trip delay between the terminal and the second network device, and use the round-trip delay as a service link round-trip delay. For a specific method, refer to the foregoing related part. Details are not described herein again.

In this embodiment of this application, the terminal can calculate the TA accurately without distinguishing (or in other words, without learning) whether the second network device is in the transparent transmission mode or the regeneration mode. To be specific, after receiving the parameter, the terminal directly calculates the parameter to determine the TA for signal sending. This reduces implementation difficulty on a terminal side.

In conventional technologies, a solution in which a network device broadcasts a common timing advance value is generally applied to a satellite communication system. For an ATG communication system, because an ATG network device covers a large area (at an altitude of generally 6-12 km, and with a diameter about 100-300 km), terminals at different positions within the coverage area of the ATG network device differ greatly from each other in a difference between a terminal and the ATG network device. Therefore, the solution of broadcasting the common timing advance value is not applicable to ATG communication.

In view of this, an embodiment of this application further provides a TA determining method, so that a terminal in an ATG network determines a TA for signal sending.

Figure 8:
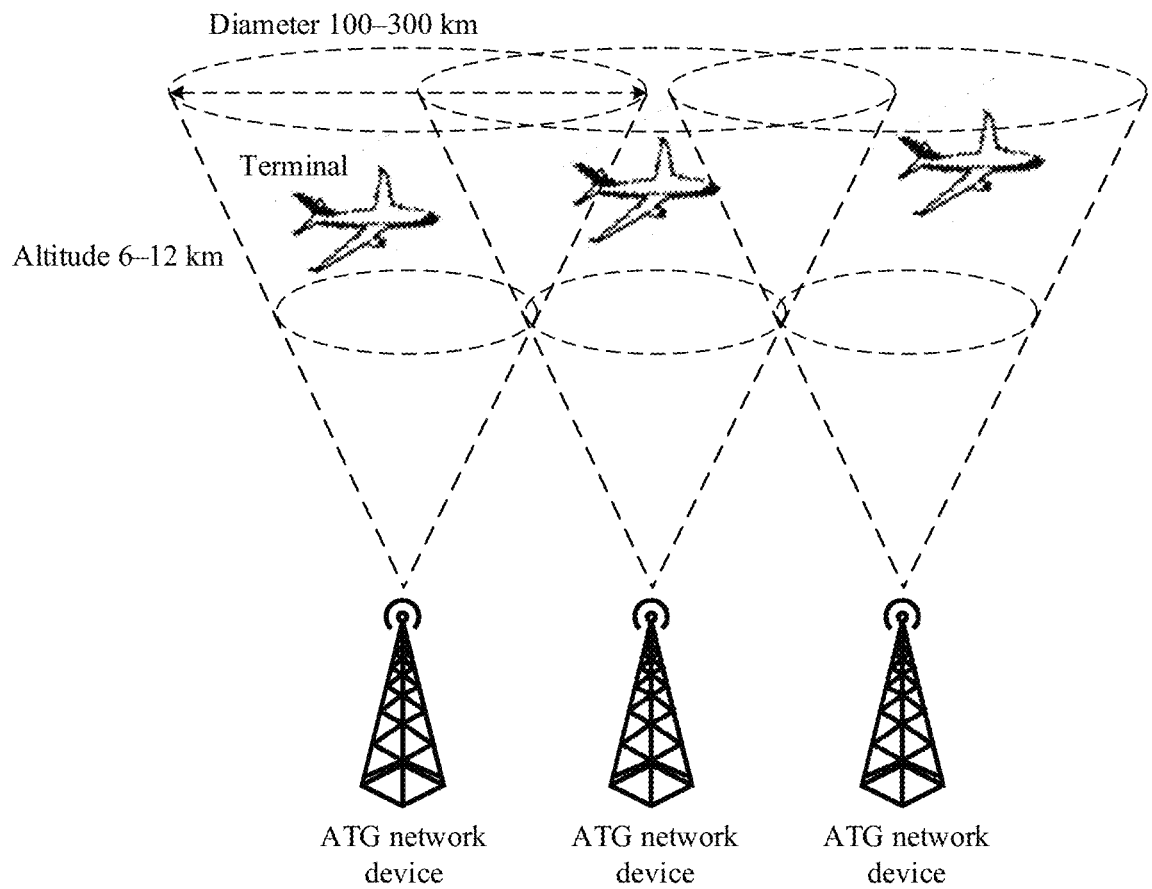
FIG. 8 is a schematic diagram of a network architecture of an ATG communication system to which an embodiment of this application is applicable.
Figure 9:
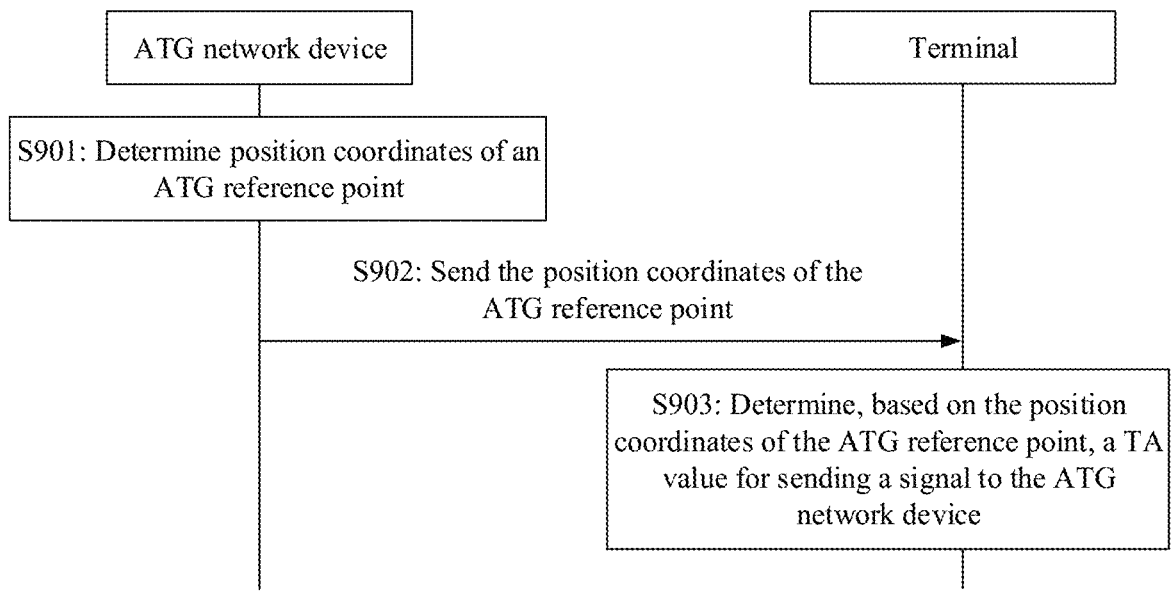
FIG. 9 is a flowchart of yet another TA determining method according to an embodiment of this application.

The solution may be applied to the ATG communication system. For example, FIG. 8 is a schematic diagram of a network architecture of an ATG communication system to which an embodiment of this application is applicable. The ATG communication system includes an air-to-ground ATG network device and a terminal. The ATG network device includes a terrestrial base station, and the terminal includes a high-altitude mobile terminal, for example, a high-altitude airplane. Refer to FIG. 9. The method includes the following steps.

S901: An ATG network device determines position ATG reference point coordinates.

The position coordinates of the ATG reference point may be understood as virtual position coordinates of the ATG network device. A distance between the position coordinates of the ATG reference point and position coordinates of the ATG network device meets a preset range, for example, is less than a preset distance value.

S902: The ATG network device sends the position coordinates of the ATG reference point to a terminal.

For a specific implementation in which the ATG network device delivers the ATG reference point, refer to the foregoing specific implementation in which the first network device or the second network device delivers the position coordinates of the compensation reference point or the service link reference point. Details are not described herein again.

S903: The terminal determines, based on the position coordinates of the ATG reference point, a TA for sending a signal to the ATG network device.

Specifically, the terminal calculates a round-trip delay between the ATG reference point and the terminal based on position coordinates of the terminal and the position coordinates of the ATG reference point, and determines the round-trip delay as the TA for sending the signal to the ATG network device, or adds an offset to the round-trip delay and uses the round-trip delay as the TA for sending the signal to the ATG network device.

In the foregoing solution, the ATG network device delivers the position coordinates of the ATG reference point to the terminal, so that the terminal can calculate the TA for signal sending based on the position coordinates of the ATG reference point. In addition, because the ATG network device notifies the terminal of the position coordinates of the ATG reference point rather than position coordinates of the ATG network device, position privacy of the ATG network device can be protected, and ATG communication security can be improved.

During a specific implementation, both an ATG system and a satellite system belong to an NTN communication system. Therefore, technical solutions in an ATG communication scenario and technical solutions in a satellite communications scenario may be combined for implementation.

Figure 10:
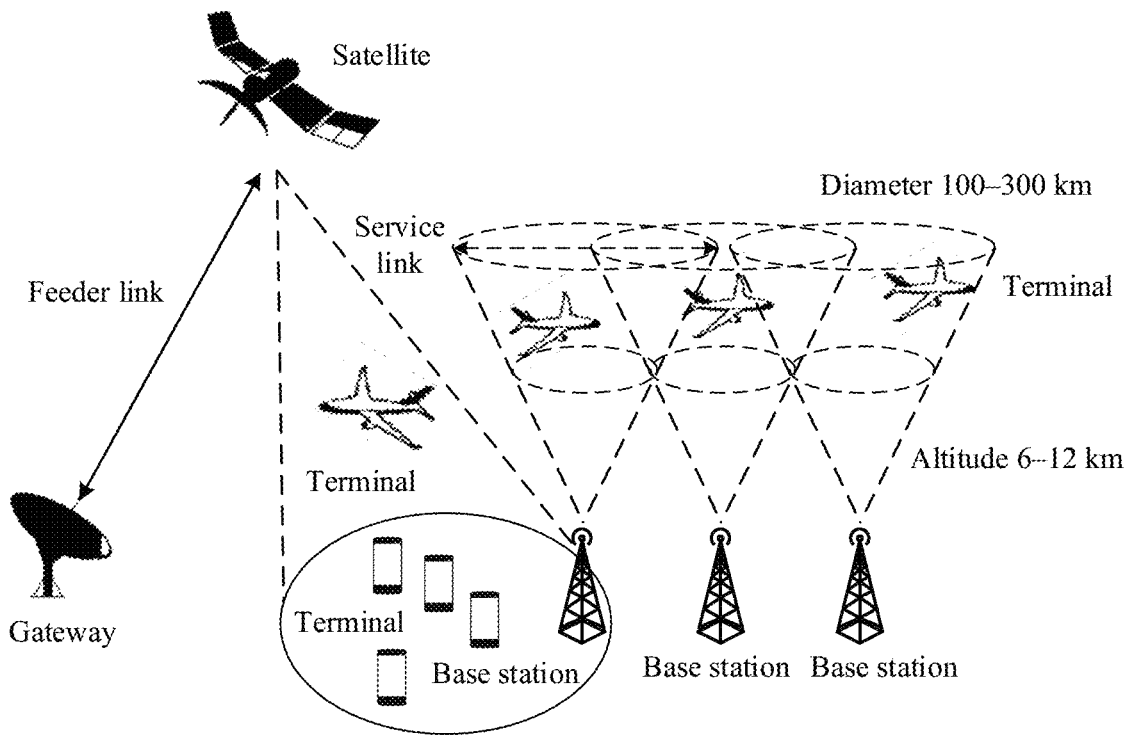
FIG. 10 is a schematic diagram of a network architecture of an NTN to which an embodiment of this application is applicable.

FIG. 10 is a schematic diagram of a network architecture of an NTN to which an embodiment of this application is applicable. The communication system includes a device (such as a satellite, a gateway, and a terminal) in a satellite communication system and a device (such as a base station and a terminal) in an ATG communication system.

Figure 11:
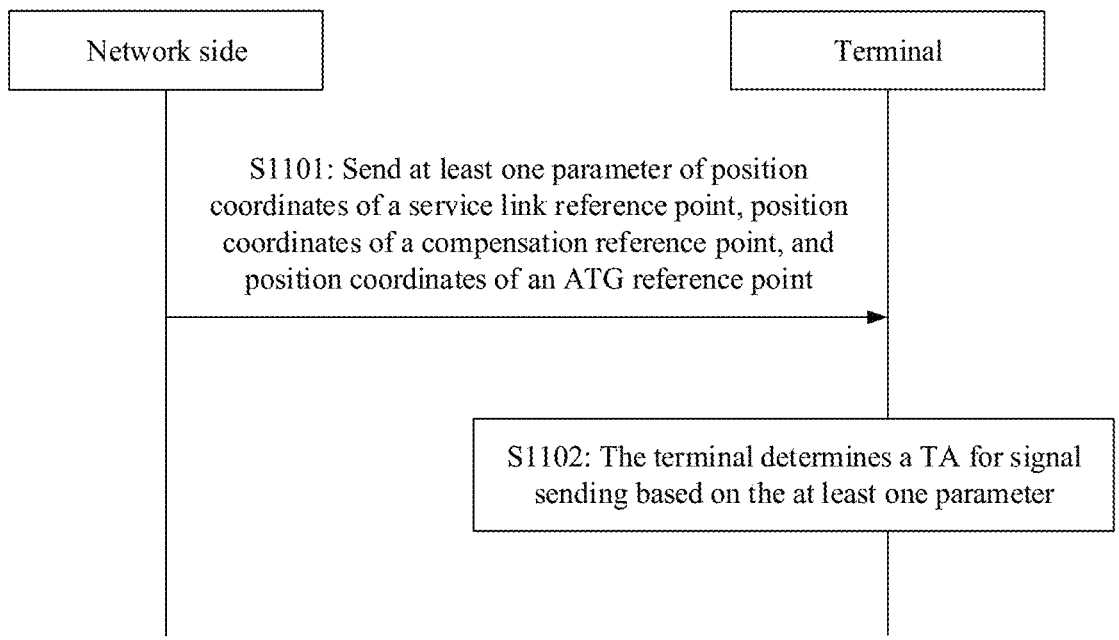
FIG. 11 is a flowchart of still yet another TA determining method according to an embodiment of this application.

FIG. 11 shows still yet another TA determining method according to an embodiment of this application. The method may be applied to the communication system shown in FIG. 10.

S1101: A network side sends at least one parameter of position coordinates of a service link reference point (service link reference point position coordinates for short), position coordinates of a compensation reference point (compensation reference point position coordinates), and position ATG reference point coordinates (ATG reference point position coordinates) to a terminal, and the terminal receives the at least one parameter.

The network side may be any one or more network devices in an NTN system, for example, a satellite, a gateway, or a base station. The terminal may be a terrestrial user terminal (such as a mobile phone, a computer, or an in-vehicle device), or may be a high-altitude user terminal (such as a high-altitude airplane).

The service link reference point is intended for a terminal without a positioning function, and is used by such terminal to calculate a round-trip delay between a satellite and the service link reference point, to obtain a service link common round-trip delay (or a timing advance adjustment value of the service link). The common round-trip delay may be used as a round-trip delay of the service link. The service link reference point may be a point within a coverage area of a beam/cell, or may be a point on a horizontal plane or at a fixed altitude higher than the horizontal plane according to a requirement, and may be determined according to a network deployment requirement.

Compensation reference point: (1) When the compensation reference point is on a feeder link, a round-trip delay between the gateway and the compensation reference point is a value of delay compensation made by the network side on an uplink signal (that is, the first delay compensation value in the foregoing description). (2) When the compensation reference point is on a service link, for a transparent transmission mode, a round-trip delay between the gateway-satellite-compensation reference point is a value of delay compensation made by the network side on an uplink signal (that is, the foregoing first delay compensation value); and for a regeneration mode, a round-trip delay between the satellite-compensation reference point is a value of delay compensation made by the network side on an uplink signal (that is, the foregoing second delay compensation value). The compensation reference point may be on the service link or the feeder link, and may be determined based on the value of delay compensation made by the network side for the signal sent by the terminal.

ATG reference point: The terminal obtains the TA used by the terminal based on a terminal position and a round-trip delay of the ATG reference point. Any position (which may include position coordinates of the base station) in a coverage area of an ATG beam or cell may be selected as the ATG reference point according to a system requirement.

S1102: The terminal determines the TA for signal sending based on the at least one parameter.

In a possible implementation, the terminal (for example, an airplane or a terrestrial mobile terminal) may perform the following calculation based on the received reference point coordinates.

(1) A round-trip delay value A of the service link (or a timing advance adjustment value of the service link) is calculated based on a satellite position (which is obtained from an ephemeris or satellite coordinates) and the service link reference point, where A is a positive number. For ease of description, A may be referred to as a service link common timing advance value below.

(2) A round-trip delay value B between the satellite and the compensation reference point is calculated based on the satellite position and the compensation reference point. If the compensation reference point is on the feeder linker, B is a positive value. If the compensation reference point is on the service link, B is a negative value. Whether B is a positive or a negative value may be indicated to the UE by using the foregoing second indication information.

If the satellite is in the transparent transmission mode, B is a difference between a round-trip delay of the feeder link and a value of delay compensation made by the satellite for a signal sent by the terminal. If the satellite is in the regeneration mode, B is a value of delay compensation made by the satellite for a signal sent by the terminal, where a negative sign is added before the value.

For ease of description, B may be referred to as a common compensation timing advance value below.

(3) A round-trip delay value C between the terminal and the ATG reference point is calculated based on the terminal position and ATG reference point, where C is a positive number.

In another possible implementation, the network side may directly send A, B, or C, that is, the at least one parameter may include A, B, or C. For example, the network side delivers B, but does not deliver the compensation reference point coordinates.

Further, the terminal may select, based on different communication scenarios (such as ATG communication and satellite communication), different parameters from A, B, and C to calculate the TA for signal (such as random access preamble) sending.

In an example, the terminal is in a satellite communication scenario.

(1) If the terminal has the positioning function, the terminal may calculate a timing advance TA_cal of the service link based on the ephemeris, and then calculate the TA based on the TA_cal and B, for example: TA=TA_cal+B.

(2) If the terminal does not have the positioning function, the terminal may calculate the TA based on A and B, for example, TA=A+B.

In an example, the terminal is in a satellite communication scenario.

The terminal may calculate the TA based on C, for example: TA=C.

The following describes specific implementations of the method shown in FIG. 11 in detail by using several specific embodiments.

Embodiment 1

Figure 12:
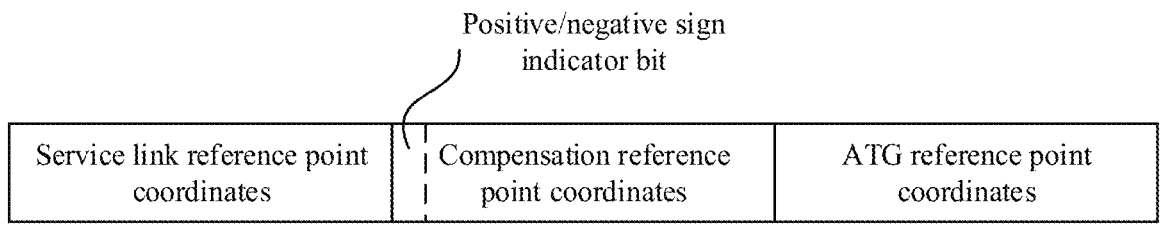
FIG. 12, FIG. 13, FIG. 14A to FIG. 14E, FIG. 15A to FIG. 15D, and FIG. 16 are schematic diagrams depicting structures in which a network side delivers signaling to a terminal according to an embodiment of this application.

A base station may send reference point coordinates to a terminal in a broadcast, multicast, or unicast manner. FIG. 12 is a schematic diagram of possible signaling of reference point coordinates according to an embodiment of this application.

Reference point coordinates may be in a same coordinate system as a satellite or may be relative coordinates. For example, service link reference point coordinates and compensation reference point coordinates may be coordinates relative to satellite coordinates, that is, the satellite is used as an origin of coordinates.

A parameter of the compensation reference point coordinates may carry a positive/negative sign indicator bit, to indicate whether a round-trip delay that is obtained through calculation and that is between a second network device and the compensation reference point is a positive value or a negative value. For example, 0 of the positive/negative sign indicator bit represents a negative value, and 1 represents a positive value. If the round-trip delay calculated by using the compensation reference point coordinates and the satellite coordinates is x seconds, and the positive/negative sign indicator bit is 0, B calculated in the solution is −x.

In a satellite communication scenario, a network side may further perform the following operations.

(1) ATG reference point coordinates may be set to zero, or the ATG reference point coordinates may not be sent.

(2) Whether the compensation reference point coordinates are sent or set to zero may be selected based on whether the network side makes compensation for a signal sent by a terminal. For example, if the network side makes no delay compensation, the compensation reference point coordinates may not be sent, or the compensation reference point coordinates are set to zero and sent.

(3) Whether the compensation reference point coordinates are sent may be selected based on whether the satellite is in a transparent transmission mode or regeneration mode for communication. For example, when the satellite is in the transparent transmission mode, even if the network side makes no delay compensation on the signal sent by the terminal, the compensation reference point coordinates need to be sent to indicate, to the terminal, a round-trip delay value of a feeder link. In this case, the compensation reference point coordinates may be position coordinates of a gateway. The terminal may calculate the round-trip delay value of the feeder link based on the compensation reference point coordinates and the satellite coordinates. In addition, in combination with a round-trip delay value of a service link, a complete round-trip delay of a communication link can be obtained, and is used as a timing advance adjustment value used by the terminal for signal sending. When the satellite works in the regeneration mode, if the network side makes no delay compensation on the signal sent by the terminal, the compensation reference point coordinates may not be sent.

In an ATG communication scenario, the network side may further perform the following operations.

(1) The service link reference point coordinates and the compensation reference point coordinates may be set to zero, or the service link reference point coordinates and the compensation reference point coordinates are not sent.

(2) In the ATG communication scenario, if the network side makes delay compensation on the signal sent by the terminal, a compensation reference point needs to be sent to notify the terminal of a value of delay compensation made by the network side for the signal sent by the terminal. In this case, the service link reference point coordinates are set to zero, or the service link reference point coordinates are not sent.

Certainly, the satellite communication scenario and the ATG communication scenario may coexist. If both the satellite communication scenario and the ATG communication scenario exist, the network side and the terminal may simultaneously perform operations performed by the network side and the terminal in the satellite communication scenario and the ATG communication scenario. For specific implementation methods, respectively refer to the satellite communication scenario and the ATG communication scenario. Details are not described herein again.

In a possible design, a minimum coordinate granularity or coordinate unit of the service link reference point coordinates, the compensation reference point coordinates, and the ATG reference point coordinates is m. In another possible design, a combination of several length units may be jointly used, for example, a combination of km and m may be used, to reduce signaling overheads. If only a single length unit is used to represent three-dimensional coordinates (10300 m, 9600 m, 10070 m) of the service link reference point, 42 bits are needed to represent the three numbers 10030, 9600, and 10070. With a combination of length units of km and m, the coordinates may be represented as (10 km+300 m, 9 km+600 m, 10 km+70 m). Numbers 10, 300, 9, 600, 10, and 70 need to be transmitted, and 39 bits are occupied. Signaling overheads can be reduced by using a combination of a plurality of length units.

In a possible design, a satellite orbit altitude H may be used as a reference length to transmit reference point coordinates, to further reduce signaling overheads. For example, reference point coordinates sent by the network side to the terminal are (a, b, c), and the terminal may obtain, through calculation according to (a+H, b+H, c+H), the reference point coordinate that is used. In a possible design, the satellite coordinates may be used as a reference point to send the reference point coordinate. For example, the coordinates of the satellite are (x, y, z), and the reference point coordinate sent by the network side to the terminal are (a, b, c). In this case, the terminal may obtain, through calculation according to (x+a, y+b, z+c), the reference point coordinate that is used.

The signaling format of the reference point coordinate provided in this embodiment is compatible with satellite communication and ATG communication scenarios, and supports TA determining by both a terminal with and without a positioning function. This saves signaling bits.

Embodiment 2

Figure 13:
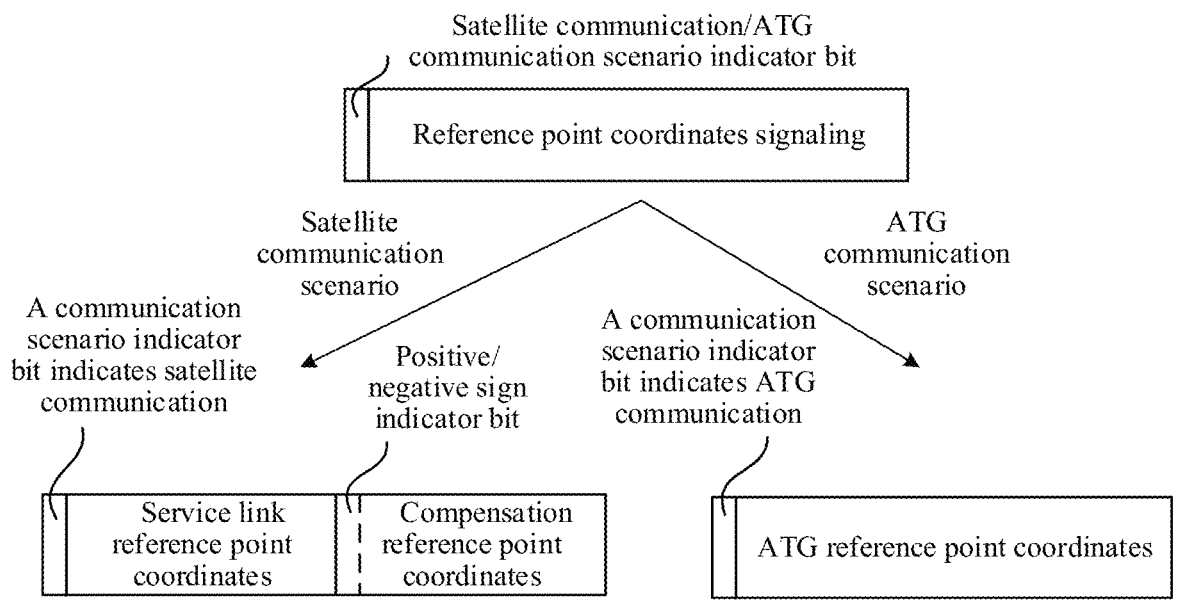

FIG. 13 is a schematic diagram of another possible signaling of reference point coordinates according to an embodiment of this application. Different from Embodiment 1, a satellite communication/ATG communication scenario indicator bit is added to the signaling shown in FIG. 13, to indicate a scenario to which reference point coordinates sent by a network side are applicable. For example, it is indicated to a terminal that transmitted signaling is service link reference point coordinates, compensation reference point coordinates, ATG reference point coordinates, or another combination.

According to this embodiment, satellite communication and ATG communication may reuse a same coordinate signaling bit. This reduces signaling overheads.

Embodiment 3

Different from Embodiment 1 or Embodiment 2, in this embodiment, coordinates of one or more reference points are replaced with a common timing advance value, that is, the common timing advance and the reference point coordinate are jointly used. (For ease of description, a service link common timing advance value, a common compensation timing advance value, and an ATG common timing advance value may be collectively referred to as a common timing advance value, and service link reference point coordinates, compensation reference point coordinates, and ATG reference point coordinates are referred to as reference point coordinates.)

Figure 14A:
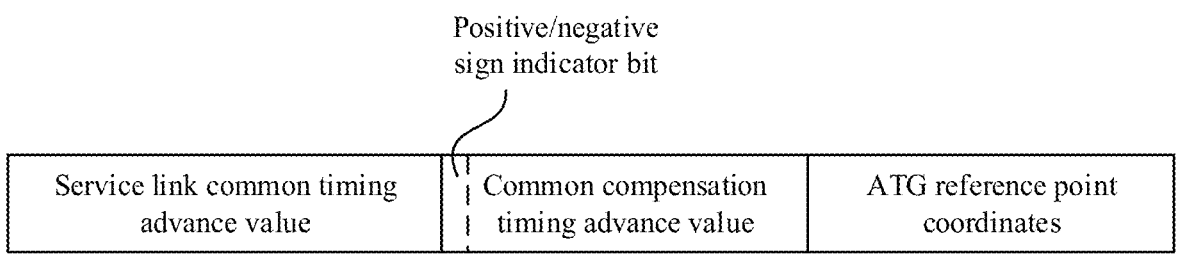
Figure 14B:
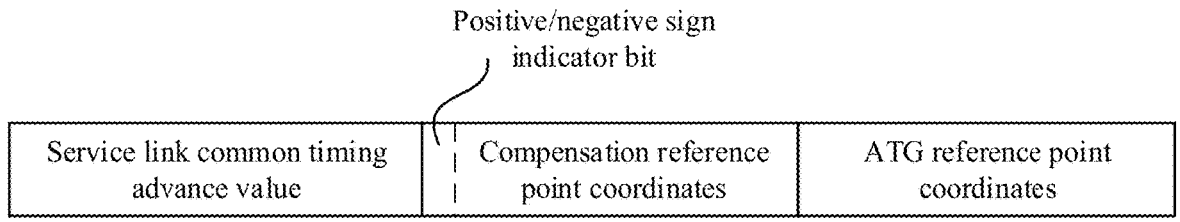

For example, refer to FIG. 14A and FIG. 14B. A network side replaces service link reference point coordinates with a common timing advance value of the service link (that is, a round-trip delay of the service link).

Figure 14C:
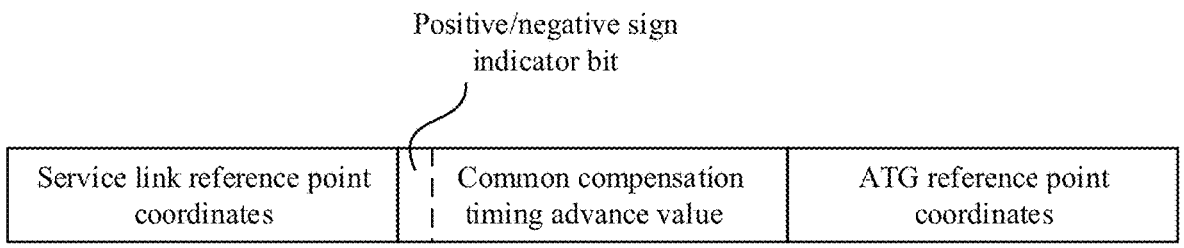

For example, refer to FIG. 14A and FIG. 14C, compensation reference point coordinates are replaced with a common compensation timing advance value (that is, a round-trip delay between a compensation reference point and a satellite).

Figure 14D:
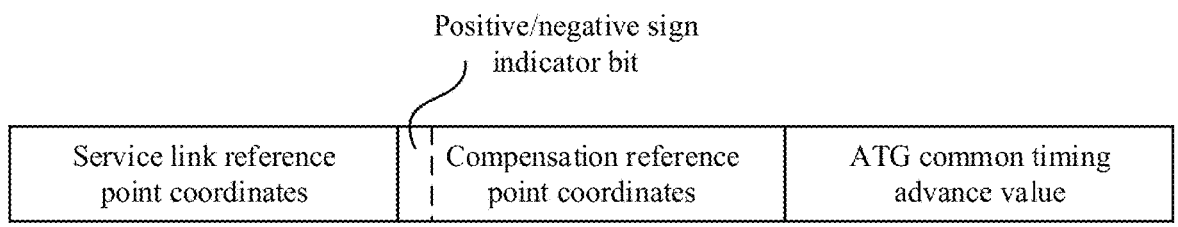

For example, refer to FIG. 14D. ATG reference point coordinates are replaced with an ATG common timing advance value (that is, a common round-trip delay in an ATG service area).

A relationship between the common compensation timing advance value and the compensation reference point may be that the common compensation timing advance value is equal to a round-trip delay value between a satellite position and a compensation reference point position. (1) When the compensation reference point is on a feeder link, the common compensation timing advance value is used after a positive sign is added before the value. Correspondingly, a positive/negative sign indicator bit in FIG. 14D is positive. (2) When the compensation reference point is on a service link, the common compensation timing advance value is used after a negative sign is added before the value. Correspondingly, the positive/negative sign indicator bit in FIG. 14D is negative.

It should be noted that, if the compensation reference point is on the feeder link all the time, or delay compensation made by the network side for a signal sent by a terminal is not greater than a round-trip delay of the feeder link, the round-trip delay calculated by using the compensation reference point or the common compensation timing advance value that is used is always a positive value. Therefore, the positive/negative sign indicator bit of the compensation reference point or the common compensation timing advance value may also be omitted, that is, the value is positive by default. Alternatively, if the compensation reference point is on the service link all the time or the delay compensation made by the network side for the signal sent by the terminal is not less than the round-trip delay of the feeder link, the network side and the terminal agree that the round-trip delay calculated by using the compensation reference point or the common compensation timing advance value that is used by the terminal is always a negative value. Therefore, the positive/negative sign indicator bit of the compensation reference point or the common compensation timing advance value may also be omitted, that is, the value is negative by default. The method in this embodiment is applicable to all embodiments in this specification.

In an optional implementation, for a scenario in which an ATG reference point does not need to be transmitted, the service link common timing advance value/service link reference point coordinates and the common compensation timing advance value/compensation reference point coordinates may be combined for use.

Figure 14E:
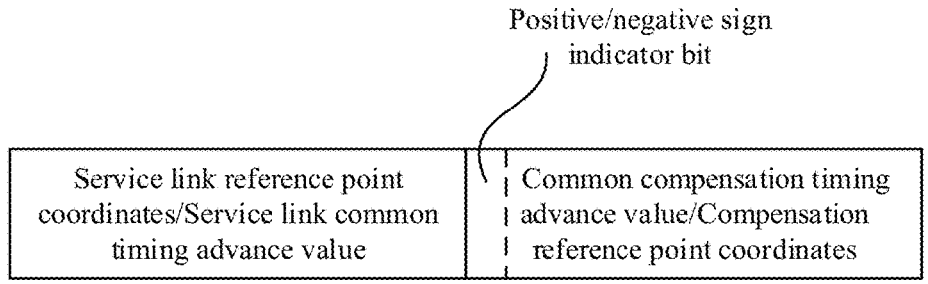

Refer to FIG. 14E. In non-gaze communication, a combination of the service link common timing advance value and the common compensation timing advance value/the compensation reference point coordinates is more conducive to reducing system complexity for signaling transmission. However, in a gaze mode, a combination of the service link reference point coordinates and the common compensation timing advance value/the compensation reference point coordinates is more conducive to reducing system complexity for signaling transmission. This is because in the gaze mode, the service link reference point remains unchanged within a time period in which a beam/cell continuously covers an area. The service link reference point coordinates sent by the network side to the terminal do not change either. Whether to use the common compensation timing advance value or the compensation reference point coordinates depends on whether the network side makes delay compensation for the signal sent by the terminal and whether the compensation value is fixed. Details are not described herein again.

In conclusion, a reasonable combination of the service link common timing advance value/the service link reference point coordinates and the common compensation timing advance value/the compensation reference point coordinates may reduce system complexity for signaling sending.

In an optional implementation, in a satellite communication scenario, the ATG reference point coordinates/the ATG common timing advance value may be set to zero or not sent. In an ATG communication scenario, the service link common timing advance value/the service link reference point coordinates and/or the common compensation timing advance value/the compensation reference point coordinates may be set to zero or not sent.

In an optional implementation, if the network side does not transmit the compensation reference point coordinates/ the service link reference point coordinates, rollback to default coordinates may be assumed, for example, rollback to default coordinates that are coordinates of a satellite, that is, the common compensation timing advance value is 0.

In an optional implementation, the service link common timing advance value and the common compensation timing advance value may be represented by using a combination of different time units. For example, it is assumed that the service link common timing advance value is 20.77 ms. In a dimension with only a unit of ms, 12 bits are needed for representation. In a dimension combining a frame length (10 ms) and a subframe length (1 ms): 2×frame length+0.77× subframe length. Only 9 bits are needed for representation on the network side. This can reduce signaling overheads. Similarly, an elementary time unit Ts in LTE and a multiple of Ts may be jointly used for representation, for example, a×Ts+b×Ts×10^3. Only a and b need to be sent to the terminal.

In this embodiment, the terminal sends the common timing advance value rather than the reference point coordinate. In some scenarios, replacing the reference point coordinate with the common timing advance value can reduce complexity of sending signaling and updating. For example, in a non-gaze mode of satellite communication, a coverage area of a beam/cell moves with the movement of the satellite, and the service link reference point also moves with the satellite. In this case, a distance between the satellite and the reference point remains unchanged and a round-trip delay remains unchanged. In this case, the service link common timing advance value is used to replace the service link reference point coordinates and sent to the terminal.

This can avoid frequent change of the sent position coordinates of the service link reference point, and reduce system complexity.

Embodiment 4

In this embodiment, a satellite communication/ATG communication scenario indicator bit is added on the basis of Embodiment 3, to indicate a scenario to which reference point coordinates sent by a network side are applicable.

Figure 15A:
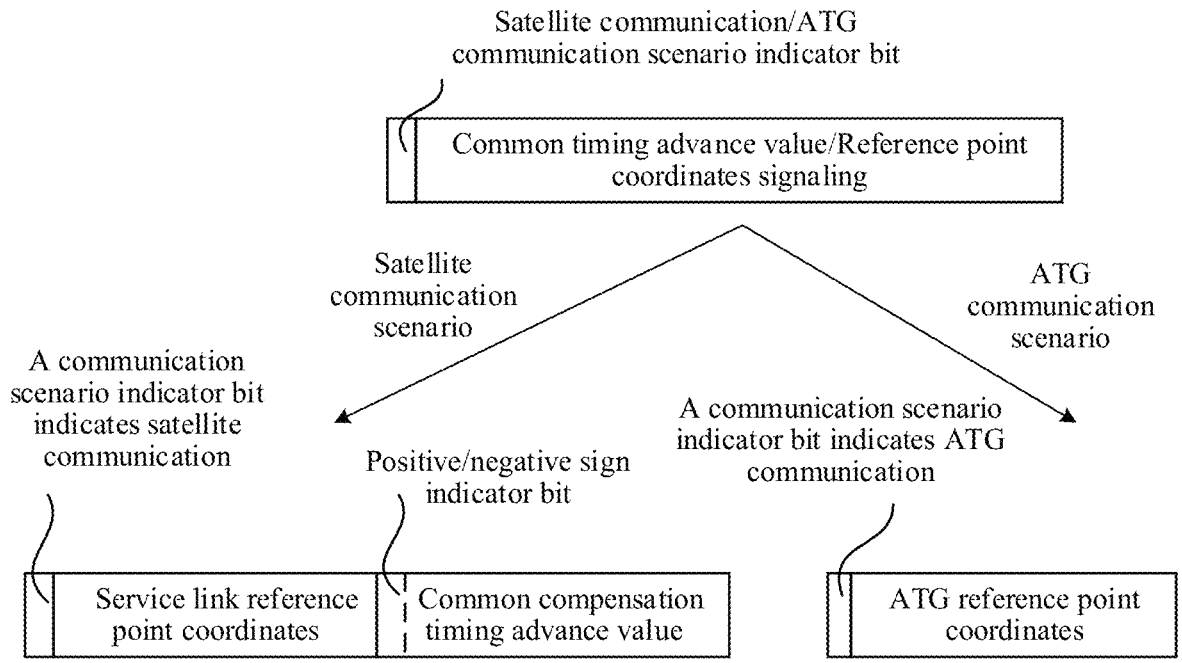
Figure 15B:
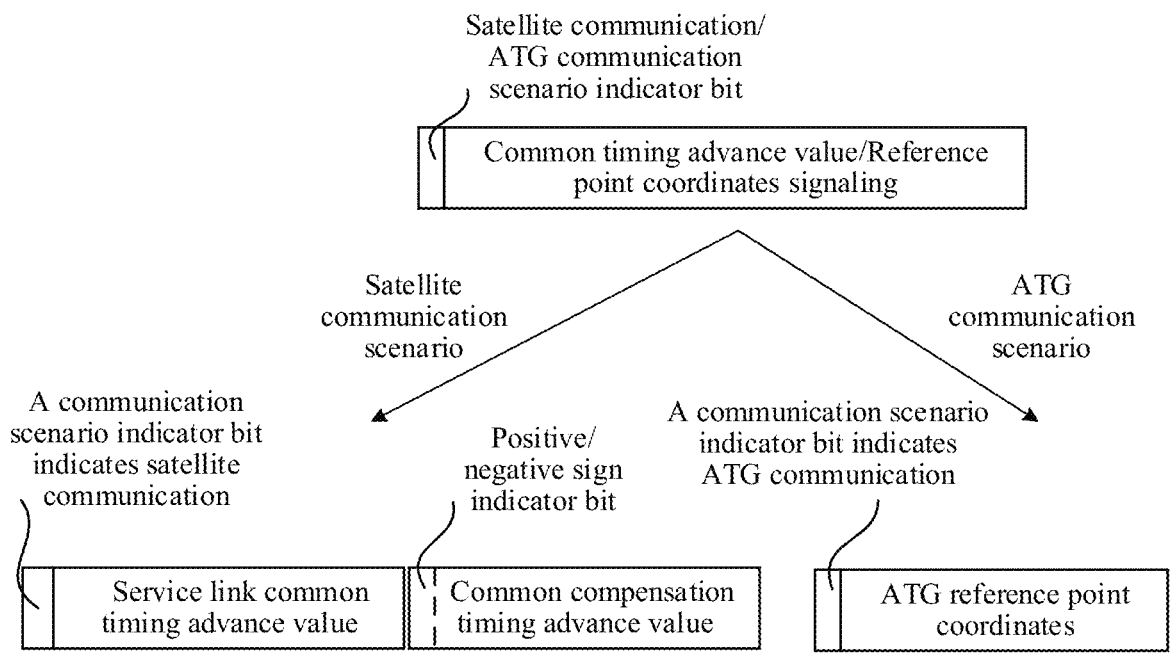

For example, refer to FIG. 15A and FIG. 15B. A communication scenario indicator bit indicates, to a terminal, that transmitted signaling is service link reference point coordinates, a common compensation timing advance value, ATG reference point coordinates, or another combination.

According to this embodiment, satellite communication and ATG communication may reuse a same signaling bit. This can reduce signaling overheads of an entire NTN system.

Embodiment 5

Figure 15C:
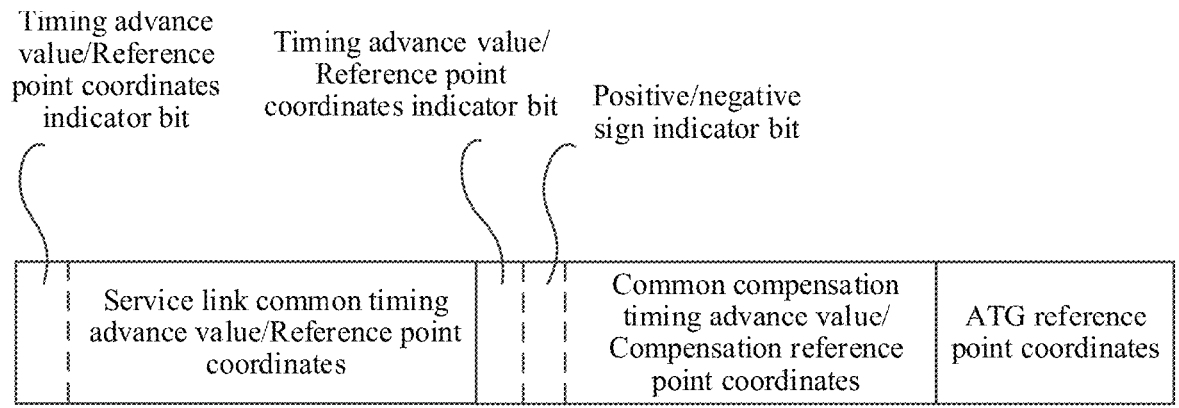

Refer to FIG. 15C. In this embodiment, an indicator bit may be added to service link common timing advance value/reference point coordinates signaling on the basis of Embodiment 3, to indicate whether the signaling indicates the service link common timing advance value or the service link reference point coordinates. In this way, a system may determine, based on whether a satellite is in a gaze mode and whether a network side makes delay compensation for a signal sent by a terminal, whether to notify the terminal in a form of the common timing advance value or in a form of the reference point coordinate. This can improve flexibility of the system.

Similarly, an indicator bit may be further added to common compensation timing advance value/compensation reference point coordinates signaling, to indicate whether the signaling indicates the common compensation timing advance value or the compensation reference point coordinates. This provides flexibility of signaling configuration on the network side.

Figure 15D:
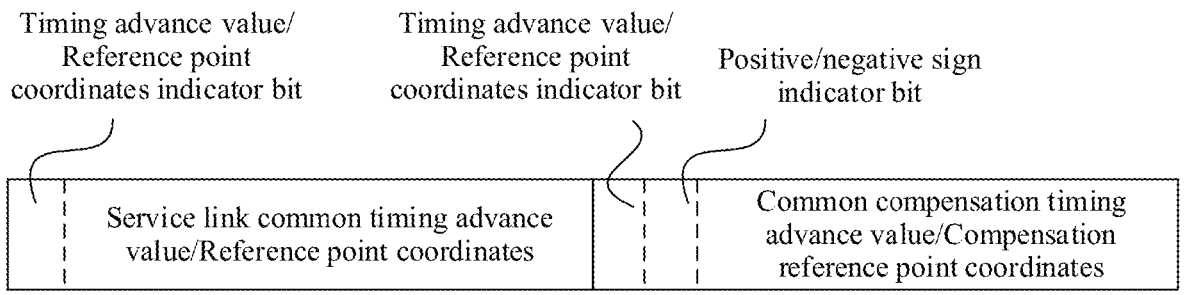

Refer to FIG. 15D. For a scenario in which an ATG reference point does not need to be transmitted, a combination of a service link common timing advance value/service link reference point coordinates and a common compensation timing advance value/compensation reference point coordinates may be separately sent.

Embodiment 6

In this embodiment, a satellite communication/ATG communication scenario indicator bit is added on the basis of Embodiment 5, to indicate a scenario to which reference point coordinates sent by a network side are applicable.

Figure 16:
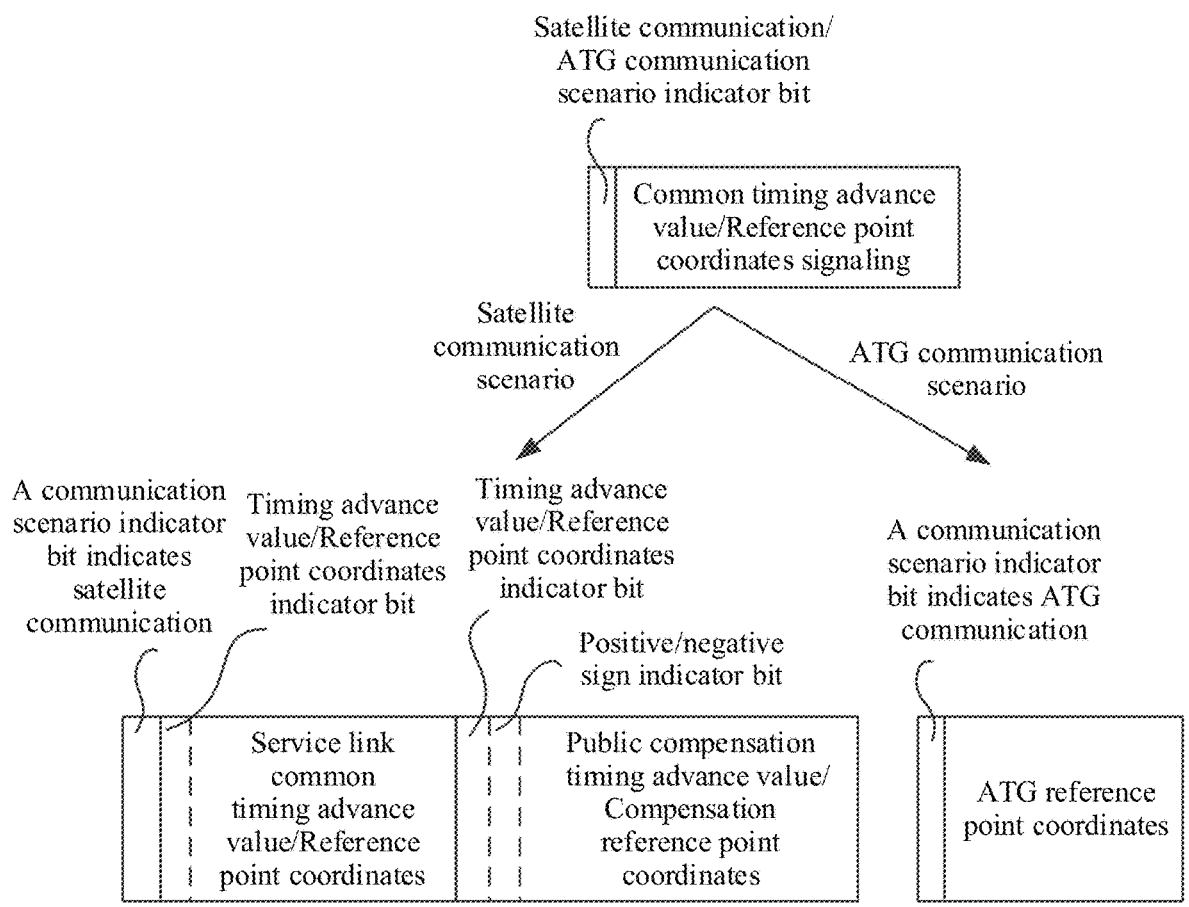

For example, refer to FIG. 16. A communication scenario indicator bit indicates, to a terminal, that transmitted signaling may be a service link common timing advance value/service link reference point coordinates, a common compensation timing advance value/compensation reference point coordinates, ATG reference point coordinates, or another combination.

According to this embodiment, satellite communication and ATG communication may reuse a same signaling bit. This can reduce signaling overheads.

Embodiment 7

In this embodiment, a network side indicates, to a terminal in an implicit indication manner, whether a common compensation timing advance value/compensation reference point coordinates are positive or negative (that is, it indicates whether a value of this part is used as a positive or negative value).

In an optional implementation, the compensation reference point coordinates are represented by relative coordinates. For example, coordinates relative to a satellite position are used to represent the compensation reference point coordinates, that is, the satellite is used as an origin of a coordinate system. If the compensation reference point coordinates are above the satellite, it represents a positive value, and if the compensation reference point coordinates are below the satellite, it represents a negative value.

In another optional implementation, a positive or negative value of a dimension in three-dimensional coordinates of the compensation reference point indicates whether a round-trip delay calculated by using the compensation reference point is a positive value or a negative value. For example, the compensation reference point coordinates sent by the network side to the terminal are (−501 km, 580 km, 520 km), and the network side and the terminal agree that a positive or negative value of the first dimension value of the coordinates indicates whether a round-trip delay obtained through calculation is a positive value or a negative value. Therefore, the round-trip delay obtained by the terminal through calculation based on the reference point coordinate (−501 km, 580 km, 520 km) is a negative value.

According to this embodiment, the network side may indicate whether the common compensation timing advance value/the compensation reference point coordinates are positive or negative without adding additional signaling. This reduces signaling overheads.

Embodiment 8

For a terminal with a positioning function in an NTN system, signaling sent by a network side to the terminal may not include a service link common (compensation) timing advance value/service link reference point coordinates, so as to save unnecessary signaling overheads.

For example, the signaling sent by the network side to the terminal only needs to include a parameter of the common compensation timing advance value/the compensation reference point coordinates (including a positive/negative sign indicator bit). Alternatively, the signaling sent by the network side to the terminal only needs to include a parameter of the common compensation timing advance value/the compensation reference point coordinates (including a positive/negative sign indicator bit), and ATG reference point coordinates.

The terminal with the positioning function may obtain, through calculation, a round-trip delay of the service link based on a terminal position and a satellite position (the terminal may obtain the satellite position from ephemeris information). Therefore, a common round-trip delay value of the service link indicated by the service link common timing advance value/the service link reference point coordinates is not needed. However, the terminal with the positioning function or the satellite cannot obtain a round-trip delay of a feeder link based on the ephemeris information. If the network side makes propagation delay compensation on a signal sent by the terminal, the terminal cannot obtain a delay compensation value on the network side. Therefore, the terminal with the positioning function cannot obtain complete propagation delay information, for example, a propagation delay of the feeder link and a propagation delay compensation value on the network side, based on only position information of the terminal and position information of the satellite.

Figure 17:
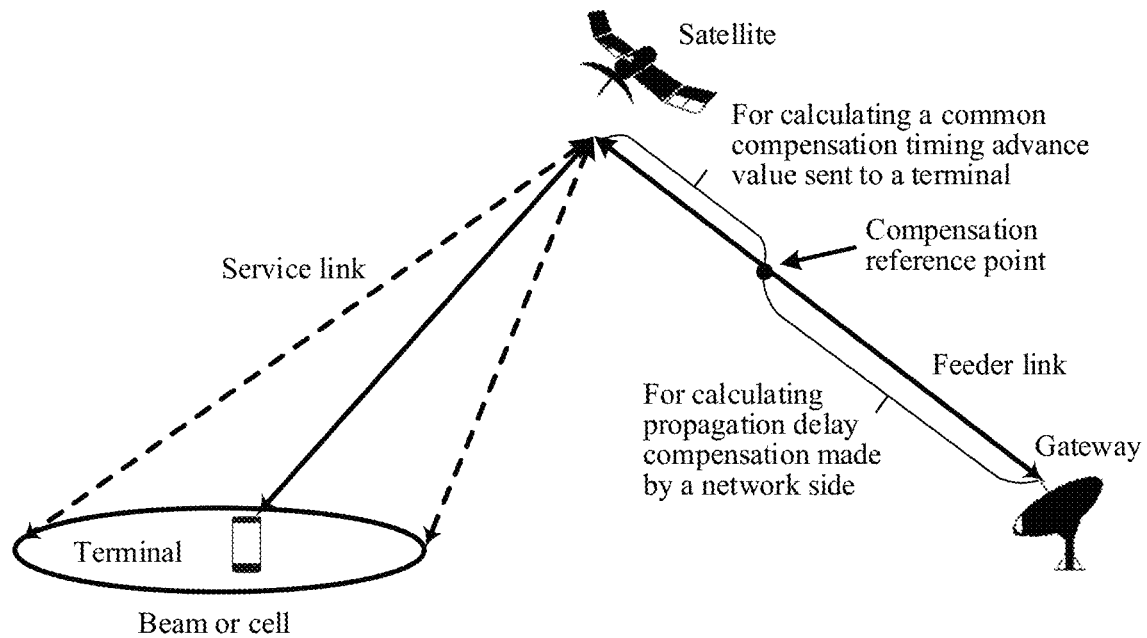
FIG. 17 is a schematic diagram of a compensation reference point on a feeder link.

As shown in FIG. 17, if a value of the propagation delay compensation made by the network side for the signal sent by the terminal is less than the round-trip delay of the feeder link or the compensation reference point is on the feeder link, the common compensation timing advance value may be used to represent a remaining propagation delay value of the feeder link obtained after delay compensation made by the network side is subtracted. For example, if the propagation round-trip delay of the feeder link is a (that is, the signal propagation round-trip delay between the satellite and a gateway is a), and the value of propagation delay compensation made by the network side for the feeder link is b (that is, the round-trip delay between the gateway and the compensation reference point is b), the common compensation timing advance value sent by the network side to the terminal is equal to a−b (that is, the round-trip delay between the satellite and the compensation reference point is a−b). Optionally, the network side may send, to the terminal, a common compensation timing advance value of (a−b)/2 (which can save signaling overheads), that is, a remaining propagation delay value obtained by subtracting a one-way delay compensated for by the network side from a one-way propagation delay of the feeder link. When the terminal receives the common compensation timing advance value of (a−b)/2, the common compensation timing advance value is multiplied by 2 and then used. In this case, the positive/negative sign indicator bit of the common compensation timing advance value indicates a positive sign. That is, it indicates that a subsequent operation is an addition operation. Then, the terminal adds the common compensation timing advance value (that is, a value equal to a−b) and a round-trip delay value of the service link obtained by the terminal through calculation, to obtain a TA for performing timing advance adjustment on the signal sent by the terminal. Similarly, the network side may send the compensation reference point coordinates, and a positive/negative sign indicator bit indicates a positive sign. The terminal calculates a round-trip delay between the satellite position and the reference point position based on the satellite position and the reference point position, and then adds, based on the positive sign indicated by the positive/negative sign indicator bit, the calculated round-trip delay value of the service link and the common compensation timing advance value, to obtain a TA that can be used by the terminal.

Figure 18:
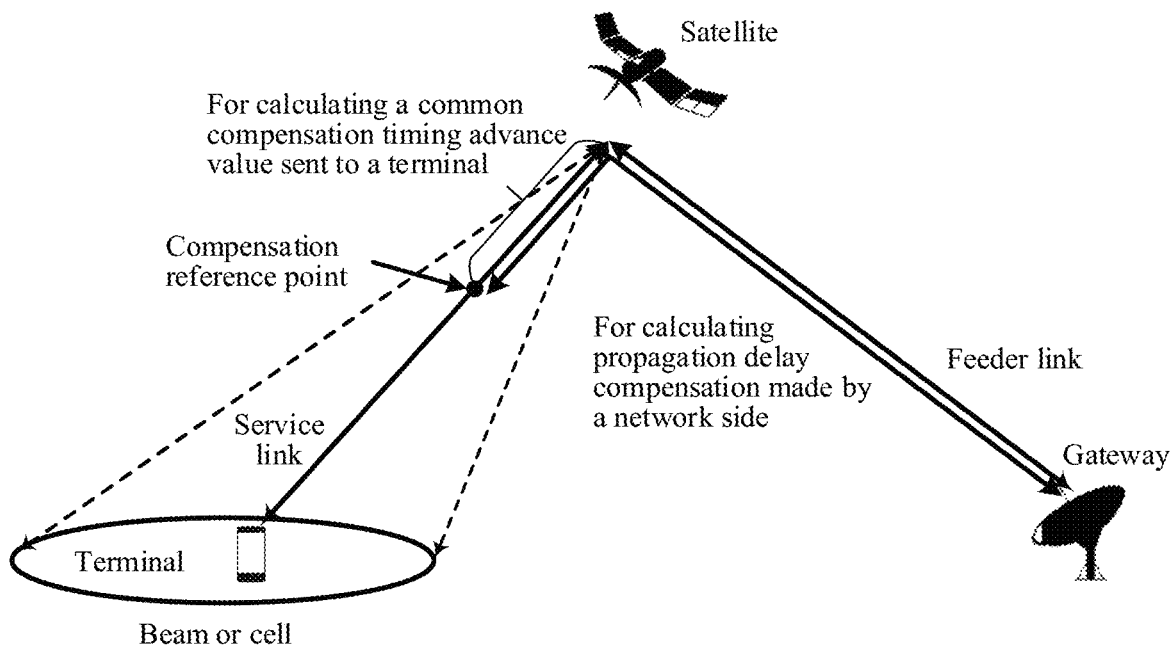
FIG. 18 is a schematic diagram of a compensation reference point on a service link.

As shown in FIG. 18, when a value of propagation delay compensation made by the network side for the signal sent by the terminal is greater than the round-trip delay of the feeder link or the compensation reference point is on the service link, that is, the network side makes compensation for the round-trip delay of the feeder link and partial compensation for the round-trip delay of the service link (the round-trip delay between the gateway-satellite-compensation reference point), in this case, the common compensation timing advance value may be used to represent that the network side makes partial compensation for the round-trip propagation delay of the service link (that is, a round-trip propagation delay value of a signal between the satellite and the compensation reference point). For example, it is assumed that the round-trip delay between the satellite and the compensation reference point is d, that is, the common compensation timing advance value is d. Alternatively, to reduce signaling overheads, the common compensation timing advance value is set to d/2, and after receiving d/2, the terminal multiplies d/2 by 2, and then performs a subsequent operation. In this case, the positive/negative sign indicator bit of the common compensation timing advance value indicates a negative sign. That is, it indicates that a subsequent operation is a subtraction operation. Then, the terminal subtracts the common compensation timing advance value (that is, a value equal to d) from the round-trip delay value of the service link that is obtained by the terminal through calculation, to obtain a TA for performing timing advance adjustment on the signal sent by the terminal. Similarly, the network side may send the compensation reference point coordinates, and a positive/negative sign indicator bit indicates a negative sign. The terminal calculates a round-trip delay between the satellite position and the reference point position based on the satellite position and the reference point position, and then adds, based on the negative sign indicated by the positive/negative sign indicator bit, the calculated round-trip delay value of the service link and the common compensation timing advance value, to obtain a TA that can be used by the terminal.

Embodiment 9

As described in Embodiments 2, 4, and 6, when a network side uses an indicator bit to indicate that information included in signaling is service link reference point coordinates, a service link common timing advance value, compensation reference point coordinates, a common compensation timing advance value, or ATG reference point coordinates, the network side may notify a terminal of composition of the signaling of the reference point coordinate and the timing advance by looking up a table.

As an example, Table 1 shows different reference point coordinates and composition of timing advance signaling that correspond to different index numbers. The network side may send an index number to the terminal, and the terminal queries the reference point coordinate and the composition of the timing advance signaling according to the index number, and decodes the signaling to obtain corresponding data. For example, when the terminal receives an index number 2, it indicates that signaling received by the terminal includes the service link common timing advance value, the compensation reference point coordinates, and the ATG reference point coordinates. For example, when the terminal receives an index number 14, it indicates that signaling received by the terminal includes the service link common timing advance value and the compensation reference point coordinates.

TABLE 1

Composition table 1 of reference point coordinates and timing advance signaling

| Index number | Service link reference point coordinates | Service link common timing advance value | Compensation reference point coordinates | Common compensation timing advance value | ATG reference point coordinates |
|---|---|---|---|---|---|
| 1 | √ | x | √ | x | √ |
| 2 | x | √ | √ | x | √ |

TABLE 1-continued

Composition table 1 of reference point coordinates and timing advance signaling

| Index number | Service link reference point coordinates | Service link common timing advance value | Compensation reference point coordinates | Common compensation timing advance value | ATG reference point coordinates |
|---|---|---|---|---|---|
| 3 | √ | x | x | √ | √ |
| 4 | x | √ | x | √ | √ |
| 5 | √ | x | √ | x | √ |
| 6 | x | √ | √ | x | √ |
| 7 | √ | x | x | √ | √ |
| 8 | x | √ | x | √ | √ |
| 9 | √ | x | √ | x | x |
| 10 | x | √ | √ | x | x |
| 11 | √ | x | x | √ | x |
| 12 | x | √ | x | √ | x |
| 13 | √ | x | √ | x | x |
| 14 | x | √ | √ | x | x |
| 15 | √ | x | x | √ | x |
| 16 | x | √ | x | √ | x |

In an example, refer to Table 2. When the terminal does not need the ATG reference point coordinates, the table may be further simplified, to reduce signaling overheads for index number transmission. For example, when the terminal receives an index number 3, it indicates that signaling received by the terminal includes the service link reference point coordinates and the common compensation timing advance value.

TABLE 2

Composition table 2 of reference point coordinates and timing advance signaling

| Index number | Service link reference point coordinates | Service link common timing advance value | Compensation reference point coordinates | Common compensation timing advance value |
|---|---|---|---|---|
| 1 | √ | x | √ | x |
| 2 | x | √ | √ | x |
| 3 | √ | x | x | √ |
| 4 | x | √ | x | √ |

It should be noted that, if the compensation reference point is on the feeder link all the time, or delay compensation made by the network side for a signal sent by a terminal is not greater than a round-trip delay of the feeder link, the round-trip delay or the common compensation timing advance value calculated by using the compensation reference point is always a positive value. Therefore, the positive/negative sign indicator bit of the compensation reference point or the common compensation timing advance value may also be omitted, that is, the value is positive by default. Alternatively, if the compensation reference point is on the service link all the time or the delay compensation made by the network side for the signal sent by the terminal is not less than the round-trip delay of the feeder link, the network side and the terminal agree that the round-trip delay that is used by the terminal and that is calculated by using the compensation reference point or the common compensation timing advance value is always a negative value. Therefore, the positive/negative sign indicator bit of the compensation reference point or the common compensation timing advance value may also be omitted, that is, the value is negative by default.

As described in Embodiment 8, for a terminal with a positioning function, only a parameter of the common compensation timing advance value or the compensation reference point coordinates need to be sent to the terminal. Correspondingly, refer to Table 3, if the terminal receives an index number 1, it indicates that signaling received by the terminal is the compensation reference point coordinates.

TABLE 3

Composition table 3 of reference point coordinates and timing advance signaling

| Index number | Compensation reference point coordinates | Common compensation timing advance value |
|---|---|---|
| 1 | √ | x |
| 2 | x | √ |

In an optional implementation, the index number in the foregoing Table 1, Table 2, or Table 3 may be sent to the terminal by using SIB signaling or RRC signaling, that is, composition of the reference point or the timing advance value may be configured for the terminal by using the SIB signaling or the RRC signaling.

In this embodiment, the network side may notify the terminal of the composition of the signaling of the reference point coordinate and the timing advance by looking up a table. This can save signaling overheads.

Embodiment 10

This embodiment describes types of signaling that carries parameters (such as reference point coordinates and a common timing advance value) in the foregoing Embodiments 1 to 9.

Manner 1: A network device may carry parameters such as a service link common timing advance value/service link reference point coordinates, a common compensation timing advance value/compensation reference point coordinates, and ATG reference point coordinates of a target cell/beam in broadcast information such as a SIB1, OSI, an MIB, or the like, and the network device sends the broadcast information to a terminal in a unicast, broadcast, or multicast manner.

Manner 2: If the parameters are sent in an RRC connection phase, the network device may carry the parameters in at least one of RRC information, an RRCReconfiguration message, DCI, group DCI, a MAC element, and a TAC, or send the parameter to the terminal along with data transmission or on a separately allocated PDSCH bearer.

Manner 3: When the terminal performs cell handover/beam switch/BWP switch, the network device may send the parameters to the terminal in an RRC reconfiguration message and BWP-related signaling.

For example, in the case of beam/BWP switch:

In an initial BWP phase, parameters are delivered in RRC signaling corresponding to the initial BWP. A format of the delivered signaling may be as follows:

```
BWP ::=                         SEQUENCE {
    positionAndBandwidth            INTEGER (0..37949),
    subcarrierSpacing               SubcarrierSpacing,
    cyclicPrefix                    ENUMERATED { extended } OPTIONAL
    ReferencePointCoordinateGroup   ReferencePointCoordinateGroupList
}
```

The "ReferencePointCoordinateGroup" field may be used for the parameters in Embodiments 1 to 9, including the reference point coordinate, the common timing advance value, and the like. The "ReferencePointCoordinateGroupList" field indicates a specific value of the reference point coordinate, the common timing advance value, and the like.

In a non-initial BWP phase, the parameters are delivered in a BWP downlink common (BWP-DownlinkCommon) signaling or a BWP uplink common (BWP-UplinkCommon) signaling. A format of the signaling delivered in the non-initial BWP phase may be as follows:

```
BWP-DownlinkCommon ::=          SEQUENCE {
    genericParameters               BWP,
    pdcch-ConfigCommon              SetupRelease { PDCCH-ConfigCommon }
    pdsch-ConfigCommon              SetupRelease { PDSCH-ConfigCommon }
    ReferencePointCoordinateGroup   ReferencePointCoordinateGroupList
...}
BWP-UplinkCommon ::=            SEQUENCE {
    genericParameters               BWP,
    rach-ConfigCommon               SetupRelease {RACH-
ConfigCommon }
    pusch-ConfigCommon                                              SetupRelease
PUSCH-ConfigCommon }
    pucch-ConfigCommon                                              SetupRelease
PUCCH-ConfigCommon }
    ReferencePointCoordinateGroup   ReferencePointCoordinateGroupList
...
}
```

The "ReferencePointCoordinateGroup" field may be used for the parameters in Embodiments 1 to 9, including the reference point coordinate, the common timing advance value, and the like. The "ReferencePointCoordinateGroupList" field indicates a specific value of the reference point coordinate, the common timing advance value, and the like.

A specific format of the "ReferencePointCoordinateGroupList" field in the foregoing signaling is as follows (it should be understood that the following is merely an example rather than limitation, and there may be a different field format based on different signaling combinations listed in this embodiment of this application):

```
ReferencePointCoordinateGroupList ::=   SEQUENCE {
    ServiceLinkReferencePoint           BIT STRING (SIZE (n)),
    CompensatedReferencePoint           BIT STRING (SIZE (n)),
}
```

The "ServiceLinkReferencePoint" field indicates a value of service link reference point coordinates, and the "CompensatedReferencePoint" field indicates a value of compensation reference point coordinates.

```
Alternatively,
ReferencePointCoordinateGroupList ::=   SEQUENCE{
    ServiceLinkReferencePoint           BIT STRING (SIZE (n)),
    CompensatedReferencePoint           BIT STRING (SIZE (n))
OPTIONAL,
    ATGReferencePoint                   BIT STRING (SIZE (n))
OPTIONAL,
}
```

The "ATGReferencePoint" field indicates a value of ATG reference point coordinates.

```
ReferencePointCoordinateGroupList ::=   SEQUENCE {
    ServiceLinkCommonTimingAdvance      BIT STRING (SIZE (n)),
    CompensatedReferencePoint           BIT STRING (SIZE (n)),
}
```

The "ServiceLinkCommonTimingAdvance" field indicates a service link common timing advance value.

```
Alternatively,
ReferencePointCoordinateGroupList ::=   SEQUENCE {
    ServiceLinkTiming Value             BIT STRING (SIZE (n)),
    CompensatedTimingValue              BIT STRING (SIZE (n)), }
```

The "ServiceLinkTimingValue" field indicates a timing advance value or reference point coordinates. The "ServiceLinkTimingValue" has 1 bit indicating whether the parameter is the service link common timing advance value or the service link reference point coordinates, and carries a corresponding common timing advance value of the service link/coordinates of the service link reference point. Similarly, the "CompensatedTimingValue" field indicates a common compensation timing advance value or compensation reference point coordinates. The "CompensatedTimingValue" has 1 bit indicating whether the parameter is the common compensation timing advance value or the compensation reference point coordinates, and carries a corresponding common compensation timing advance value/compensation reference point coordinates.

It should be understood that, different beams or cells may be distinguished in a protocol based on a BWP, a transmission configuration indication (TCI), or a synchronization signal block (SSB). In other words, a beam or a cell may be indicated based on a BWP, a TCI, or an SSB. For example, for the terminal and the network device, switching between beams or cells may be indicated by switching between BWPs, TCIs, or SSBs. Therefore, for the terminal and/or the network device, what is actually performed may be the switching between the BWPs, TCIs, or SSBs. In addition, the beam or the cell in this application may be replaced with a BWP, a TCI, or an SSB.

Embodiment 11

This embodiment describes that in a scenario of switching between different beams or BWPs, a service link common timing advance value/a value of service link reference point coordinates, a common compensation timing advance value/a value of compensation reference point coordinates, and a value of ATG reference point coordinates of a target cell/beam are sent to a terminal by using BWP downlink dedicated (BWP-DownlinkDedicated) signaling and BWP uplink dedicated (BWP-UplinkDedicated) signaling.

A format of the delivered signaling may be as follows:

```
BWP-DownlinkDedicated::=              SEQUENCE {
    pdcch-Config                      SetupRelease { PDCCH-Config}
    pdsch-Config                      SetupRelease { PDSCH-Config}
    sps-Config                        SetupRelease { SPS-Config}
    radioLinkMonitoringConfig         SetupRelease { RadioLinkMonitoringConfig }
    ReferencePointCoordinateGroup     ReferencePointCoordinateGroupList
    ...
}
BWP-UplinkDedicated ::=               SEQUENCE {
    pucch-Config                      SetupRelease { PUCCH-Config}
    pusch-Config                      SetupRelease { PUSCH-Config}
    configuredGrantConfig             SetupRelease { ConfiguredGrantConfig }
    srs-Config                        SetupRelease { SRS-Config}
    beamFailureRecoveryConfig         SetupRelease { BeamFailureRecoveryConfig}
    ReferencePointCoordinateGroup     ReferencePointCoordinateGroupList
    ...
}
```

The "ReferencePointCoordinateGroup" field may be used for the parameters in Embodiments 1 to 9, including the reference point coordinate, the common timing advance value, and the like. The "ReferencePointCoordinateGroupList" field indicates a specific value of the reference point coordinate, the common timing advance value, and the like.

Embodiment 12

A measurement procedure may be triggered before BWP switch, beam switch, or cell handover is initiated. Therefore, in this embodiment, a delay compensation value on a network side of a target BWP, beam, or cell is delivered in a neighboring cell measurement configuration and corresponding RRC signaling during switching.

For example, the network side delivers the network side delay compensation value of the target BWP, beam, or cell by using measurement signaling "MeasConfig" in RRC. A format of the delivered signaling may be as follows:

```
MeasObjectNR ::=SEQUENCE {
    carrierFreq                      ARFCN-ValueNR,
    ReferencePointCoordinateGroup    ReferencePointCoordinateGroupList
    ... ...
}
```

The "ReferencePointCoordinateGroup" field may be used for the parameters in Embodiments 1 to 9, including the reference point coordinate, the common timing advance value, and the like. The "ReferencePointCoordinateGroupList" field indicates a specific value of the reference point coordinate, the common timing advance value, and the like.

According to a procedure of switch signaling, a service link common timing advance value/service link reference point coordinates, a common compensation timing advance value/compensation reference point coordinates, and ATG reference point coordinates of a target BWP, beam, or cell are delivered in the serving BWP, beam, or cell by using an RRC registration message (RRCReconfiguration). An example of a specific signaling format is as follows:

```
RCReconfiguration ::=           SEQUENCE {
    rrc-TransactionIdentifier   RRC-TransactionIdentifier,
    criticalExtensions          CHOICE {
        rrcReconfiguration         RRCReconfiguration-IEs,
        criticalExtensionsFuture   SEQUENCE { }
    }
}
```

The "rrcReconfiguration" field indicates RRC registration signaling. A specific format of the "RRCReconfiguration-IEs" field may be as follows:

```
RRCReconfiguration-IEs ::= SEQUENCE {
    radioBearerConfig               RadioBearerConfig OPTIONAL, -- Need M
    ReferencePointCoordinateGroup   ReferencePointCoordinateGroupList
```

```
secondary CellGroup    OCTET STRING (CONTAINING CellGroupConfig) OPTIONAL,
                       -- Need M
measConfig             MeasConfig OPTIONAL, -- Need M
lateNonCriticalExtension  OCTET STRING OPTIONAL,
    nonCriticalExtension  SEQUENCE { } OPTIONAL
}
```

Embodiment 13

In this embodiment, when ATG reference point coordinates need to be sent, the ATG reference point coordinates may be used to replace satellite position coordinates (or partial ephemeris information) and sent to a terminal. This can reduce signaling overheads.

In satellite communication of an NTN, a network side sends satellite position coordinates or ephemeris information to a terminal. Therefore, when the terminal switches to an ATG communication scenario, the satellite position coordinates or the ephemeris information may be replaced with the ATG reference point coordinates.

Figure 19:
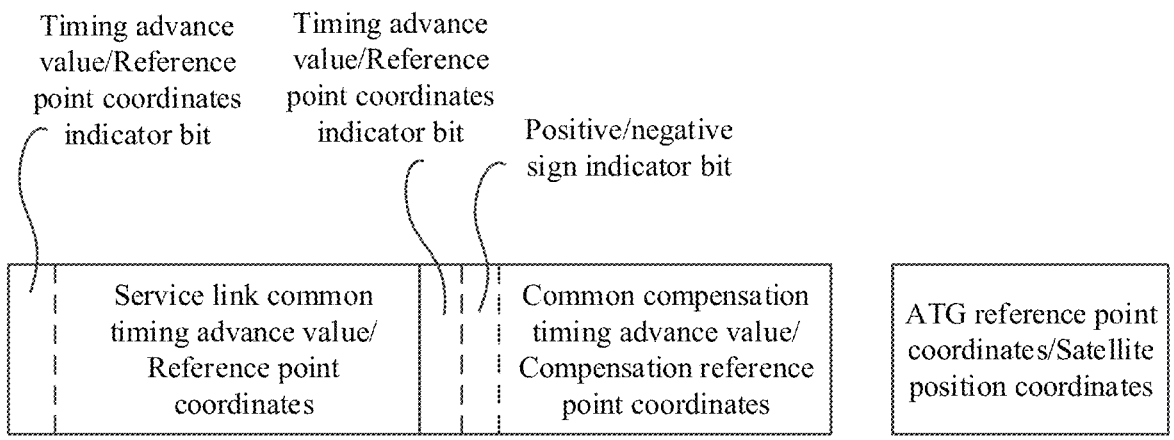

As shown in FIG. 19, coordinates or an ATG reference point/satellite position coordinates occupy same or partially same signaling bits, and may be sent together with or separately from reference point coordinates, a common timing advance value (service link reference point coordinates, a service link common timing advance value, compensation reference point coordinates, or a common compensation timing advance value), and the like.

In this way, a terminal with a positioning function can still calculate a round-trip delay between the terminal and a base station by using the ATG reference point coordinates and position coordinates of the terminal, and determine a timing advance adjustment value.

Figure 20:
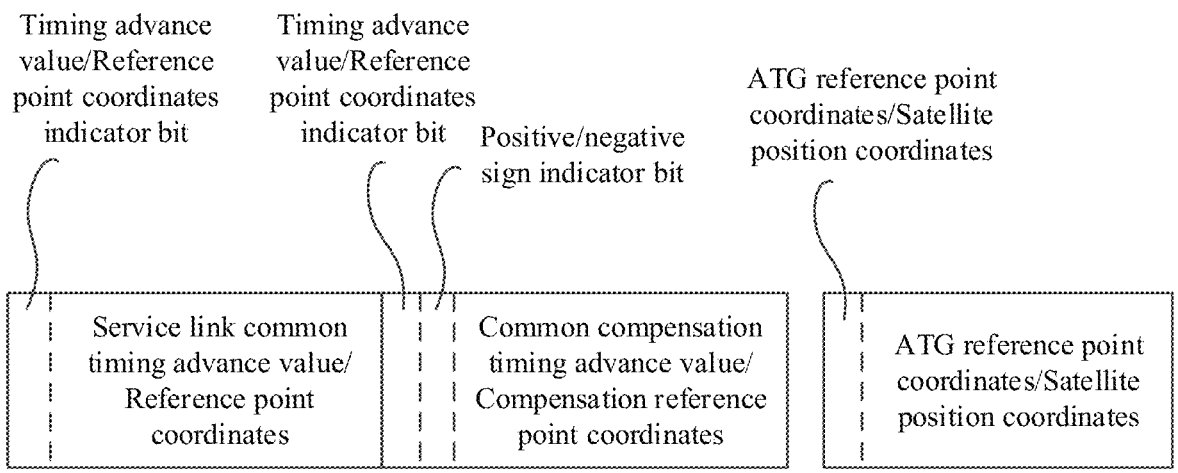

Further, 1 bit may be used to indicate, to the terminal, whether information about the ATG reference point coordinates or information about the satellite position coordinates/ephemeris information is sent by the network side to the terminal, as shown in FIG. 20.

Embodiment 14

This embodiment describes a TA calculation method.

In conventional technologies, the timing advance used by the terminal is TA=$(N_A+N_{TAoffset})*16*Ts/2$. $N_{TA}$ is a TA adjustment value obtained by a terminal based on a parameter indicated by a network side, for example, a TA adjustment value calculated by the terminal based on a common timing advance value and/or reference point coordinates and/or position information of the terminal that are/is sent by the network side in the patent for the present invention. $N_{TAoffset}$ represents a timing interval from uplink transmission to downlink transmission, and is sent to the terminal by using SIB information. For an FDD mode, $N_{TAoffset}=0$; and for a TDD mode, $N_{TAoffset}=624$. The time interval may enable a base station to have sufficient time to switch between receiving an uplink signal and sending a downlink signal. Ts represents $1/(15e3\times2048)$ seconds. $\mu$ is related to subcarrier spacing, that is, the subcarrier spacing is $2^\mu \cdot 15$ kHz.

In this embodiment, the TA adjustment value calculated by the terminal based on the common timing advance value and/or the reference point coordinate and/or the position information of the terminal that are/is sent by the network side may be added to a fixed value (for example, $N_{TAoffset}$) to obtain a timing advance that can be used by the terminal.

In this embodiment of this application, implementations of the fixed value include but are not limited to the following three manners.

Manner 1: The fixed value is an offset.

The offset may be specifically related to one or more of the following factors:

(1) A duplex mode, including a time division duplex (TDD) mode and a frequency division duplex (FDD) mode.

(2) A position error or a positioning error of a second network device (for example, a satellite).

It should be understood that the positioning error and the position error are only different descriptions, and have a same meaning.

(3) A position error or a positioning error of the terminal.

Certainly, the foregoing three factors are merely examples rather than limitations, and the offset may be related to another factor in actual application.

In a possible design, the network side may send an offset (for example, a time offset) to UE to indicate a quotient of a position error or a positioning error of the second network device by a speed of light, that is, positioning error/speed of light, or the offset is twice the quotient of the position error or positioning error of the second network device by the speed of light, that is, 2×positioning error/speed of light.

It should be understood that the speed of light refers to a propagation speed of an optical wave in air or outer space. For example, the speed of light=$3\times10^8$ is often used.

Optionally, the offset may be a positive value, a negative value, or 0, that is, the offset sent by the network side to the terminal may be: +(positioning error/speed of light), −(positioning error/speed of light), +(2×positioning error/speed of light), or −(2×positioning error/speed of light).

The offset may be a negative value, to avoid generation of ISI because the TA value obtained by the terminal is excessively large. The offset may be a positive value, to avoid that a signal of the terminal reaches the network device too late because the TA value is excessively small. Alternatively, the network side and the terminal may agree that the sent offset is a positive value. After receiving the offset, the terminal uses the offset after adding a negative sign before the offset.

A unit of the offset may be nanosecond (ns), microsecond (us), millisecond (ms), $16\times Ts/2^\mu$, or the like. This is not limited in this embodiment of this application.

It may be understood that the position error or the positioning error of the second network device may be understood as an offset distance between the position coordinates (the position coordinates may be represented by ephemeris information or three-dimensional coordinates) of the second network device and an actual position of the second network device due to perturbation. The foregoing position error or the positioning error may be a maximum possible offset distance between the position coordinates of the second network device and the actual position of the second network device. The foregoing position error or positioning error may also be referred to as an ephemeris error.

It may be understood that the position error or the positioning error of the terminal indicates a position deviation that occurs when the terminal positions itself by using a positioning system or a positioning method, that is, an offset distance or a maximum possible offset distance between the position coordinates of the terminal obtained through positioning and actual position coordinates.

It may be understood that the network side and the terminal may agree that the network side sends a positive offset to the terminal, and the terminal subtracts the offset from the calculated TA adjustment value to obtain a timing advance that can be used by the terminal. This is equivalent to that the network side sends a negative offset to the terminal, and the terminal adds the calculated TA adjustment value to the offset to obtain a timing advance that can be used by the terminal.

In conclusion, the fixed value may be an offset. The network side may send/configure the offset to the terminal, and the terminal performs addition or subtraction between the calculated TA adjustment value and the offset, to obtain a timing advance that can be used by the terminal. The TA adjustment value obtained by the terminal through calculation may be a sum of a service link round-trip delay and a common compensation timing advance value (or a difference).

In another possible design, the network side may send, to the UE, a value of a position error or a positioning error that may determine the offset.

The position error or the positioning error value herein may be the position error of the second network device (for example, a satellite) and/or the position error of the terminal. In the following, a position_err is used to represent the value of the position error or the positioning error. A unit of the position_err may be meter, and the position_err indicates a possible position error of the second network device.

After receiving the position_err, the terminal calculates the foregoing offset based on the position_err.

For example, the terminal device may obtain, through calculation, the value of the offset to be used by the terminal in any one of the following manners.

(1) −2×position_err/speed of light, that is, a quotient of −2×position_err by the speed of light.

(2) +2×position_err/speed of light, that is, a quotient of +2×position_err by the speed of light.

(3) position_err/speed of light, that is, a quotient of the position_err by the speed of light.

(4) −position_err/speed of light, that is, a quotient of −position_err by the speed of light.

Similarly, the offset may be a negative value, to avoid generation of ISI. The offset may be a positive value, to avoid an excessively small TA value. Finally, the terminal may perform addition or subtraction between the calculated TA adjustment value and the offset (for example, −2×position_err/speed of light), to obtain a timing advance that can be used by the terminal. The TA adjustment value obtained by the terminal through calculation may be the sum of the round-trip delay of the service link and the common compensation timing advance value (or the difference).

It should be noted that the offset may include one or more of an offset related to the TDD mode or the FDD mode, an offset related to a position error of the second network device, and an offset related to a position error of the terminal. If the offset includes not only the part related to the TDD mode or the FDD mode, but also the position error part of the second network device and/or the position error part of the terminal, the network side may combine (for example, through addition or subtraction) these parts and then send them to the terminal, or separately send these parts to the terminal. Correspondingly, after receiving the combined offset, the terminal may directly use the offset; or after receiving the foregoing parts, the terminal combines (through addition or subtraction) the foregoing parts and uses the combined offset as a final offset. A value of the offset may be agreed on by using a protocol, or may be sent/configured by the network side to the terminal.

Manner 2: The fixed value is a numerical drift.

As described above (for example, Embodiment 3), the network side sends the common compensation timing advance value (that is, the round-trip delay value between the satellite and the compensation reference point) to the terminal to replace the position coordinates of the compensation reference point. When the compensation reference point is on the feeder link, the common compensation timing advance value needs to be used after a positive sign is added before the value. When the compensation reference point is on the service link, the common compensation timing advance value needs to be used after a negative sign is added before the value.

To improve the flexibility of the solution, in this embodiment of this application, the terminal side may not know whether the compensation reference point is on the feeder link or the service link, but the network side sends, to the terminal, a common timing parameter used by the terminal to determine the common compensation timing advance value. The network side may send/configure a numerical drift to the terminal. After receiving the common timing parameter, the terminal performs subtraction or addition between the common timing parameter and the numerical drift, to obtain the common compensation timing advance value used by the terminal, that is:

common compensation timing advance value=common timing parameter+numerical drift; or common compensation timing advance value=common timing parameter−numerical drift.

The common compensation timing advance value herein that is obtained through common timing parameter+/−numerical drift may be positive, or may be negative.

Correspondingly, the terminal may add the round-trip delay of the service link, the common timing parameter, and the +numerical drift in the NTN to obtain a TA to be used. + represents + or −. That is:

TA=round-trip delay of the service link (or timing advance adjustment value of the service link)
+common compensation timing advance value
=round-trip delay of the service link+common timing parameter+numerical drift.

For example, when the numerical drift is a positive value, the common compensation timing advance value used by the terminal may be obtained through calculation by using the following formula: common compensation timing advance value=common timing parameter—numerical drift. A value of the numerical drift may be agreed on by using a protocol, or may be sent/configured by the network side to the terminal. For example, the common timing parameter sent by a transmit end ranges from 0 to 10. After receiving the common timing parameter, a receive end subtracts a numerical drift (assumed to be 5) from the common timing parameter, to obtain a common compensation timing advance value that ranges from −5 to 5. This method is equivalent to translating, at the receive end, a common timing parameter sent by the transmit end for a length of a numerical drift, so as to obtain a representation range of a common compensation timing advance value to be used.

It may be understood that, the method may also be used for sending another numerical parameter, so that the transmit end sends a positive value or a negative value, and the receive end may translate the numerical range, achieving range representation with a positive/negative value. This not only improves flexibility of the solution, but also reduces complexity of the transmit end.

Manner 3: The fixed value includes an offset and a numerical drift.

The network side not only sends an offset to the terminal, but also agrees on a numerical drift with the terminal (or the network side sends a numerical drift to the terminal), so that the terminal side may add the round-trip delay of the service link, the common timing parameter, the ±numerical drift, and the ±offset in the NTN, to obtain a TA to be used, that is:

TA=round-trip delay of the service link+common compensation timing advance value offset =round-trip delay of the service link+common timing parameter±numerical drift offset.

It should be understood that the foregoing three manners are merely examples of rather than limitations on the fixed value. A possibility of another implementation is not excluded in actual application.

Further, the fixed value such as the offset, the common timing parameter, or the numerical drift may be carried in at least one type of broadcast information such as a system information block (SIB) 1, other system information (OSI), and a master information block (MIB), and is sent by the network device to the terminal in a broadcast or multicast manner. In addition, if the offset, the common timing parameter, the numerical drift, and the like are sent in a radio resource control (RRC) connection phase, the network side may carry the information in at least one of RRC information, an RRCReconfiguration message, downlink control information (DCI), group DCI, a medium access control (MAC) control element (CE), and a timing advance command (TAC). Alternatively, the information is sent to UE along with data transmission or on a separately allocated PDSCH bearer.

The following describes designs of signaling such as an offset, a common timing parameter, and a numerical drift by using specific examples.

Example 1: The network side may add a new variable field, for example T-offset, to a random access generic configuration (RACH-ConfigGeneric) parameter, to indicate an offset. The RACH-ConfigGeneric parameter is generally sent to the UE in a broadcast message or an RRC message, and provides the UE with a generic parameter used in a random access procedure. For example:

```
RACH-ConfigGeneric ::=      SEQUENCE {
prach-ConfigurationIndex    INTEGER (0..255),
T-offset                    INTEGER (0.. 511),
... ...
}
```

Optionally, the network side may determine a representation range of T-offset based on a maximum possible distance value of an ephemeris error, a satellite position error, or a satellite positioning error. In an example in which a maximum value of the ephemeris error or the satellite position error is 10 km, T-offset uses $16\times Ts/2^\mu$ as a dimension unit, T-offset is represented in a range of 0 to 511, and 9-bit signaling is needed for representation.

It may be understood that, with different maximum satellite positioning error ranges and time dimension units being assumed, T-offset may have different representation ranges. For example, after receiving T-offset, the terminal subtracts the T-offset value from the TA adjustment value obtained by the terminal to finally obtain a timing advance TA value used by the terminal, that is, TA=$(N_{TA}$−T-offset)×$16\times Ts/2$, or subtracts the T-offset value and the timing interval $N_{TAoffset}$ from the TA adjustment value obtained by the terminal to finally obtain a timing advance TA value used by the terminal, that is, TA=$(N_{TA}+N_{TAoffset}$−T-offset)×$16\times Ts/2^\mu$. The $N_{TA}$ is a TA adjustment value obtained by the terminal based on a parameter indicated by the network side, for example, a TA adjustment value calculated by the terminal based on at least one of a common timing advance value, a common compensation timing advance value, reference point coordinates, and position information of the terminal that are sent by the network side in this embodiment of this application.

Optionally, the RACH-ConfigGeneric parameter may be transmitted in messages such as an SIB1, RRC setup signaling (RRCSetup), RRC reconfiguration signaling (RRCReconfiguration), or RRC resume signaling (RRCResume), so that it can be ensured that the terminal can receive values such as an offset, a common timing parameter, and a numerical drift in an initial access phase and during connection state switching, establishing accurate uplink time synchronization.

Example 2: The network side may send, to the terminal, a distance value of an ephemeris error, a position error, or a positioning error that can determine an offset by using a random access generic configuration (RACH-ConfigGeneric) parameter. D-offset is used to represent the distance value of the ephemeris error, the position error, or the positioning error of the offset.

```
RACH-ConfigGeneric ::=      SEQUENCE {
prach-ConfigurationIndex    INTEGER (0..255),
D-offset                    INTEGER (0.. 1000),
... ...
}
```

In this example, a new variable field, that is, D-offset, is added to the RACH-ConfigGeneric parameter to indicate a distance value that can determine an ephemeris error, a position error, or a positioning error of an offset.

In this example, the network side may determine a representation range of D-offset based on a maximum possible distance value of an ephemeris error, a satellite position error, or a satellite positioning error. In an example in which the maximum value of the ephemeris error or the satellite position error is 10 km, D-offset uses meter as a dimension unit, D-offset is represented in a range of 0 to 1000, and 10-bit signaling is needed for representation. The 10 bits may represent a range of 0 to 1023, where 1001 to 1023 are set as reserved, or may be reserved for another indication purpose.

It may be understood that, with different maximum satellite positioning error ranges and time dimension units being assumed, D-offset may have different representation ranges.

For example, after receiving D-offset, the terminal may subtract D-offset/speed of light from the TA adjustment value obtained by the terminal, or subtract ⌈D-offset/speed of light/$(16 \cdot 64 \cdot T_c/2^\mu)$⌉ from the TA adjustment value, to obtain a timing advance TA value used by the terminal. "⌈ ⌉" represents rounding up to the nearest integer. That is:

$$TA = N_{TA} \times 16 \times Ts/2^\mu - D\text{-offset/speed of light; or}$$

$$TA = (N_{TA} - \lceil D\text{-offset/speed of light}/(16 \cdot 64 \cdot T_c/2^\mu)\rceil + N_{TAoffset}) \times 16 \times Ts/2^\mu$$

Tc represents a time unit $T_c = 1/(\Delta f_{max} \cdot N_f)$, where $\Delta f_{max} = 480 \times 10^3$ Hz, and $N_f = 4096$. It can be learned from the foregoing definition of Ts that $\kappa = TS/T_c = 64$, that is Ts=$1/(\Delta f_{ref} \cdot N_{f,ref})$, where $\Delta f_{ref} = 15 \cdot 10^3$ Hz, and $N_{f,ref} = 2048$.

Example 3: The network side may send a common compensation timing advance value to the terminal by using a random access generic configuration (RACH-ConfigGeneric) parameter, to enable the terminal to obtain an accurate TA value and apply to access a communication system. TA-common is used to represent the common compensation timing advance value.

```
RACH-ConfigGeneric ::=    SEQUENCE {
prach-ConfigurationIndex  INTEGER (0..255),
TA-common                 INTEGER (-4155513.. 4155513),
... ...
}
```

In this example, the network side adds a new variable field, for example, TA-common, to the RACH-ConfigGeneric parameter to indicate a parameter value used to determine the common compensation timing advance value or the common timing advance value.

Optionally, the network side may determine a representation range of TA-common based on a maximum possible orbit altitude and a minimum possible communication elevation angle of the satellite.

For example, it is assumed that the orbit is the GEO orbit, the minimum communication elevation angle is 10 degrees, and $16 \cdot 64 \cdot T_c/2^\mu$ is used as a dimension unit. TA-common needs to represent a range of –4155513 to +4155513, and 23-bit signaling is needed for representation. The 23 bits may represent a range of –4194303 to +4194303. A range of –4194303 to –4155513 and a range of 4194303 to 4155513 are reserved, or may be reserved for another indication purpose. It may be understood that, with different satellite orbit altitudes, minimum elevation angles, and time dimension units being assumed, TA-common representation ranges may be different.

After receiving TA-common, the terminal may calculate a round-trip delay of the service link based on the terminal position and the satellite position, and add the round-trip delay to a time length represented by TA-common, to obtain the TA adjustment value.

It should be understood that TA-common may represent a common compensation timing advance value, or may represent a common propagation delay that needs to be compensated for by the terminal.

It should be understood that TA-common may represent a positive value, a negative value, and zero. A positive value indicates that an uplink signal is sent in advance, and a negative value indicates that an uplink signal is sent after a delay.

Example 4: The network side may indicate the common compensation timing advance signaling based on a range of orbit altitudes in a combined manner, to save signaling bits. For example:

```
RACH-ConfigGeneric ::=    SEQUENCE {
prach-ConfigurationIndex  INTEGER (0..255),
TA-common-LEO             BIT STRING (SIZE(20)),
TA-common-complement      BIT STRING (SIZE(3)) OPTIONAL,
... ...
}
```

In this example, the network side adds two new variable fields to the RACH-ConfigGeneric parameter, that is, low orbit common timing advance TA-common-LEO and common timing advance complement TA-common-complement, to represent a common propagation delay that is used to determine the common compensation timing advance value or that needs to be compensated for by the terminal. TA-common-complement may be optionally sent, that is, the network side may choose to send or not to send the TA-common-complement parameter. The network side may determine, based on an orbit altitude of the second network device, whether to send the TA-common-complement parameter. For details, refer to the following examples.

Optionally, the network side may determine representation ranges and bit quantities of TA-common-LEO and TA-common-complement based on the range of orbit altitudes and the minimum possible communication elevation angle of the satellite.

For example, in a scenario in which the orbit altitude is not higher than 1200 km, the network side may send only TA-common-LEO signaling (20 bits), that is, TA-common-complement is not sent. In this case, only 20-bit signaling needs to be sent to represent the common compensation timing advance value, to represent a range of –320609 to +320609. The 20 bits may represent a range of –524287 to +524287. A range of –524287 to –320609 and a range of 320609 to 524287 are reserved, or may be reserved for another indication purpose.

For example, in a scenario in which the orbit altitude is higher than 1200 km, the network side may send TA-common-LEO and TA-common-complement signaling (3 bits) to the UE. TA-common-LEO represents a high-order bit, and TA-common-complement represents a low-order bit. TA-common-LEO and TA-common-complement constitute 23-bit signaling, representing a range from –4155513 to 4155513. The 23 bits may represent a range of –4194303 to +4194303. A range of –4194303 to –4155513 and a range of 4194303 to 4155513 are reserved, or may be reserved for another indication purpose.

After receiving the common compensation timing advance value represented by TA-common-LEO and TA-common-complement, the terminal may calculate a round-trip delay of the service link based on the terminal position and the satellite position, and add the round-trip delay to a time length represented by the common compensation timing advance value, to obtain the TA adjustment value. Such a signaling transmission method not only provides flexibility, but also saves some signaling bits in a scenario in which the orbit altitude is not high.

Example 5: The network side may separately indicate the common compensation timing advance signaling based on a range of orbit altitudes, to save signaling bits in scenarios of different orbit altitudes. For example:

```
RACH-ConfigGeneric :=        SEQUENCE{
prach-ConfigurationIndex     INTEGER (0..255),
TA-common-LEO-600            INTEGER (-197800.. 197800)
                             OPTIONAL,
TA-common-LEO-1200           INTEGER (-320609.. 320609)
                             OPTIONAL,
TA-common-GEO                INTEGER (-4155513..
4155513) OPTIONAL,
... ...
}
```

In this example, the network side adds three new variable fields to the RACH-ConfigGeneric parameter, that is, low orbit 600 common timing advance TA-common-LEO-600, low orbit 1200 common timing advance TA-common-LEO-1200, and geostationary orbit common timing advance TA-common-GEO, to represent a parameter value of the common propagation delay that is used to determine the common compensation timing advance value or that needs to be compensated for by the terminal. TA-common-LEO-600, TA-common-LEO-1200, and TA-common-GEO may all be optionally sent, that is, the network side may choose to send only one, only two, or all of the three parameters.

Optionally, the network side may determine representation ranges and bit quantities of TA-common-LEO-600, TA-common-LEO-1200, and TA-common-GEO based on the range of orbit altitudes and the minimum possible communication elevation angle of the satellite. TA-common-LEO-600 represents a parameter related to the common compensation timing advance value at an orbit altitude not higher than 600 km, TA-common-LEO-1200 represents a parameter related to the common compensation timing advance value at an orbit altitude not higher than 1200 km, and TA-common-GEO represents a parameter related to the common compensation timing advance value at an orbit altitude not higher than 36000 km.

For example, in a scenario in which the orbit altitude is not higher than 600 km, the network side may send TA-common-LEO-600 signaling (19 bits), that is, TA-common-LEO-1200 and TA-common-GEO are not sent. In this case, only 19-bit signaling needs to be sent for the terminal to determine the common compensation timing advance value, to represent a range of −197800 to +197800. The 19 bits may represent a range of −262143 to ++262143. A range of −262143 to −197800 and a range of 197800 to 262143 are reserved, or may be reserved for another indication purpose.

For example, in a scenario in which the orbit altitude is higher than 600 km and not higher than 1200 km, the network side may send TA-common-LEO-1200 signaling (20 bits) to the UE, that is, TA-common-LEO-600 and TA-common-GEO are not sent. In this case, only 20-bit signaling needs to be sent for the terminal to determine the common compensation timing advance value, to represent a range of −320609 to +320609. The 20 bits may represent a range of −524287 to +524287. A range of −524287 to −320609 and a range of 320609 to 524287 are reserved, or may be reserved for another indication purpose.

For example, in a scenario in which the orbit altitude is higher than 1200 km, the network side needs to send TA-common-GEO signaling (23 bits), that is, TA-common-LEO-600 and TA-common-LEO-1200 are not sent. In this case, 23-bit signaling needs to be sent for the terminal to determine the common compensation timing advance value, to represent a range of −4155513 to +4155513. The 23 bits may represent a range of −4194303 to +4194303. A range of −4194303 to −4155513 and a range of 4194303 to 4155513 are reserved, or may be reserved for another indication purpose.

After receiving the common compensation timing advance value represented by any one or more of TA-common-LEO-600, TA-common-LEO-1200, or TA-common-GEO, the terminal may calculate a round-trip delay of the service link based on the terminal position and the satellite position, and add the round-trip delay to a time length represented by the common compensation timing advance value, to obtain the TA adjustment value.

Example 6: The network side may send, to the terminal by using a random access common configuration (RACH-ConfigGeneric) parameter, a parameter value (that is, a common timing parameter, where TA-common-timing is used to represent the common timing parameter) used to determine the common compensation timing advance value or the common timing advance value.

```
RACH-ConfigGeneric ::=       SEQUENCE{
prach-ConfigurationIndex     INTEGER (0..255),
TA-common-timing             INTEGER (0... 8311026),
... ...
}
```

In this example, the network side adds a common timing parameter as a new variable field, that is, TA-common-timing, to the RACH-ConfigGeneric parameter to indicate a parameter value used to determine the common compensation timing advance value or the common timing advance value.

Optionally, the network side may determine a representation range of TA-common-timing based on a maximum possible orbit altitude and a minimum possible communication elevation angle of the satellite.

For example, it is assumed that the orbit is the GEO orbit, the minimum communication elevation angle is 10 degrees, and $16 \cdot 64 \cdot T_c/2^u$ is used as a dimension unit. TA-common-timing needs to represent a range of 0 to 8311026, and 23-bit signaling is needed for representation. The 23 bits may represent a range of 0 to 8388607. A range of 8311027 to 8388607 is reserved, or may be reserved for another indication purpose.

It may be understood that, with different satellite orbit altitudes, minimum elevation angles, and time dimension units being assumed, TA-common-timing representation ranges may be different.

After receiving the common timing parameter TA-common-timing, the terminal subtracts the numerical drift from the common timing parameter TA-common-timing, to obtain the common compensation timing advance value or the common timing advance value.

For example, it is assumed that the numerical drift is 4155513 (a value of the numerical drift may be agreed on by using a protocol, or may be configured by the network side to the terminal). After receiving TA-common-timing, the terminal obtains the common compensation timing advance value through TA-common-timing −4155513, and a representation range of the common compensation timing advance value is −4155513 to +4155513. This method is equivalent to performing an offset operation on the received TA-common-timing value, that is, TA-common-timing— numerical drift. That the numerical drift is equal to 4155513 is used as an example herein, and actual use is not limited to this value. For another example, after receiving TA-common-timing, the terminal may obtain the common compensation timing advance value through calculation, then calculate a round-trip delay of the service link based on the terminal position and the satellite position, and add the round-trip delay to a time length represented by the common compensation timing advance value, to obtain the TA adjustment value.

Further, the signaling transmission manners in the foregoing several examples may be combined for use.

For example, the network side may add three new variable fields to the RACH-ConfigGeneric parameter, that is, low orbit 600 common timing parameter TA-common-timing-LEO-600, low orbit 1200 common timing parameter TA-common-timing-LEO-1200, and geostationary orbit common timing parameter TA-common-timing-GEO, to indicate a common timing parameter value of the common propagation delay that is used to determine the common compensation timing advance value or that needs to be compensated for by the terminal:

```
RACH-ConfigGeneric ::=        SEQUENCE{
prach-ConfigurationIndex      INTEGER (0..255),
   TA-common-timing-LEO-600   INTEGER (0.. 395600) OPTIONAL,
   TA-common-timing-LEO-1200  INTEGER (0.. 641218) OPTIONAL,
   TA-common-timing-GEO       INTEGER (0.. 8311026) OPTIONAL,
... ...
}
```

Optionally, representation ranges and bit quantities of TA-common-timing-LEO-600, TA-common-timing-LEO-1200, and TA-common-timing-GEO may be determined based on the range of orbit altitudes and the minimum possible communication elevation angle of the satellite. TA-common-timing-LEO-600 represents a common timing parameter related to the common compensation timing advance value at an orbit altitude not higher than 600 km, TA-common-timing-LEO-1200 represents a common timing parameter related to the common compensation timing advance value at an orbit altitude not higher than 1200 km, and TA-common-timing-GEO represents a common timing parameter related to the common compensation timing advance value at an orbit altitude not higher than 36000 km. TA-common-timing-LEO-600, TA-common-timing-LEO-1200, and TA-common-timing-GEO may all be optionally sent, that is, the network side may choose to send one of the three parameters.

For example, in a scenario in which the orbit altitude is not higher than 600 km, the minimum communication elevation angle is 10 degrees, and $16 \cdot 64 \cdot T_c / 2^u$ is used as a dimension unit. The network side may send TA-common-timing-LEO-600 signaling (19 bits), that is, TA-common-timing-LEO-1200 and TA-common-timing-GEO are not sent. In this case, only 19-bit common timing parameter signaling needs to be sent for the terminal to determine the common compensation timing advance value, to represent a range of 0 to 395600. The 19 bits may represent a range of 0 to 524287. A range of 395601 to 524287 is reserved, or may be reserved for another indication purpose. Similarly, TA-common-timing-LEO-1200 signaling and the TA-common-timing-GEO signaling use 20 bits and 23 bits to represent ranges of 0 to 641218 and 0 to 8311026 respectively.

For example, it is assumed that there are different numerical drifts for common timing parameters of different orbit parameter ranges. A numerical drift value corresponding to TA-common-timing-LEO-600 is 197800, a numerical drift value corresponding to TA-common-timing-LEO-1200 is 320609, and a numerical drift value corresponding to TA-common-timing-GEO is 4155513. After receiving TA-common-timing-LEO-600, the terminal obtains the common compensation timing advance value through the TA-common-timing-LEO-600-197800, and a representation range of the common compensation timing advance value is −197800 to 197800.

For another example, for different satellite orbit altitudes, minimum elevation angles, and time dimension units, representation ranges of TA-common-timing-LEO-600, TA-common-timing-LEO-1200, or TA-common-timing-GEO may be different. After receiving the common timing parameter TA-common-timing-LEO-600, TA-common-timing-LEO-1200, or TA-common-timing-GEO, the terminal subtracts a corresponding numerical drift from the common timing parameter, to obtain a common compensation timing advance value or a common timing advance value. The terminal may calculate a round-trip delay of the service link based on the terminal position and the satellite position, and add the round-trip delay of the service link to a time length represented by the common compensation timing advance value, to obtain the TA adjustment value.

The following further uses several detailed examples to describe how the terminal calculates the TA value for use based on the terminal position, the satellite position, the common compensation timing advance value, and the like.

It is assumed that the dimension unit is $16 \cdot 64 \cdot T_c / 2^u$, a quantized value of the round-trip delay of the service link is as follows:

$$NT_{service} = \lfloor RTD_{service}/(16 \cdot 64 \cdot T_c/2^u) \rfloor = \lfloor (2 \times \text{distance}_{service}/\text{speed of light})/(16 \cdot 64 \cdot T_c/2^u) \rfloor; \quad (1)$$

$RTD_{service}$ represents the round-trip delay between the terminal and the satellite, and is equal to twice the quotient of the distance between the terminal and the satellite by the speed of light. "$\lfloor \ \rfloor$" represents rounding down to the nearest integer.

If the common compensation timing advance value obtained by the terminal is $NT_{common}$, a TA value that is obtained by the terminal and that is used to send a random access preamble preamble or uplink data is:

$$TA = \pm (NT_{service} + NT_{common}) * 16 * 64 T_c / 2^u. \quad (2)$$

If the offset T-offset, the common timing parameter, and the numerical drift are considered, the TA value used by the terminal is:

$$TA = (NT_{service} + NT_{common} - T_{offset}) * 16 * 64 T_c / 2^u \quad (3)$$

If the position error D-offset, the common timing parameter, and the numerical drift are considered, the TA value used by the terminal is:

$$TA = (NT_{service} + NT_{common} - \lfloor (2 \times D\text{-offset}/\text{speed of light})/(16 \cdot 64 \cdot T_c/2^u) \rfloor) \times 16 \times 64 T_c / 2^u \quad (4)$$

It can be seen that, T-offset in formula (3) is replaced by $\lfloor (2 \times D\text{-offset}/\text{speed of light})/(16 \cdot 64 \cdot T_c/2^u) \rfloor$ in formula (4), indicating that the timing uncertainty caused by the satellite positioning error is subtracted from the timing advance value to be used by the terminal, that is, the timing uncertainty is twice the possible satellite positioning error divided by the speed of light, and then quantization through rounding up is performed based on the time unit ($16 \cdot 64 \cdot T_c / 2^u$)

Alternatively, the TA value used by the terminal may be:

$$TA = (NT_{service} + TA\text{-common-timing-numerical drift}) \times 16 \times 64 T_c / 2^u \quad (5)$$

TA-common-timing-numerical drift is used to replace the common compensation timing advance value $NT_{common}$.

Alternatively, the TA value used by the terminal may be:

$$TA = (NT_{service} + TA\text{-common-timing-numerical drift} - T\text{-offset}) \times 16 \times 64 T_c / 2^u \quad (6)$$

Alternatively, the TA value used by the terminal may be:

$$TA=(NT_{service}+TA\text{-common-timing-numerical drift}-[(2\times D\text{-offset/speed of light})/(16\cdot 64\cdot T_c/2^u)])\times 16\times 64T_c/2^u \quad (7)$$

It should be understood that, if the TA value is obtained through calculation in another time unit, only a new time unit needs to be used to replace the time unit $(16\cdot 64\cdot T_c/2^u)$ in the foregoing formulas (1) to (7). For example, if $64\cdot T_c/2^u$ is used as the dimension unit, replace the time unit $(16\cdot 64\cdot T_c/2^u)$ in formulas (1) to (7) with the time unit $64\cdot T_c/2^u$.

If $64\cdot T_c/2^u$ is used as the time unit when $NT_{service}$ is calculated, and $16\cdot 64\cdot T_c/2^u$ is used as the time unit when the common compensation timing advance value $NT_{common}$, the common timing parameter, the numerical drift, and the like are obtained, $NT_{service}=[RTD_{service}/(64\cdot T_c/2^u)]=[(2\times \text{distance}_{service}/\text{speed of light})/(64\cdot T_c/2^u)]$. In this case, the TA value used by the terminal is:

$$TA=(NT_{service}/16+NT_{common})\times 16\times 64T_c/2^u \quad (8)$$

If the offset T-offset or the position error D-offset, the common timing parameter and the numerical drift are considered, the TA value used by the terminal is:

$$TA=(NT_{service}/16+NT_{common}-T\text{-offset})\times 16\times 64T_c/2^u \quad (9)$$

Alternatively, $$TA=(NT_{service}/16+NT_{common}-[(2\times D\text{-offset/speed of light})/(16\cdot 64\cdot T_c/2^u)])\times 16\times 64T_c/2^u \quad (10)$$

Similarly, T-offset in formula (9) is replaced by $[(2\times D\text{-offset/speed of light})/(16\cdot 64\cdot T_c/2^u)]$ in formula (10), indicating that the timing uncertainty caused by the satellite positioning error is subtracted from the timing advance value to be used by the terminal, that is, the timing uncertainty is twice the possible satellite positioning error divided by the speed of light, and then quantization through rounding up is performed based on the time unit $(16\cdot 64\cdot T_c/2^u)$ Alternatively, the TA value used by the terminal may be:

$$TA=(NT_{service}/16+TA\text{-common-timing-numerical drift})\times 16\times 64T_c/2^u \quad (11)$$

(TA-common-timing-numerical drift) is used to replace the common compensation timing advance value $NT_{common}$.

Alternatively, the TA value used by the terminal may be:

$$TA=(NT_{service}/16+TA\text{-common-timing-numerical drift}-T\text{-offset})\times 16\times 64T_c/2^u \quad (12)$$

Alternatively, the TA value used by the terminal may be:

$$TA=(NT_{service}/16+TA\text{-common-timing}-T\text{-offset}-[(2\times D\text{-offset/speed of light})/(16\cdot 64\cdot T_c/2^u)])\times 16\times 64T_c/2^u \quad (13)$$

The following describes impact of cell handover, beam switch, gateway switch, and satellite switch on common compensation timing advance or common timing advance.

1. Cell Handover (1) In a cell handover procedure, UE measures and reports channel quality of a neighboring cell based on an instruction from a network side. Then, a gNB on which a source cell is located (which is referred to as a source gNB for short, and may be the same as or different from a gNB on which a target cell is located) sends RRCReconfiguration signaling to the UE. It can be learned from the foregoing signaling that the common compensation timing advance or the common timing advance signaling exists in the RRCReconfiguration. Therefore, a common compensation timing advance or common timing advance of the target cell may be carried in the RRCReconfiguration. For a non-random access handover (RACHless handover), the source gNB may also send RRCReconfiguration signaling to the UE, or may send a common compensation timing advance value or a common timing advance value of the target gNB to the UE.

(2) The UE receives an SIB1 of the target cell, and can also obtain the common compensation timing advance or the common timing advance of the target cell.

2. Satellite switch: Refer to the cell handover procedure. Details are not described herein.

3. Beam switch: When a source beam and a target beam belong to a same cell, the common compensation timing advance or the common timing advance is broadcast in an SIB1, and is cell-level signaling. Therefore, when beam switch is performed, the two beams use a same common compensation timing advance or a same common timing advance, and jumped timing does not occur. (If the common compensation timing advance or the common timing advance is beam-level, values of delay compensation made by the network side for different beams may be different, and consequently jumped timing occurs. In this case, the common compensation timing advance value or the common timing advance value needs to be carried in BWP switch signaling, for example, carried in BWP-UplinkDedicated signaling.)

4. Gateway switch

When soft gateway switch occurs, that is, the UE can establish connections to two gateways at the same time and can receive messages from the two gateways, the gateway switch scenario may be equivalent to a cell handover procedure. To be specific, a common compensation timing advance value or a common timing advance value of a target gateway may be sent to the UE in RRCReconfiguration signaling.

When hard gateway switch occurs, to be specific, the UE can establish a connection to only one gateway at a time. When the UE is disconnected from a gateway and is connected to another gateway, that is, a hard switch occurs, a delay of a feeder link changes. Before the gateway switch, the gNB may send, to the UE, a common compensation timing advance value or a common timing advance value to be used by the UE at the target gateway, or a difference between the common compensation timing advance value to be used by the UE at the target gateway and the common compensation timing advance value currently in use, or a difference between the common timing advance value to be used by the UE at the target gateway and the common timing advance value currently in use. For example, UEs of the entire beam or cell need to update the common compensation timing advance value or the common timing advance value. Therefore, the RRCReconfiguration signaling may be used to carry the foregoing parameter for the update.

Further, when the soft gateway switch or hard gateway switch occurs, the gNB sends, to the UE through MAC CE signaling, the common compensation timing advance value or a common timing advance value to be used by the UE at the target gateway, or the difference between the common compensation timing advance value to be used by the UE at the target gateway and the common compensation timing advance value currently in use, or the difference between the common timing advance value to be used by the UE at the target gateway and the common timing advance value currently in use.

In some special scenarios, sending the difference of the common compensation timing advance value or the difference of the common timing advance value also needs to use a same quantity of bits as sending the complete common compensation timing advance value or the common timing advance value. For example, when the network side makes timing compensation for an uplink signal before a switch, and makes no timing compensation for an uplink signal after the switch, a complete round-trip delay of the feeder link needs to be represented. In this case, a quantity of bits needed by the difference of the common compensation timing advance value is the same as a quantity of bits needed to represent the complete common compensation timing advance value. If the protocol does not support these special scenarios, sending the difference of the common compensation timing advance value can save signaling overheads compared with sending the complete common compensation timing advance value.

The following describes validity of the common compensation timing advance value or the common timing advance value.

If an SIB1 carries the common compensation timing advance value or the common timing advance value, an update cycle of the SIB1 determines a maximum error of the common compensation timing advance value or the common timing advance value. The error is caused by relative movement between the satellite and the gateway.

System information (including the SIB1) is updated only at a start frame of a modification period (modification period), and the modification period meets the following conditions:

SFN mod $m$=0, where m represents a quantity of system frames included in a length of the modification period, SFN represents a system frame number, mod represents modulo, and m=modificationPeriodCoeff×defaultPagingCycle, unit: frame;
modificationPeriodCoeff=2/4/8/16;
defaultPagingCycle=32/64/128/256.
modificationPeriodCoeff and defaultPagingCycle may be configured by usign the SIB1.

It can be learned that a minimum medification period is 64 frames=640 ms.

It is assumed that the common compensation timing advance value indicates a difference between a round-trip delay of the feeder link and a value of timing compensation made by the network side for uplink data. If the satellite moves closer to the gateway, a value indicated by the common compensation timing advance may be large, and a preamble or uplink data may arrive earlier. This generates inter-symbol interference ISI.

A common compensation timing advance value or a common timing advance value corresponding to a start moment of a next update cycle may be sent at a start moment of an update cycle, to avoid ISI. In this way, the sent common compensation timing advance value or the sent common timing advance value is small, and the preamble or the uplink data sent by the UE arrives at the network side late, to avoid ISI. For example, if the update cycle is 640 ms, the delay does not exceed 33.28 μs.

Embodiment 15

The idea of the technical solution of the present invention may also be applicable to sending of a timing advance rate (TA rate) reference point and a Doppler pre-compensation reference point/a Doppler post-compensation reference point.

Specifically, the TA rate reference point may be classified into a service link TA rate reference point and a feeder link TA rate reference point. Service link TA rates mentioned herein and hereinafter refer to a service link common TA rate.

Service link timing advance rate (TA rate) reference point: A terminal may calculate a service link common timing advance rate of a beam or a cell based on a relative movement speed or a distance change rate between a satellite (the terminal may obtain information about a position and speed of the satellite through ephemeris information) and a service link TA rate reference point. For example, the terminal may obtain, through calculation, a relative speed V between the satellite and the reference point based on the movement direction of the satellite, the satellite position, and the reference point position (when the satellite and the reference point move closer to each other, V is a negative value; and when the satellite and the reference point move farther away from each other, V is a positive value). The TA rate is equal to 2×V/c, and c is a speed of light of $3 \times 10^8$ m/s. In this way, a change value of the TA after a time interval $\Delta T$ may be obtained through calculation based on the TA rate, where the change value is $\Delta T \times 2 \times V/c$. A corrected TA is TA_original+$\Delta T \times 2 \times V/c$, where TA_original is a previously used TA. Therefore, the terminal may correct, based on the common timing advance rate, a timing advance for signal sending by the terminal (if there is a common timing advance rate of a feeder link, a combination of the common timing advance rate of the service link and the common timing advance rate of the feeder link, that is, a sum of the two, may be used to calculate a final TA rate, so as to correct an uplink timing advance adjustment value).

Feeder link timing advance rate (TA rate) reference point: A terminal may calculate a feeder link common timing advance rate of a beam or a cell based on a relative movement speed or a distance change rate between a satellite (the terminal may obtain information about a position and speed of the satellite through ephemeris information) and a feeder link TA rate reference point (similar to the foregoing description). The terminal corrects, based on the common timing advance rate, a timing advance adjustment value of a signal sent by the sending terminal (if there is a common timing advance rate of a service link, a combination of the common timing advance rate of the service link and the common timing advance rate of the feeder link, that is, a sum of the two, may be used to calculate a final TA rate, so as to correct an uplink timing advance adjustment value). The feeder link timing advance rate reference point may be position coordinates of a gateway.

Doppler pre/post-compensation reference point: A terminal may calculate a Doppler pre/post-compensation value of a beam or a cell based on a relative movement speed between a satellite (the terminal may obtain information about a position and speed of the satellite through ephemeris information) and a Doppler pre/post-compensation reference point. The Doppler pre/post-compensation value may represent a value of Doppler post-compensation made by the satellite for a signal that is sent by the terminal and that is received in a corresponding beam/cell, and a value of Doppler pre-compensation made by the satellite for a downlink signal sent in a corresponding beam/cell. Alternatively, the Doppler pre/post-compensation value may represent a value of Doppler pre-compensation that needs to be made by the terminal when the terminal sends a signal, and a value of Doppler post-compensation made by the terminal on a signal when the terminal receives a downlink signal. The Doppler pre/post-compensation reference point may be at any position within coverage of the beam/cell based on a system requirement, for example, a center point of the beam/cell.

If the Doppler value calculated based on the Doppler pre/post-compensation reference point, the satellite position, and the movement direction represents a value of Doppler pre-compensation made by a network side for a downlink signal, a terminal with a global navigation satellite system (GNSS) function may obtain a frequency offset of a crystal oscillator through calculation based the Doppler pre-compensation value and a frequency offset value of the downlink signal. Similarly, the terminal with the GNSS function may obtain, through calculation based on the terminal position, the satellite position, and the movement direction of the satellite, a Doppler frequency shift value caused by an uplink channel. By subtracting the value of Doppler post-compensation made by the satellite side for the signal sent by the terminal from the Doppler frequency shift value of the uplink channel, a value of pre-compensation made by the terminal with the GNSS function for a signal sent by the terminal may be obtained.

Figure 21A:
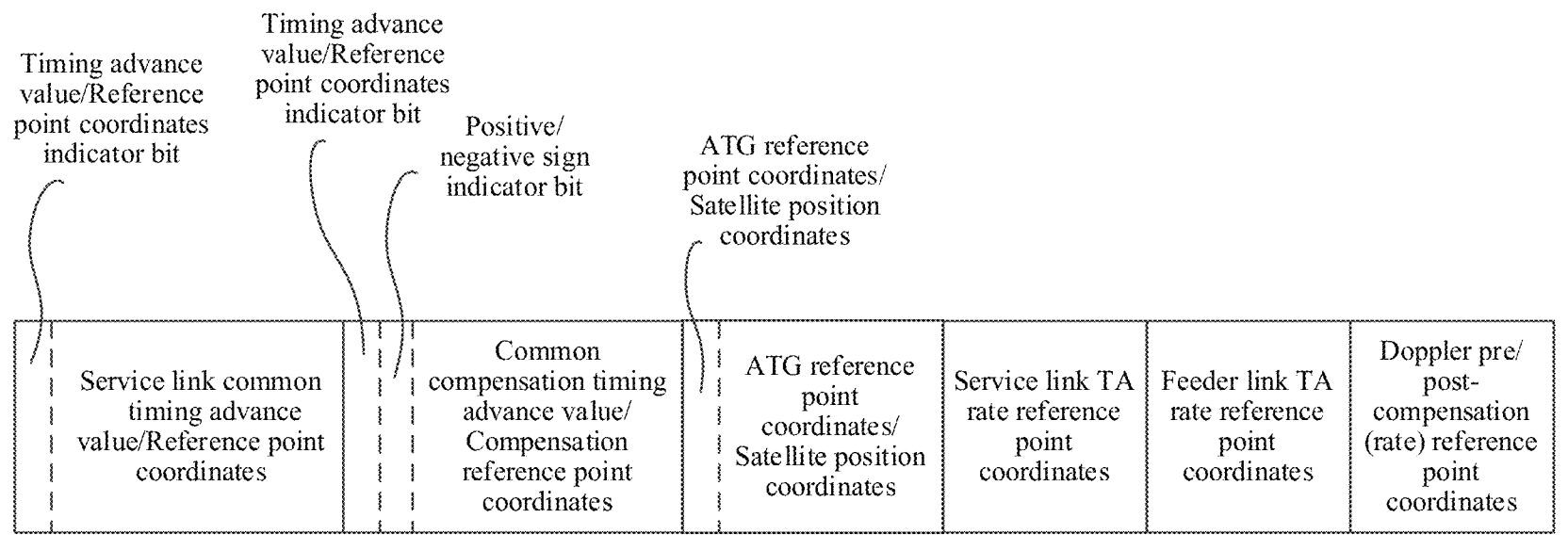

Refer to FIG. 21A. In a possible design, a reference point group may be defined, including service link reference point coordinates, compensation reference point coordinates, ATG reference point coordinates, service link TA rate reference point coordinates, feeder link TA rate reference point coordinates, and Doppler pre/post-compensation reference point coordinates. Refer to FIG. 21B. In another possible design, the network side may separately send the coordinates of the service link TA rate reference point, the feeder link TA rate reference point coordinates, and the Doppler pre/post-compensation reference point coordinates.

It should be understood that the foregoing plurality of reference points (for example, the service link TA rate reference point, the feeder link TA rate reference point coordinates, and the Doppler pre/post-compensation reference point) may be a same reference point, or the plurality of reference points are at a same position. For example, if two or three of the service link reference point coordinates, the service link TA rate reference point coordinates, and the Doppler pre/post-compensation reference point coordinates are same reference point coordinates, the system only needs to transmit one reference point coordinates, and a manner of using the reference point is agreed on with the terminal in advance. For example, if the service link TA rate reference point coordinates and the service link reference point coordinates are a same reference point, the system and the terminal agree on that after receiving the reference point, the terminal may calculate a common timing advance rate of a service link of a beam or a cell based on a relative movement speed or a distance change rate between a satellite (the terminal may obtain information about a position and speed of the satellite through ephemeris information) and the reference point, and the terminal obtains a common timing advance adjustment value of the service link based on a round-trip delay between the satellite position and the reference point.

The reference point group may use the signaling in the foregoing embodiments to transmit positions.

In a possible implementation, the service link TA rate reference point coordinates, the feeder link TA rate reference point coordinates, and the Doppler pre/post-compensation reference point coordinates may be respectively replaced with a service link TA rate value (with a positive/negative sign indication), a feeder link TA rate value (with a positive/negative sign indication), and a Doppler pre/post-compensation value (with a positive/negative sign indication). Similar to Embodiment 3, the reference point coordinate, the TA rate value, and a Doppler pre/post-compensation value may be combined for use. For example, as shown in FIG. 22, the service link TA rate reference point coordinates may be used in combination with the feeder link TA rate value and the Doppler pre/post-compensation value.

Figure 23:
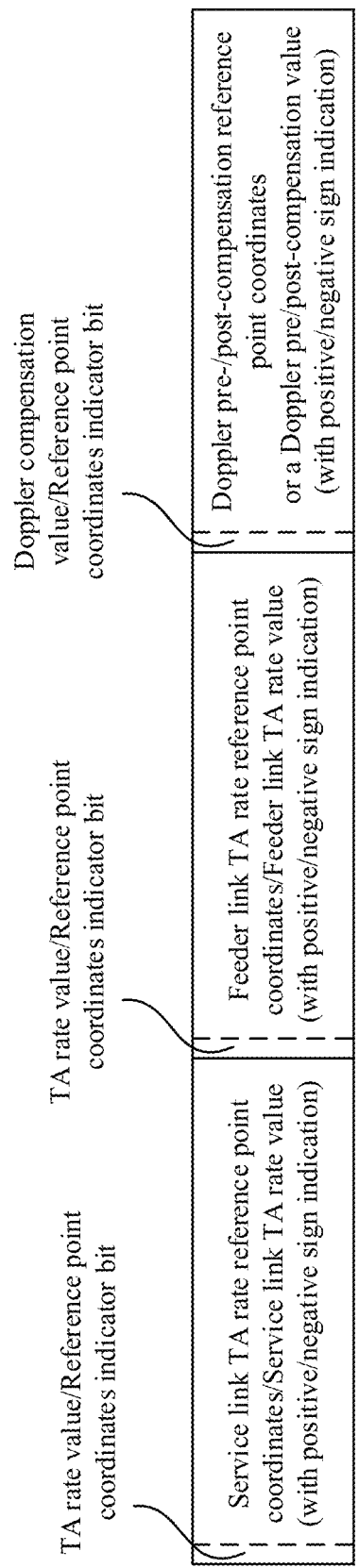

In another possible implementation, as shown in FIG. 23, an indicator bit may be added to each piece of the signaling to indicate that the transmitted signaling is the service link TA rate reference point coordinates or the service link TA rate value (with a positive/negative sign indication), the feeder link TA rate reference point coordinates or the feeder link TA rate value (with a positive/negative sign indication), or the Doppler pre/post-compensation reference point coordinates or the Doppler pre/post-compensation value. For a non-gaze mode, a service link common TA rate of a beam/cell does not change. Therefore, sending signaling to the terminal by using the service link TA rate value (with a positive or negative sign) can reduce frequency of signaling change, and reduce system complexity. Therefore, the flexible signaling transmission manner shown in FIG. 23 can reduce system complexity for signaling sending.

When the network side does not send the TA rate reference point coordinates or the Doppler compensation reference point coordinates to the terminal, or sends an invalid coordinate point (for example, coordinate values are all zero), the terminal may use a default reference point coordinate value. For example, the default reference point coordinate value may be a coordinate value of a gateway. That is, when the network side does not send the TA rate reference point coordinates or the Doppler compensation reference point coordinates to the terminal, or sends an invalid coordinate point (for example, coordinate values are all zero), the TA rate reference point coordinates or the Doppler compensation reference point falls back to the default reference point.

Embodiment 16

In this embodiment, the service link/feeder link TA rate reference point coordinates and/or the service link/feeder link TA rate value are/is replaced with a service link/feeder link TA rate angle on the basis of Embodiment 14.

Figure 24:
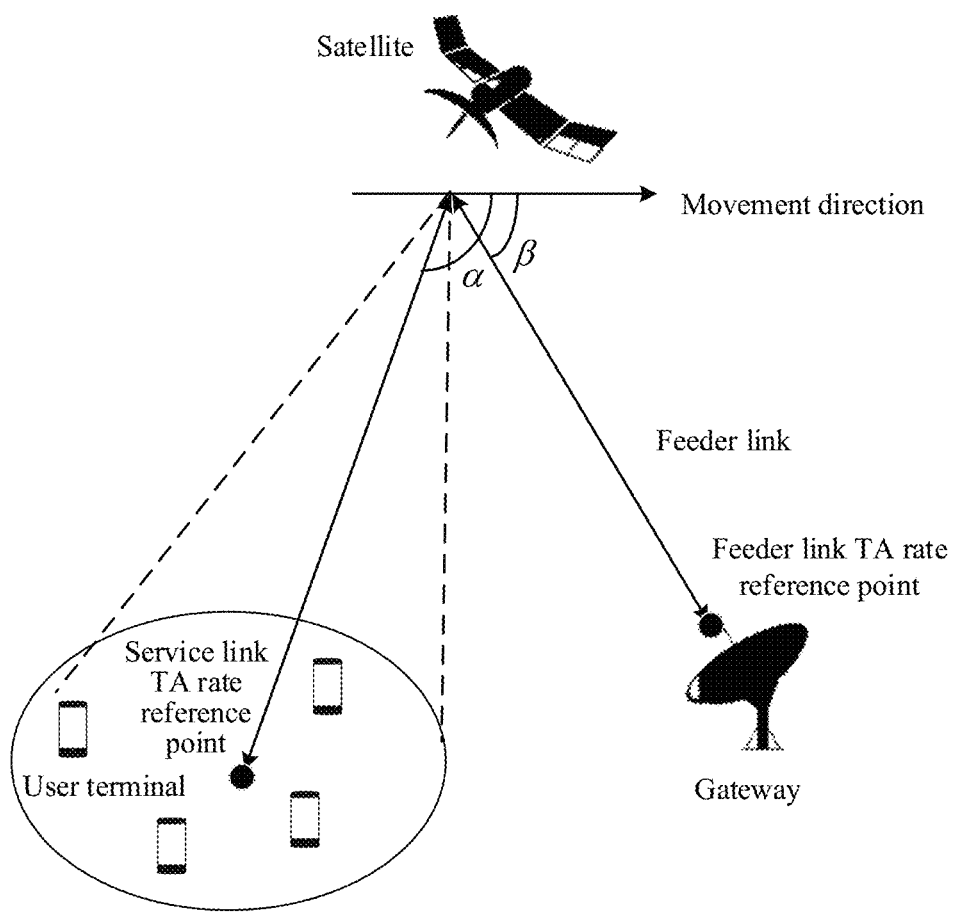
FIG. 24 is a schematic diagram of a TA rate angle of a service link and/or a TA rate angle of a feeder link.

Refer to FIG. 24. It is assumed that a network side sends a service link TA rate angle and/or a feeder link TA rate angle to a terminal, and a speed of a satellite in a moving direction is A. After receiving the TA rate angle, the terminal may calculate, according to the formula $[-2\times\cos(a)\times A/c]$, a TA rate value corresponding to the service link, and calculate, according to the formula $[-2\times\cos(P)\times A/c]$, a TA rate value corresponding to the feeder link. Then, a change value of the TA after a time interval $\Delta T$ may be obtained through calculation based on the TA rate, and the change value is $[-2\times\cos(\alpha)\times A/c]+[-2\times\cos(\beta)\times A/c]$. A corrected TA is TA_original+$[-2\times\cos(\alpha)\times A/c]+[-2\times\cos(\beta)\times A/c]$, where TA_original is a TA previously used. If the network side sends only the service link TA rate angle $\alpha$ or the feeder link TA rate angle $\beta$ to the terminal, the terminal only needs to calculate an updated TA based on the TA_original+$[-2\times\cos(\alpha)\times A/c]$ or TA_original+$[-2\times\cos(\beta)\times A/c]$.

Embodiment 17

For a parameter sent to a terminal in this embodiment, for example, link reference point coordinates, compensation reference point coordinates, and TA rate reference point coordinates, a validity period corresponding to the parameter may be sent to the terminal at the same time. This is because an LEO satellite moves at all times, a position relationship between the terminal and the satellite keeps changing, and a common timing advance value, reference point coordinates, or the like that is sent by the network to the terminal has a validity period for use, and is no longer applicable after the validity period expires.

For example, when the network side sends the compensation reference point coordinates to the terminal, a validity period $\Delta T$ of the reference point coordinate is sent to the terminal at the same time. $\Delta T$ may be a magnitude in a unit of slot, or a magnitude in a unit of Ts. If slot is used as the unit, the compensation reference point is no longer applicable after $\Delta T/2^\mu$ ms since the terminal receives the reference point coordinate. If Ts is used as the unit, the compensation reference point is no longer applicable after $\Delta T \times Ts$ seconds since the terminal receives the reference point coordinate.

If the network side sends the link reference point coordinates, the compensation reference point coordinates, the TA rate reference point coordinates, and the like to the terminal in a periodic broadcast manner, when the parameter expires, the terminal may obtain a new parameter value through re-receiving the parameter and in a decoding manner. If the network side sends the link reference point coordinates, the compensation reference point coordinates, the TA rate reference point coordinates, and the like to the terminal in an aperiodic broadcast manner, when the parameter expires, the terminal may obtain a new parameter value through re-applying for the parameter from the network side.

In this embodiment, a corresponding validity period is configured for a parameter sent by the network side to the terminal. This can further improve communication reliability.

It should be noted that in this embodiment of this application, a satellite communication scenario and an ATG communication scenario may coexist. If both the satellite communication scenario and the ATG communication scenario exist, the network side and the terminal may simultaneously perform operations performed by the network side and the terminal in the satellite communication scenario and the ATG communication scenario. For specific implementation methods in this case, respectively refer to the satellite communication scenario and the ATG communication scenario. Details are not described herein again.

The foregoing embodiments may be combined with each other to achieve different technical effects.

In the foregoing embodiments provided in this application, the methods provided in embodiments of this application are described from a perspective of interaction between a network device (for example, a satellite, a gateway, or an ATG network device) and a terminal. To implement functions in the foregoing methods provided in embodiments of this application, the terminal and the network device may include a hardware structure and/or a software module, to implement the foregoing functions in a form of the hardware structure, the software module, or a combination of the hardware structure and the software module. Whether a specific function in the foregoing functions is performed by the hardware structure, the software module, or the combination of the hardware structure and the software module depends on specific applications and design constraints of the technical solutions. The following describes a communication apparatus in embodiments of this application.

An embodiment of this application further provides a communication apparatus 2500. The apparatus 2500 may be the first network device in the foregoing method embodiments, an apparatus in the first network device (for example, a chip, a chip system, or a circuit), or an apparatus that can be used together with the first network device. The apparatus 2500 may include modules that one-to-one correspond with the methods/operations/steps/actions performed by the first network device in the method embodiments. The module may be a hardware circuit or software, or may be implemented by a hardware circuit in combination with software.

Figure 25:
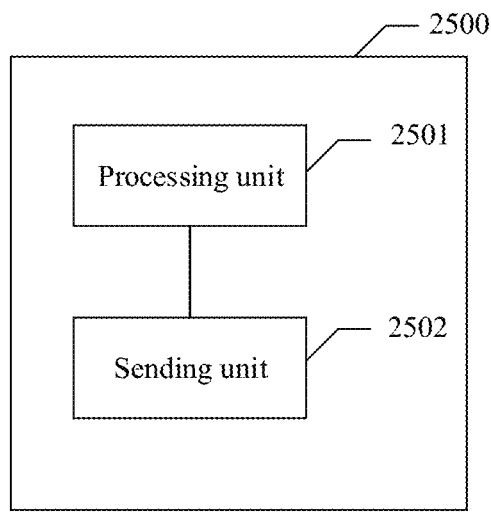
FIG. 25 is a schematic diagram depicting a structure of a communication apparatus 2500 according to an embodiment of this application.

For example, refer to FIG. 25. The apparatus 2500 includes:
a processing unit 2501, configured to determine a first parameter based on a first delay compensation value, where the first delay compensation value is a delay compensation made by the first network device for receiving a signal sent by a terminal, the first parameter indicates a difference between a round-trip delay of a feeder link in a non-terrestrial network NTN and the first delay compensation value, and the difference is used to determine a TA used by the terminal for signal sending; and
a sending unit 2502, configured to send the first parameter.

For specific implementations of the operations performed by the foregoing units, refer to the specific implementations of the operations performed by the first network device in the foregoing method embodiments. Details are not described herein again.

An embodiment of this application further provides a communication apparatus 2600. The apparatus 2600 may be the second network device in the foregoing method embodiments, an apparatus in the second network device (for example, a chip, a chip system, or a circuit), or an apparatus that can be used together with the second network device. The apparatus 2600 may include modules that one-to-one correspond with the methods/operations/steps/actions performed by the second network device in the method embodiments. The module may be a hardware circuit or software, or may be implemented by a hardware circuit in combination with software.

Figure 26:
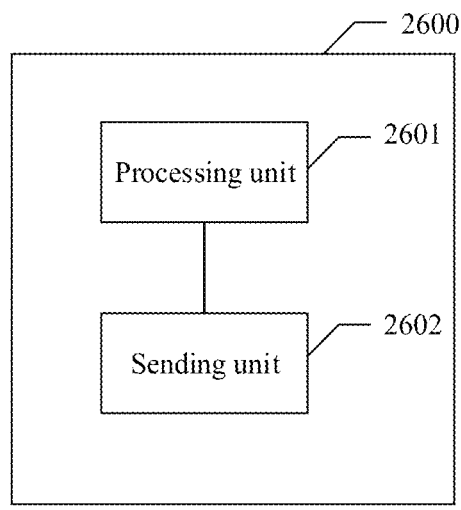
FIG. 26 is a schematic diagram depicting a structure of a communication apparatus 2600 according to an embodiment of this application.

For example, refer to FIG. 26. The apparatus 2600 includes:
a processing unit 2601, configured to determine position coordinates of a compensation reference point based on a second delay compensation value, where the second delay compensation value is a value of delay compensation made by the second network device for receiving a signal sent by a terminal, the second delay compensation value is used to determine a TA used by the terminal for signal sending, and the TA is equal to a service link round-trip delay in an NTN minus the second delay compensation value; and a sending unit 2602, configured to send the position coordinates of the compensation reference point.

For specific implementations of the operations performed by the foregoing units, refer to the specific implementations of the operations performed by the second network device in the foregoing method embodiments. Details are not described herein again.

An embodiment of this application further provides a communication apparatus 2700. The apparatus 2700 may be the ATG network device in the foregoing method embodiments, an apparatus in the ATG network device (for example, a chip, a chip system, or a circuit), or an apparatus that can be used together with the ATG network device. The apparatus 2700 may include modules that one-to-one correspond with the methods/operations/steps/actions performed by the ATG network device in the method embodiments. The module may be a hardware circuit or software, or may be implemented by a hardware circuit in combination with software.

Figure 27:
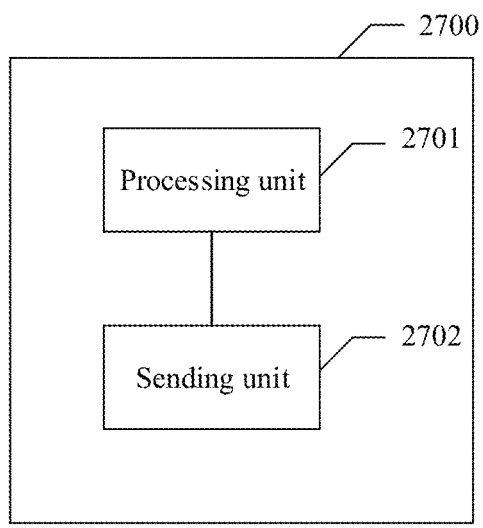
FIG. 27 is a schematic diagram depicting a structure of a communication apparatus 2700 according to an embodiment of this application.

For example, refer to FIG. 27. The apparatus 2700 includes:
- a processing unit 2701, configured to determine position ATG reference point coordinates, where the position coordinates of the ATG reference point are used to determine a TA used by a terminal to send a signal to the ATG network device; and
- a sending unit 2702, configured to send the position coordinates of the ATG reference point.

For specific implementations of the operations performed by the foregoing units, refer to the specific implementations of the operations performed by the ATG network device in the foregoing method embodiments. Details are not described herein again.

An embodiment of this application further provides a communication apparatus 2800. The apparatus 2800 may be the terminal in the foregoing method embodiments, an apparatus in the terminal (for example, a chip, a chip system, or a circuit), or an apparatus that can be used together with the terminal. The apparatus 2800 may include modules that one-to-one correspond with the methods/operations/steps/actions performed by the terminal in the method embodiments. The module may be a hardware circuit or software, or may be implemented by a hardware circuit in combination with software.

Figure 28:
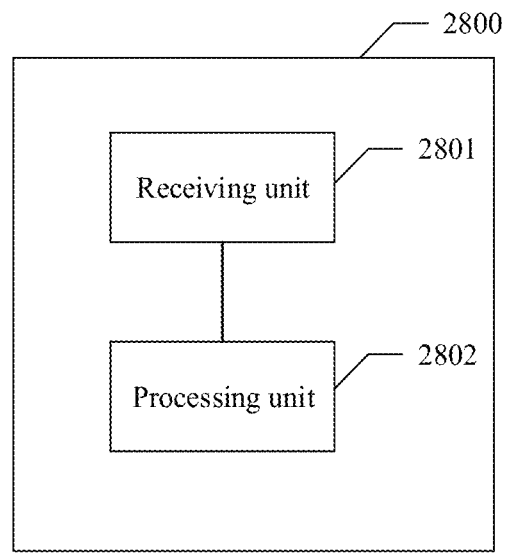
FIG. 28 is a schematic diagram depicting a structure of a communication apparatus 2800 according to an embodiment of this application.

For example, refer to FIG. 28. The apparatus 2800 includes:
- a receiving unit 2801, configured to receive a first parameter, where the first parameter indicates a difference between a round-trip delay of a feeder link in a non-terrestrial network NTN and a first delay compensation value, the first delay compensation value is a delay compensation made by a first network device for receiving a signal sent by the terminal, and the difference is used to determine a TA used by the terminal for signal sending; and
- a processing unit 2802, configured to determine, based on the first parameter, a TA value for signal sending;

or
- a receiving unit 2801, configured to receive position coordinates of a compensation reference point, where a second delay compensation value is a value of delay compensation made by a second network device for receiving a signal sent by the terminal, the second delay compensation value is used to determine a TA used by the terminal for signal sending, and the TA is equal to a service link round-trip delay in an NTN minus the second delay compensation value; and
- a processing unit 2802, configured to determine, based on the position coordinates of the compensation reference point, a TA for signal sending;

or
- a receiving unit 2801, configured to receive position coordinates of an air-to-ground ATG reference point; and
- a processing unit 2802, configured to determine, based on the position coordinates of the ATG reference point, a TA for signal sending.

For specific implementations of the operations performed by the foregoing units, refer to the specific implementations of the operations performed by the terminal in the foregoing method embodiments. Details are not described herein again.

The foregoing describes the communication apparatus in embodiments of this application. The following describes a possible product form of the communication apparatus. It should be understood that any product in any form with the function of the communication apparatus described in FIG. 25 to FIG. 28 falls within the protection scope of embodiments of this application. It should be further understood that the following description is merely an example, and does not limit a product form of the communication apparatus in embodiments of this application.

Figure 29:
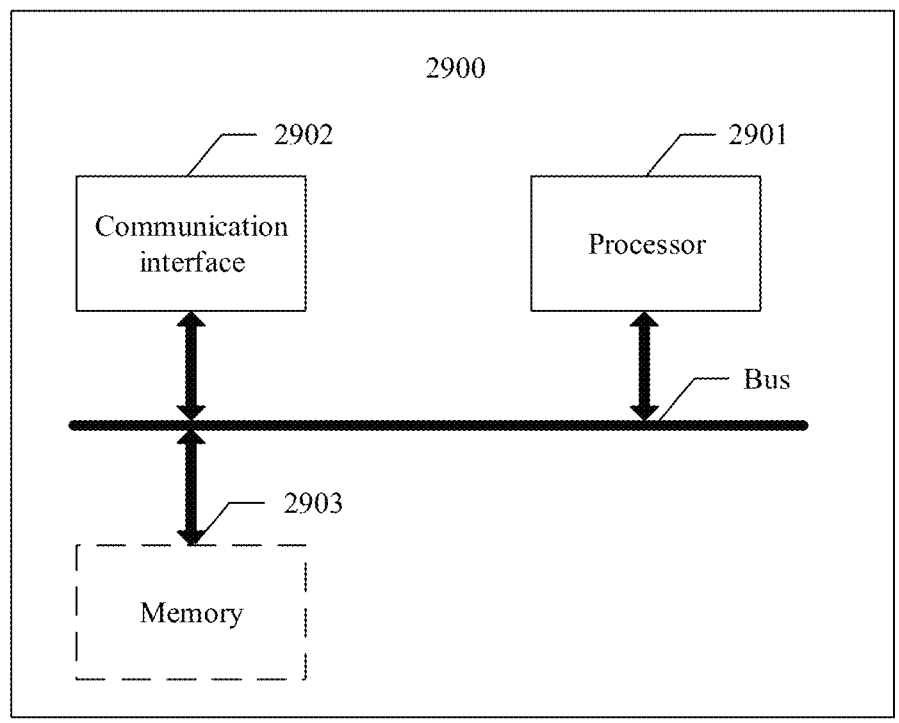
FIG. 29 is a schematic diagram depicting a structure of a communication apparatus 2900 according to an embodiment of this application.

FIG. 29 shows a communication apparatus 2900 according to an embodiment of this application. The communications apparatus 2900 may be configured to perform the method performed by the foregoing first network device, the second network device, the ATG device, or the terminal. The apparatus 2900 may include a processor 2901 and a communication interface. The communication interface is configured to communicate with another communication apparatus. The processor 2901 is configured to run a group of programs, so that the apparatus implements the steps of the method in the foregoing method embodiments.

The processor 2901 may be a general-purpose processor, a digital signal processor, an application-specific integrated circuit, a field programmable gate array or another programmable logic device, a discrete gate or transistor logic device, or a discrete hardware component, and may implement or perform the methods, steps, and logical block diagrams disclosed in embodiments of this application. The general-purpose processor 2901 may be a microprocessor, any conventional processor, or the like. The steps of the method disclosed with reference to embodiments of this application may be directly performed by a hardware processor, or may be performed by using a combination of hardware in the processor and a software module.

The communication interface 2902 may be a transceiver, a circuit, a bus, a module, or a communication interface of another type, and is configured to communicate with another device via a transmission medium. For example, when the apparatus is a terminal, the another device may be a satellite, a gateway, or an ATG network device. When the apparatus is a satellite, a gateway, or an ATG network device, the another device may be a terminal.

Optionally, the apparatus 2900 may further include a memory 2903, configured to store program instructions and/or data. The memory 2903 may be a nonvolatile memory, for example, a hard disk (HDD) or a solid-state drive (SSD), or may be a volatile memory, for example, a random access memory 2903 (RAM). The memory is any other medium that can carry or store expected program code in a form of an instruction structure or a data structure and that can be accessed by a computer, but is not limited thereto. The memory in embodiments of this application may alternatively be a circuit or any other apparatus that can implement a storage function, and is configured to store program instructions and/or data.

The memory 2903 may be coupled to the processor 2901. Coupling in embodiments of this application is indirect coupling or a communication connection between apparatuses, units, or modules, may be in an electrical, mechanical, or another form, and is for information exchange between the apparatuses, units, or modules. The processor 2901 may operate in collaboration with the memory 2903. The processor 2901 may execute the program instructions stored in the memory 2903. At least one of the at least one memory 2903 may be included in the processor 2901.

It should be understood that a specific connection medium between the communication interface 2902, the processor 2901, and the memory 2903 is not limited in this embodiment of this application. In this embodiment of this application, the memory 2903, the communication interface 2902, and the processor 2901 are connected through a bus in FIG. 29, and the bus is represented by a thick line in FIG. 29. A connection manner between other components is merely schematically described, and is not limited thereto. The bus may be classified into an address bus, a data bus, a control bus, and the like. For ease of representation, only one thick line is used for representation in FIG. 29. However, it does not mean that there is only one bus or only one type of bus.

Figure 30:
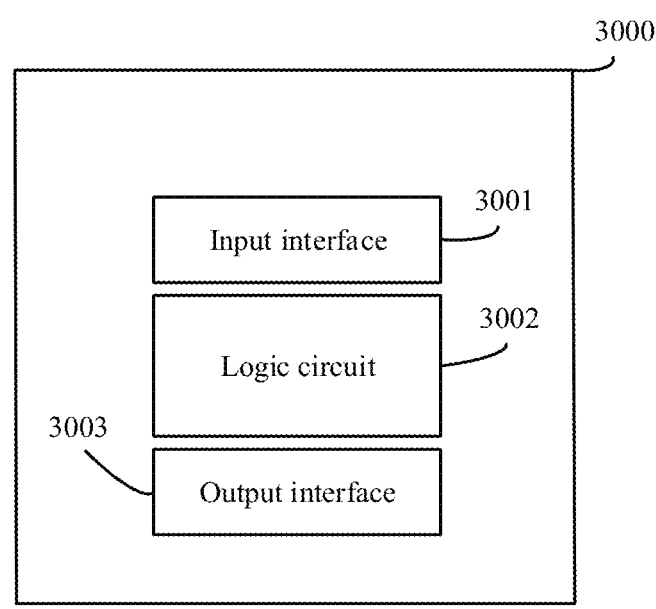
FIG. 30 is a schematic diagram depicting a structure of a communication apparatus 3000 according to an embodiment of this application.

FIG. 30 shows an apparatus 3000 according to an embodiment of this application. The apparatus 3000 may be configured to perform the method performed by the foregoing first network device, the second network device, the ATG device, or the terminal. The apparatus 3000 may be a communication device or a chip in a communication device. As shown in FIG. 30, the apparatus 3000 includes at least one input interface 3001, a logic circuit 3002, and at least one output interface 3003.

Optionally, the logic circuit 3002 may be a chip, an encoder, an encoding circuit, or another integrated circuit that can implement the method in this application.

Because specific methods and embodiments have been described above, for functions of the input interface 3001, the logic circuit 3002, or the output interface 3003, refer to the related parts of the corresponding embodiments, and details are not described herein again.

An embodiment of this application provides a computer-readable storage medium. The computer-readable storage medium stores computer-readable instructions. When the computer-readable instructions are executed on a communication apparatus, the communication apparatus is enabled to perform the method performed by the foregoing first network device, the second network device, the ATG device, or the terminal.

An embodiment of this application provides a computer program product, including instructions. When the product runs on a computer, the computer is enabled to perform the method performed by the foregoing first network device, the second network device, the ATG device, or the terminal.

Embodiments of this application are described with reference to the flowcharts and/or block diagrams of the method, the device (system), and the computer program product according to embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or the processor of the another programmable data processing device generate an apparatus for implementing a specific function in one or more processes in the flowcharts and/or in one or more blocks in the block diagrams.

All or a part of the foregoing embodiments may be implemented by software, hardware, firmware, or any combination thereof. When software is used to implement the embodiments, all or a part of the embodiments may be implemented in a form of a computer program product. The computer program product includes one or more computer instructions. When the computer program instructions are loaded and executed on a computer, the procedure or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD), a semiconductor medium (for example, a solid-state drive (SSD)), or the like.

It is clear that a person skilled in the art can make various modifications and variations to embodiments of this application without departing from the spirit and scope of this application. In this case, this application is intended to cover these modifications and variations to embodiments of this application provided that they fall within the scope of protection defined by the following claims and their equivalent technologies.

What is claimed is:

1. A timing advance (TA) determining method, comprising:
   determining, by a terminal, a common timing parameter and a round-trip delay of a service link; and
   obtaining, by the terminal, a TA for signal sending based on the common timing parameter and the round-trip delay of the service link,
   wherein the TA is obtained based on the common timing parameter, the round-trip delay of the service link, a numerical drift, and an offset,
   wherein the numerical drift is obtained from at least one of a timing advance command (TAC) or a media access control and control element (MAC CE), and
   wherein the offset is obtained from at least one of radio resource control message or system information SIB1, or
   the offset is a value agreed on by using a protocol.

2. The method according to claim 1, wherein the TA for signal sending meets a following equation:

TA=round-trip delay of the service link+common timing parameter±numerical drift offset.

3. The method according to claim 1, wherein,
   the offset is related to a time division duplex mode or a frequency division duplex mode.

4. The method according to claim 1, wherein
   the TA for signal sending is obtained through a correction based on a TA rate, and
   a corrected TA for signal sending equals a sum of the TA and TA rate *ΔT, wherein ΔT is a time interval.

5. The method according to claim 4, wherein the TA rate is obtained from at least one of a radio resource control (RRC) message, or other system information (OSI).

6. The method according to claim 1, wherein,
   the common timing parameter is obtained from at least one of a radio resource control (RRC) message, or other system information (OSI).

7. The method according to claim 1, wherein,
   a dimension unit of the common timing parameter is $64 \cdot T_c/2^u$, wherein $T_c=1/(\Delta f_{max} \cdot N_f)$, $\Delta f_{max}=480 \times 10^3$ Hz, and $N_f=4096$.

8. The method according to claim 1, wherein the method comprises:
   receiving, by the terminal, a validity period, wherein the common timing parameter is not applicable after the validity period expires.

9. A timing advance (TA) determining method, comprising:
   determining, by a network device, a common timing parameter based on a round-trip delay of a feeder link in a non-terrestrial network NTN and a first delay compensation value; and
   sending, by the network device, the common timing parameter, an offset, and a numerical drift to a terminal, wherein the common timing parameter, the offset, and the numerical drift are used to determine a TA used by the terminal for signal sending,
   wherein the numerical drift is carried in at least one of a timing advance command (TAC) or a media access control and control element (MAC CE), and
   wherein the offset is carried in at least one of radio resource control message or system information SIB1.

10. The method according to claim 9, wherein the method further comprises:
    sending, by the network device, a validity period, wherein the common timing parameter is not applicable after the validity period expires.

11. A communication apparatus, comprising
    at least one processor;
    one or more memories coupled to the at least one processor and storing programming instructions for execution by the at least one processor, to:
    determine a common timing parameter and a round-trip delay of the service link; and
    obtain a TA for signal sending based on the common timing parameter and the round-trip delay of the service link;
    wherein the TA is obtained based on the common timing parameter, the round-trip delay of the service link, a numerical drift, and an offset,
    wherein the numerical drift is obtained from at least one of a timing advance command (TAC) or a media access control and control element (MAC CE), and
    wherein the offset is obtained from at least one of a radio resource control message or a system information SIB1, or the offset is a value agreed on by using a protocol.

12. The apparatus according to claim 11, wherein the TA for signal sending meets a following equation:

$$TA = \text{round-trip delay of the service link} + \text{common timing parameter} \pm \text{numerical drift offset}.$$

13. The apparatus according to claim 11, wherein,
    the offset is related to a time division duplex mode or a frequency division duplex mode.

14. The apparatus according to claim 11, wherein
    the TA for signal sending is obtained through a correction based on a TA rate, and
    a corrected TA for signal sending equals a sum of the TA and TA rate $*\Delta T$, wherein $\Delta T$ is a time interval.

15. The apparatus according to claim 11, wherein the one or more memories further stores programming instructions for execution by the at least one processor to:
    receive a validity period, wherein the common timing parameter is not applicable after the validity period expires.

* * * * *

UNITED STATES PATENT AND TRADEMARK OFFICE
CERTIFICATE OF CORRECTION

PATENT NO. : 12,218,816 B2
APPLICATION NO. : 17/886739
DATED : February 4, 2025
INVENTOR(S) : Xiaolu Wang et al.

It is certified that error appears in the above-identified patent and that said Letters Patent is hereby corrected as shown below:

In the Claims

In Column 62, Claim 2, Line 48, delete "drift offset." and insert -- drift±offset. --, therefor.

In Column 64, Claim 12, Line 18, delete "drift offset." and insert -- drift±offset. --, therefor.

Signed and Sealed this
Twenty-seventh Day of May, 2025

Coke Morgan Stewart
*Acting Director of the United States Patent and Trademark Office*